(12) United States Patent
Jang et al.

(10) Patent No.: US 10,708,740 B2
(45) Date of Patent: Jul. 7, 2020

(54) METHOD AND APPARATUS OF SIGNAL MEASUREMENT FOR TERMINAL MOVING AT HIGH SPEED IN WIRELESS COMMUNICATION SYSTEM

(71) Applicant: Samsung Electronics Co., Ltd., Suwon-si, Gyeonggi-do (KR)

(72) Inventors: Jaehyuk Jang, Suwon-si (KR); Soenghun Kim, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/841,776

(22) Filed: Dec. 14, 2017

(65) Prior Publication Data

US 2018/0176710 A1     Jun. 21, 2018

(30) Foreign Application Priority Data

Dec. 16, 2016   (KR) .......................... 10-2016-0172698

(51) Int. Cl.
*H04W 4/70*      (2018.01)
*H04W 72/12*     (2009.01)
(Continued)

(52) U.S. Cl.
CPC ............ *H04W 4/70* (2018.02); *H04W 4/60* (2018.02); *H04W 24/10* (2013.01); *H04W 36/32* (2013.01);
(Continued)

(58) Field of Classification Search
None
See application file for complete search history.

(56) References Cited

U.S. PATENT DOCUMENTS

2013/0084849 A1    4/2013  Koskinen et al.
2013/0088988 A1*   4/2013  Deng .................... H04W 24/10
                                                    370/252
(Continued)

FOREIGN PATENT DOCUMENTS

KR    10-2016-0008530 A    1/2016
WO      2014-109561 A1     7/2014
(Continued)

OTHER PUBLICATIONS

European Search Report dated Sep. 16, 2019, issued in European Application No. 17880871.3.

*Primary Examiner* — James P Duffy
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A signal measurement method for a terminal is provided. The signal measurement method includes receiving a signal measurement indication for high-speed movement from a base station, and measuring a signal from a first cell using a measurement scheme designed for high-speed movement based on the signal measurement indication, wherein the first cell is a primary cell (PCell).

14 Claims, 38 Drawing Sheets

(51) Int. Cl.
*H04W 88/10* (2009.01)
*H04W 4/60* (2018.01)
*H04W 24/10* (2009.01)
*H04W 36/32* (2009.01)
*H04W 36/00* (2009.01)
*H04W 74/08* (2009.01)
*H04W 80/02* (2009.01)

(52) U.S. Cl.
CPC ....... *H04W 72/1215* (2013.01); *H04W 88/10* (2013.01); *H04J 2211/001* (2013.01); *H04J 2211/005* (2013.01); *H04W 36/0061* (2013.01); *H04W 36/0069* (2018.08); *H04W 36/0088* (2013.01); *H04W 74/0833* (2013.01); *H04W 80/02* (2013.01)

(56) References Cited

U.S. PATENT DOCUMENTS

| | | | |
|---|---|---|---|
| 2013/0188499 A1* | 7/2013 | Mach | H04W 48/20 370/252 |
| 2014/0171086 A1* | 6/2014 | Nakamori | H04W 36/0088 455/436 |
| 2015/0358094 A1 | 12/2015 | Yi et al. | |
| 2016/0037405 A1 | 2/2016 | Choi et al. | |
| 2016/0081020 A1 | 3/2016 | Rahman et al. | |
| 2016/0338039 A1 | 11/2016 | Van Der Velde et al. | |
| 2016/0338137 A1 | 11/2016 | Mishra et al. | |

FOREIGN PATENT DOCUMENTS

| | | |
|---|---|---|
| WO | 2015/176782 A1 | 11/2015 |
| WO | 2015/176996 A1 | 11/2015 |

\* cited by examiner

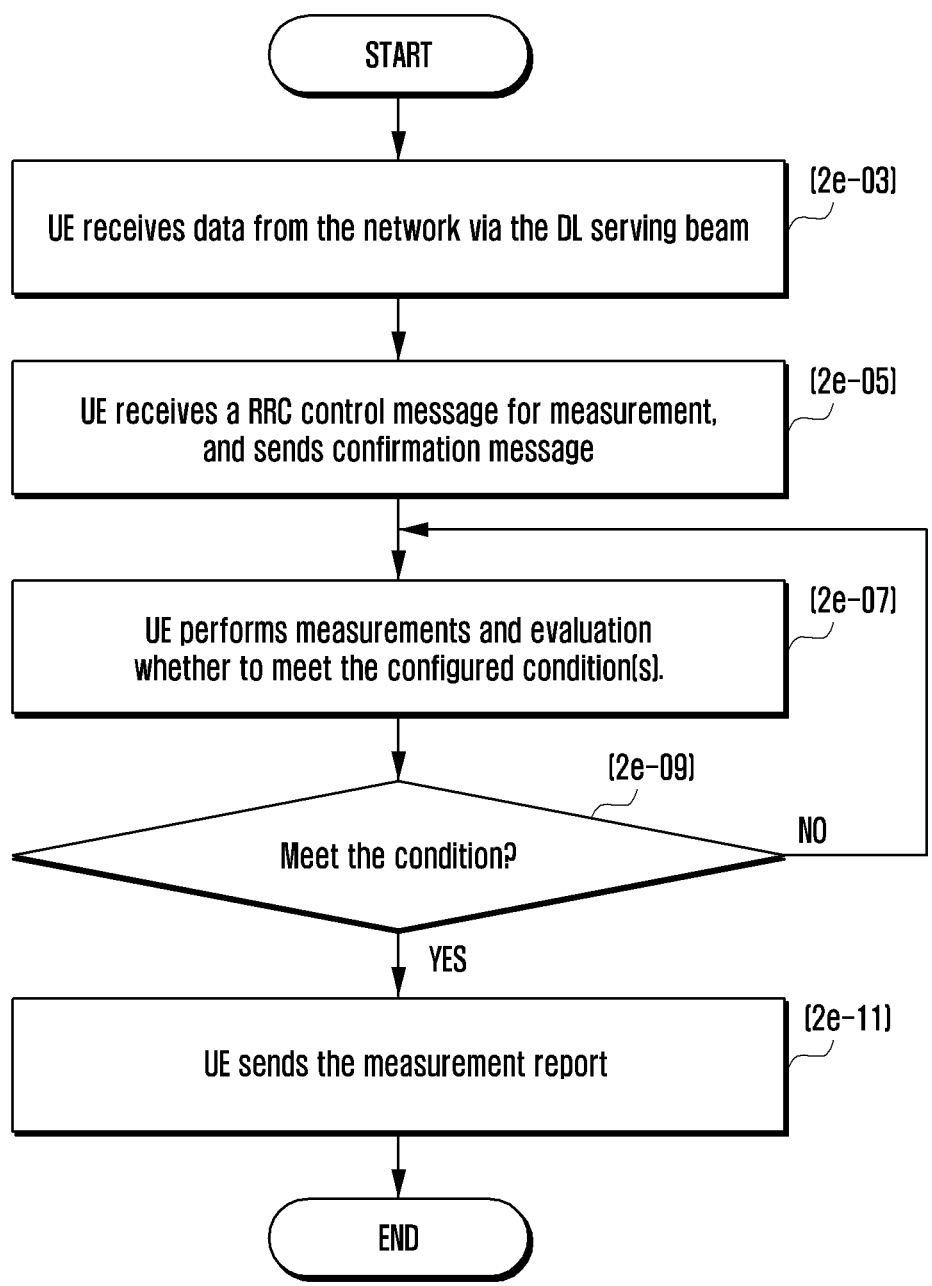

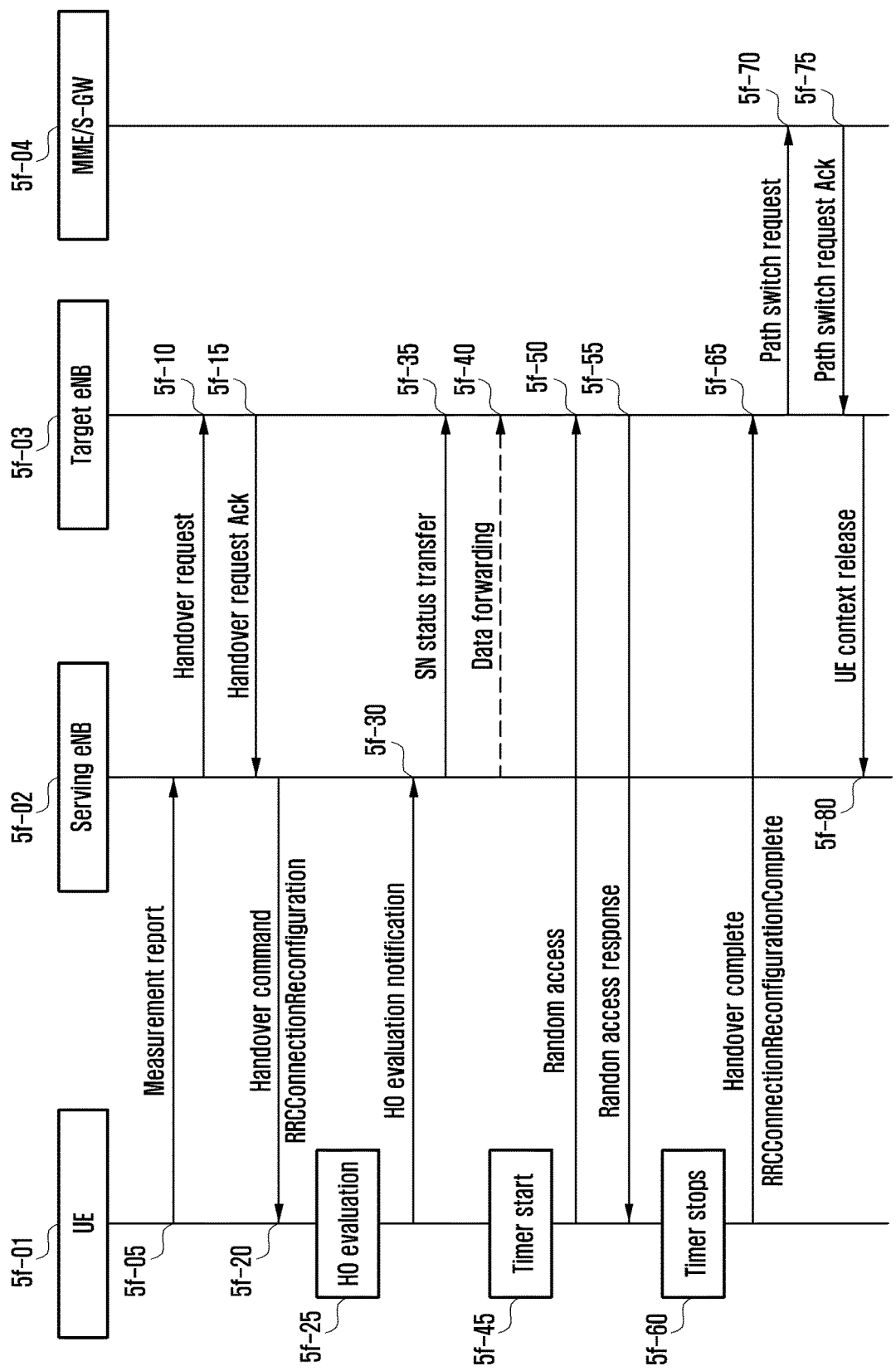

METHOD AND APPARATUS OF SIGNAL MEASUREMENT FOR TERMINAL MOVING AT HIGH SPEED IN WIRELESS COMMUNICATION SYSTEM

CROSS-REFERENCE TO RELATED APPLICATION(S)

This application claims the benefit under 35 U.S.C. § 119(a) of a Korean patent application filed on Dec. 16, 2016 in the Korean Intellectual Property Office and assigned Serial number 10-2016-0172698, the entire disclosure of which is hereby incorporated by reference.

TECHNICAL FIELD

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The present disclosure relates to a method that enables a terminal moving at high speed to effectively measure a signal in a wireless communication system. More particularly, the present disclosure relates to third generation partnership project (3GPP) long term evolution (LTE) technology.

BACKGROUND

In a modern long term evolution advanced (LTE-A) system supporting carrier aggregation (CA), a terminal can transmit and receive data using a primary carrier and one or more additional secondary carriers, and the terminal can be configured by the base station to use an additional cell. In this case, there is a need for an enhanced measurement method and apparatus that enable the terminal to stay in a cell suitable for high-speed movement even when the terminal in the idle state is not connected to the base station to thereby reduce errors in, for example, paging message reception, while simplifying the complexity of the terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method that enables a terminal moving at high speed to use an enhanced measurement scheme.

Another aspect of the present disclosure is to provide a method that enables a terminal to perform signal measurement and reporting in a wireless communication system supporting beam-based communication.

Another aspect of the present disclosure is to provide a method of changing the operation timing for latency reduction.

Another aspect of the present disclosure is to provide a beam management procedure based on mobility in a next generation mobile communication system using beams whereby a terminal may perform operations for mobility and connection within a cell without radio resource control (RRC) involvement.

Further, in a next generation mobile communication system using beams, according to the mobility of the terminal, the quality of a radio link with the serving cell may be suddenly deteriorated or the terminal may leave the serving beam area, and RRC signaling may become unavailable. Additionally, in the existing long term evolution (LTE) technology, if both the link to the serving cell and the link to the target cell are not good, radio link failure (RLF) is declared and the cell connection procedure is newly initiated. However, frequent initiation of the cell connection procedure may cause a lot of overhead and connection delay. Hence, another aspect of the present disclosure is to provide a method for addressing this issue.

In accordance with an aspect of the present disclosure, a method of signal measurement for a terminal in a wireless communication system is provided. The method includes receiving a signal measurement indication for high-speed movement from a base station, and measuring a signal from a first cell using a measurement scheme designed for high-speed movement according to the signal measurement indication, wherein the first cell is a primary cell (PCell).

The signal measurement indication may be included in a system information block (SIB).

The method may further include measuring a signal from a second cell using a measurement scheme different from the measurement scheme designed for high-speed movement. The second cell may include at least one of a secondary cell (SCell) and a primary SCell (PSCell).

The signal measurement period of the first cell may be shorter than that of the second cell.

In accordance with another aspect of the present disclosure, a method of communication for a base station in a wireless communication system is provided. The method includes transmitting a signal measurement indication for high-speed movement to a terminal, and receiving information on a first cell wherein the information is obtained through measurement on the first cell using a measurement scheme designed for high-speed movement according to the signal measurement indication, wherein the first cell is a PCell.

The signal measurement indication may be included in a system SIB for transmission.

The method may further include receiving information on a second cell wherein the information is obtained through measurement on the second cell using a measurement scheme different from the measurement scheme designed for high-speed movement. The second cell may include at least one of a SCell and a PSCell.

The signal measurement period in the first cell information may be shorter than that in the second cell information.

In accordance with another aspect of the present disclosure, a terminal in a wireless communication system is provided. The terminal includes a transceiver, and at least one processor connected with the transceiver, and configured to control the transceiver to receive a signal measurement indication for high-speed movement from a base station, and measure a signal from a first cell using a measurement scheme designed for high-speed movement according to the signal measurement indication, and wherein the first cell is a PCell.

The signal measurement indication may be included in a system SIB.

The at least one processor may be configured to measure a signal from a second cell using a measurement scheme different from the measurement scheme designed for high-speed movement. The second cell may include at least one of a SCell and a PSCell.

The signal measurement period of the first cell may be shorter than that of the second cell.

In accordance with another aspect of the present disclosure, a base station in a wireless communication system is provided. The base station includes a transceiver, and at least one processor connected with the transceiver, and configured to control the transceiver to transmit a signal measurement indication for high-speed movement to a terminal, and control the transceiver to receive information on a first cell wherein the information is obtained through measurement on the first cell using a measurement scheme designed for high-speed movement according to the signal measurement indication, wherein the first cell is a PCell.

The signal measurement indication may be included in a system SIB for transmission.

The at least one processor may be configured to control the transceiver to receive information on a second cell wherein the information is obtained through measurement on the second cell using a measurement scheme different from the measurement scheme designed for high-speed movement. The second cell may include at least one of a SCell and a PSCell.

In accordance with another aspect of the present disclosure, a method for a terminal to report a beam measurement result is provided. The method includes receiving information on the measurement report triggering condition from a base station, measuring beam information from at least one neighbor base station, and determining whether to report the measured beam information to the base station based on the measured beam information and the information on the measurement report triggering condition, wherein the information on the measurement report triggering condition may include a threshold and a weight for per-beam measurement reporting.

In accordance with another aspect of the present disclosure, a method for a terminal to transmit data is provided. The method includes receiving uplink data transmission information from a base station, receiving first uplink resource allocation information from the base station, transmitting data to the base station after expiration of a first time determined based on the uplink data transmission information, transmitting, if random access is necessary, a random access preamble to the base station, receiving a response message containing second uplink resource allocation information for the preamble, transmitting message 3 to the base station after expiration of a second time, receiving third uplink resource allocation information from the base station, and transmitting data to the base station after expiration of the first time.

In accordance with another aspect of the present disclosure, a method for a base station to manage beams is provided. The method includes receiving beam measurement results corresponding respectively to reception beams of a terminal through a medium access control-control element (MAC-CE), determining whether to change the reception beam of the terminal based on the beam measurement results, and transmitting the determination result to the terminal through a MAC-CE.

In accordance with another aspect of the present disclosure, a method of handover for a terminal is provided. The method includes receiving a first message containing handover information from a serving evolved node B (eNB), determining whether to handover to a target eNB based on the handover information, and transmitting a second message containing the determination result to the serving eNB.

If the channel conditions of the serving cell and the target cell are worse than or equal to their preset thresholds, the above method may further include receiving a third message indicating inactive state transition from the base station, and making a transition to the inactive state according to the third message.

In a feature of the present disclosure, the terminal can determine the target for an enhanced measurement procedure for high-speed movement via indication from the base station, simplifying the complexity of the terminal. The terminal may stay in a cell suitable for high-speed movement even when not being connected to the base station in the idle state, reducing errors in, for example, paging message reception.

In another feature of the present disclosure, the terminal may determine whether to perform reporting and report a measurement result in consideration of the number of available beams, enabling the base station to reduce unnecessary handovers.

In another feature of the present disclosure, the terminal performs transmission and reception at given time points after an operation timing configuration indication is given for delay reduction from the base station, enabling error-free communication between the base station and the terminal.

In another feature of the present disclosure, there is provided a new beam management procedure for the next generation mobile communication system. Hence, it is possible to support intra-cell movement and connection of the terminal through simpler layer 1/layer 2 signaling instead of handover operation involving the RRC.

In another feature of the present disclosure, there is provided an inter-cell conditional handover procedure for a next-generation mobile communication system using beams. More particularly, if both the link to the serving cell and the link to the target cell are poor, a terminal-based mobility management procedure is performed after transitioning to the inactive state, thereby reducing unnecessary cell connection operations and overhead with respect to the corresponding condition.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2E is a flowchart illustrating a sequence of operations of a terminal according to an embodiment of the present disclosure;

FIG. 5F is a sequence diagram illustrating a process of successful conditional handover to a target cell as embodiment 5-1 according to an embodiment of the present disclosure;

Throughout the drawings, like reference numerals will be understood to refer to like parts, components, and structures.

DETAILED DESCRIPTION

Figure 1A:
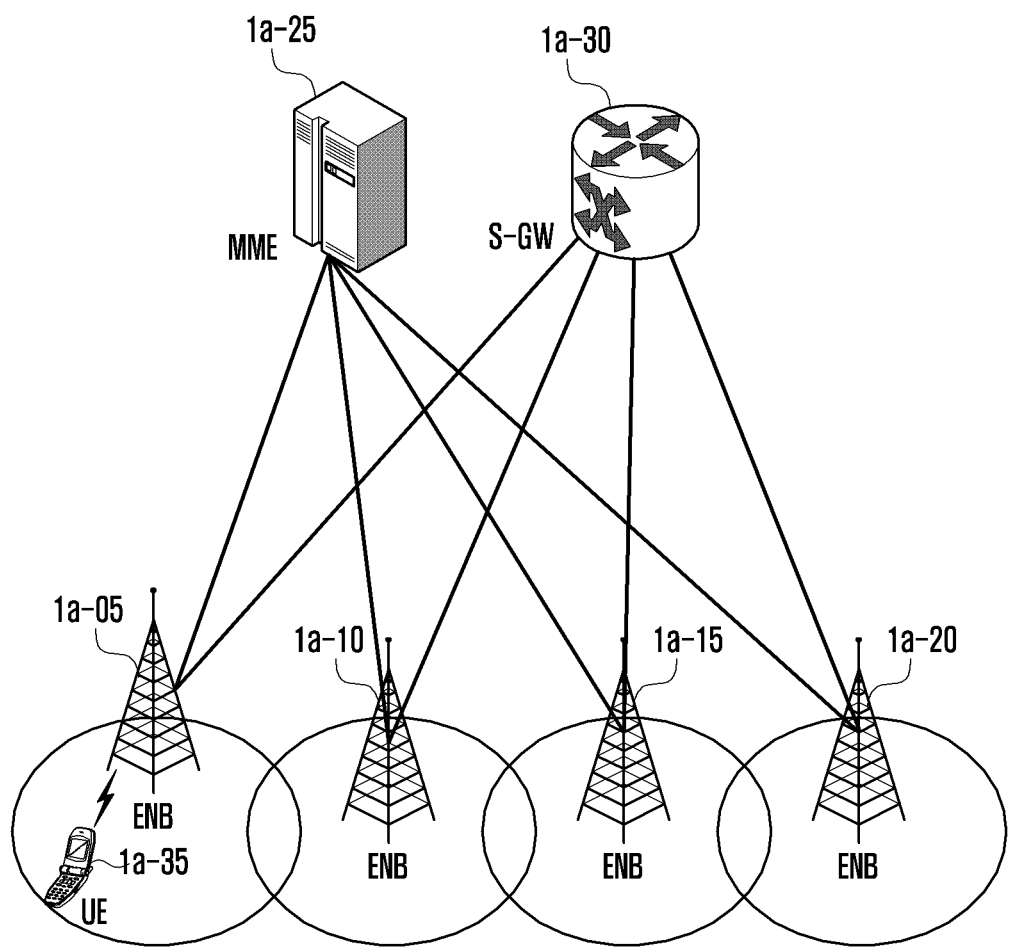
FIG. 1A illustrates a network architecture of a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following description of various embodiments of the present disclosure is focused on the advanced E-UTRA (long term evolution-advanced (LTE-A)) system supporting carrier aggregation (CA). For example, the subject matter of the present disclosure is applicable to the multicarrier high speed packet access (HSPA) system supporting CA.

In the drawings, some elements are exaggerated, omitted, or only outlined in brief, and thus may be not drawn to scale. The same or similar reference symbols are used throughout the drawings to refer to the same or like parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out operations of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component, such as an field programmable gate array (FPGA) or application-specific integrated circuit (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

First Embodiment

FIG. 1A illustrates a network architecture of a wireless communication system according to an embodiment of the present disclosure.

Referring to FIG. 1A, the wireless communication system may include multiple base stations evolved node Bs, (ENBs) 1a-05, 1a-10, 1a-15 and 1a-20, a mobility management entity (MME) 1a-25, and a serving-gateway (S-GW) 1a-30. A user equipment (UE or terminal) 1a-35 may connect to an external network through the ENBs 1a-05, 1a-10, 1a-15 and 1a-20 and the S-GW 1a-30.

The base stations 1a-05, 1a-10, 1a-15 and 1a-20 are access nodes of the cellular network and provide wireless access services to terminals accessing the network. For example, to service user traffic, the base stations 1a-05, 1a-10, 1a-15 and 1a-20 schedule the terminals based on collected status information related to buffers, transmission powers and channels of the terminals, and support communication between the terminals and the core network (CN).

The MME 1a-25 is connected to multiple base stations and performs various control functions including mobility management for terminals. The S-GW 1a-30 is a functional entity providing data bearers. The MME 1a-25 and the S-GW 1a-30 can perform authentication and bearer management for terminals accessing the network, and process packets arriving from the base stations 1a-05, 1a-10, 1a-15 and 1a-20 and packets to be sent to the base stations 1a-05, 1a-10, 1a-15 and 1a-20.

Figure 1B:
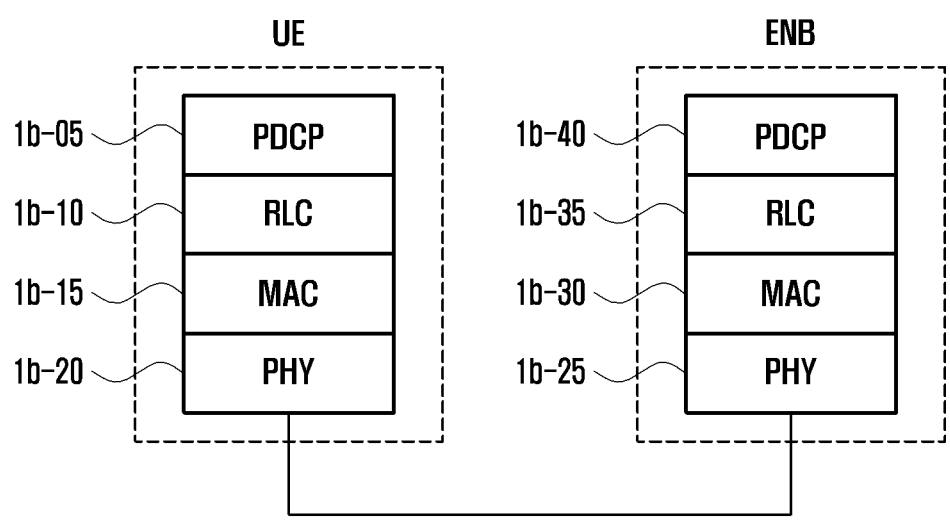
FIG. 1B illustrates a structure of wireless protocols in a long term evolution (LTE) system according to an embodiment of the present disclosure.

FIG. 1B illustrates a structure of wireless protocols in an LTE system according to an embodiment of the present disclosure.

Referring to FIG. 1B, in the LTE system, a UE and an ENB each include a wireless protocol stack including packet data convergence protocol (PDCP) 1b-05 or 1b-40, radio link control (RLC) 1b-10 or 1b-35, and medium access control (MAC) 1b-15 or 1b-30. The PDCP 1b-05 or 1b-40 performs compression and decompression of internet protocol (IP) headers. The RLC 1b-10 or 1b-35 reconfigures PDCP protocol data unit (PDUs) to a suitable size.

The MAC 1b-15 or 1b-30 is connected with multiple RLC layer entities in a UE. The MAC 1b-15 or 1b-30 multiplexes RLC PDUs into MAC PDUs and demultiplexes MAC PDUs into RLC PDUs. The physical (PHY) layer 1b-20 or 1b-25 converts higher layer data into orthogonal frequency division multiplexing (OFDM) symbols by means of channel coding and modulation and transmits the OFDM symbols through a wireless channel, and converts OFDM symbols received through a wireless channel to higher layer data by means of demodulation and channel decoding and forwards the data to the higher layers.

For additional error correction at the physical layer, hybrid automatic repeat request (HARQ) is used, and the receiver side transmits a 1-bit indication indicating whether it has received packets from the transmitter side. This information is referred to as HARQ acknowledgement (ACK)/negative acknowledgement (NACK). Downlink HARQ ACK/NACK for uplink transmission may be transmitted via physical hybrid-ARQ indicator channel (PHICH). Uplink HARQ ACK/NACK for downlink transmission may be transmitted via physical uplink control channel (PUCC) or physical uplink shared channel (PUSCH).

Although not shown, the radio resource control (RRC) layer exists on top of the PDCP layer of each of the terminal and the base station. The RRC layers can exchange connection and measurement setup control messages for controlling radio resources.

Meanwhile, the PHY layer may include one or more frequencies/carriers, and the technique of simultaneously configuring and using plural frequencies is referred to as CA. In typical cases, a single carrier is used in communication between a user equipment (UE) and a base station evolved node B (eNB). When CA is employed, a primary carrier and one or more secondary carriers may be used in communication between the UE and the ENB, significantly increasing the data transfer rate by an amount corresponding to the number of secondary carriers. In LTE, the cell of an ENB using the primary carrier is termed a primary cell (PCell), and the cell using a secondary carrier is termed a secondary cell (SCell).

Figure 1C:
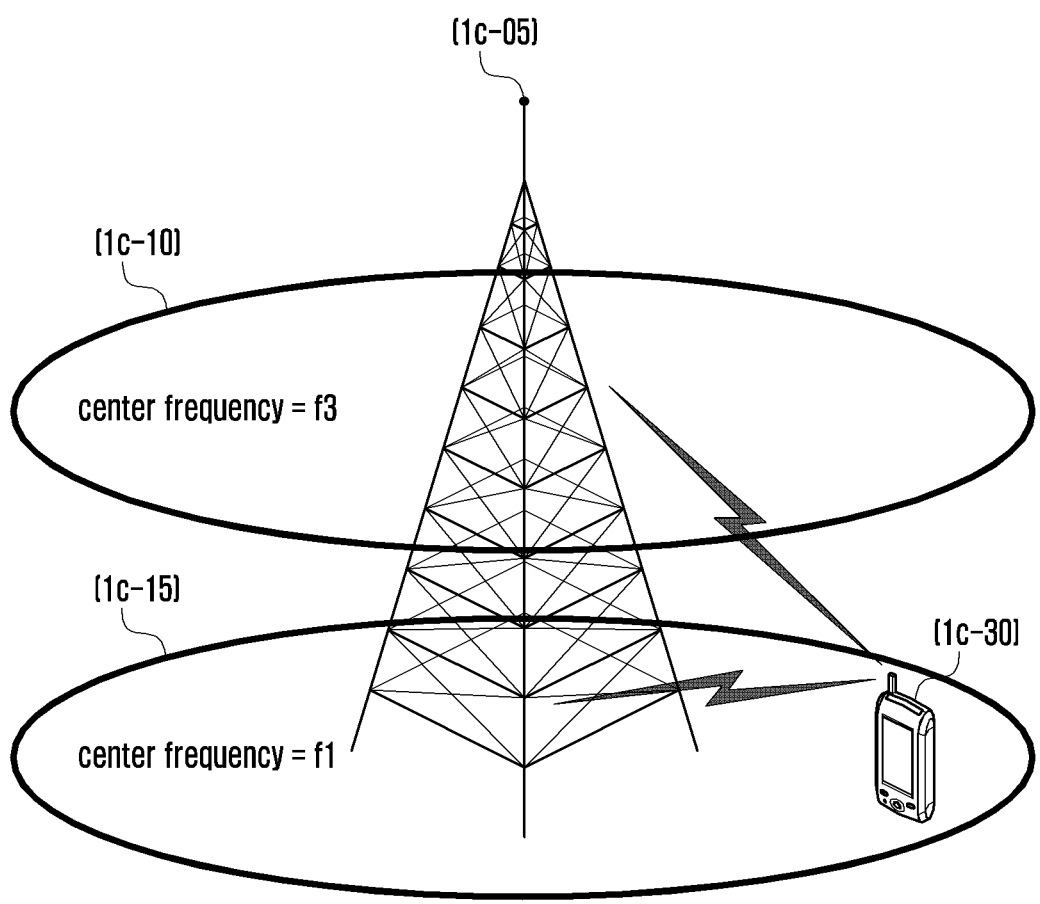
FIG. 1C illustrates carrier aggregation (CA) in a terminal according to an embodiment of the present disclosure.

FIG. 1C illustrates CA in a terminal according to an embodiment of the present disclosure.

Referring to FIG. 1C, one base station transmits and receives multiple carriers across multiple frequency bands. For example, assume that the base station 1c-05 transmits a carrier 1c-15 with a center frequency f1 and a carrier 1c-10 with a center frequency f3. A legacy terminal may use one of the two carriers to send and receive data. However, a terminal having a CA capability may send and receive data to and from multiple carriers in parallel. Here, the base station 1c-05 may assign more carriers to the terminal 1c-30 having a CA capability according to situations, increasing the data rate of the terminal 1c-30.

In a traditional sense, it may be considered that one cell is formed by a downlink carrier and an uplink carrier provided by the same base station. In CA, a terminal may be considered as sending and receiving data through multiple cells in parallel. Hence, the maximum data rate of the terminal may be increased in proportion to the number of aggregated carriers.

In the following description, for a terminal, data reception through a downlink carrier and data transmission through an uplink carrier may be identical in meaning to data transmission and reception through control and data channels provided by cells corresponding to center frequencies and frequency bands characterizing the above carriers. The following description of embodiments of the present disclosure is focused on the LTE system for ease of description. However, the present disclosure is applicable to other wireless communication systems supporting CA.

In the scenario of FIG. 1C, one base station transmits carriers with different center frequencies. However, in another scenario, different base stations may transmit carriers with different center frequencies to communicate with one terminal. This is referred to as a dual connectivity (DC) scenario. A base station involved in DC may assume two different roles for a specific terminal. A base station may either act as a master eNB (MeNB) (primary controller) or as a secondary eNB (SeNB). A master cell group (MCG) is defined as a group of serving cells associated with the MeNB, and includes the PCell and optionally one or more SCells. A secondary cell group (SCG) is defined as a group of serving cells associated with the SeNB, and includes the primary SCell (PSCell) (primary controller of the SCG) and optionally one or more SCells.

Figure 1D:
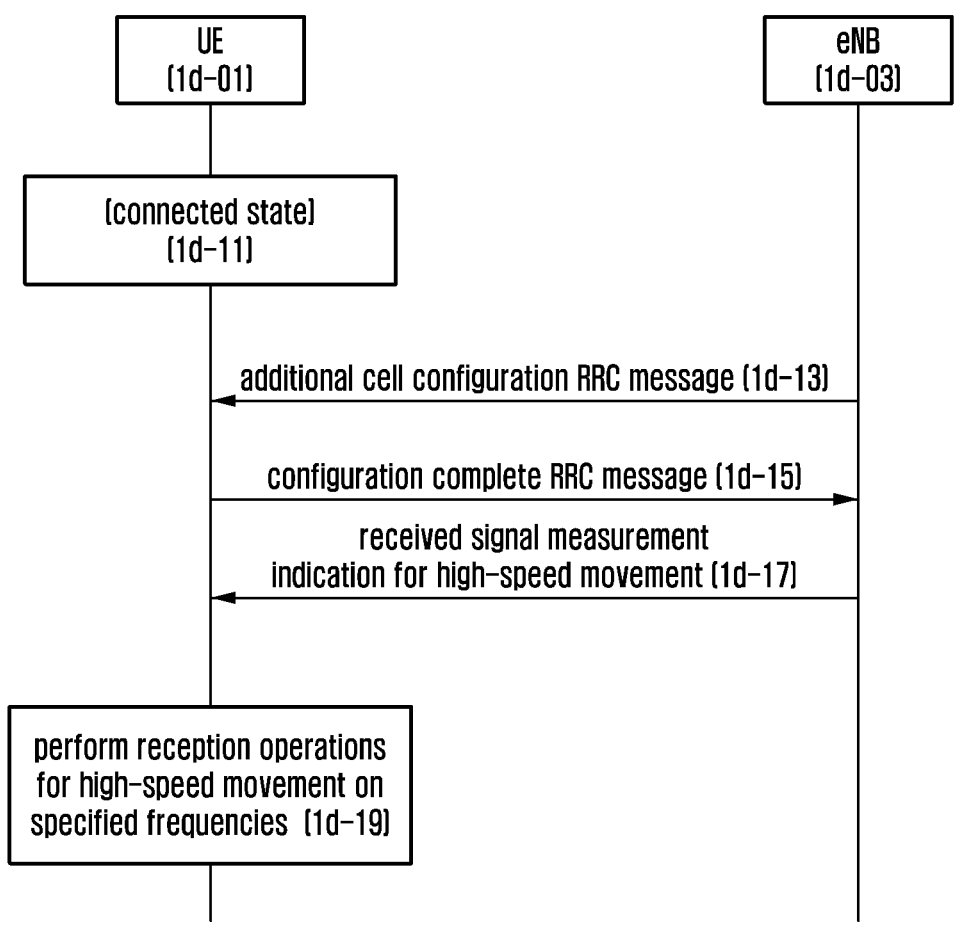
FIG. 1D is a sequence diagram illustrating a flow of messages between a terminal and a base station when a scheme proposed according to an embodiment of the present disclosure.

FIG. 1D is a sequence diagram illustrating a flow of messages between a terminal and a base station when a scheme proposed according to an embodiment of the present disclosure.

Referring to FIG. 1D, it is assumed that a terminal 1d-01 is already connected to a base station 1d-03 and can transmit and receive data at operation 1d-11.

The terminal 1d-01 receives an RRC message indicating additional cell configuration from the base station 1d-03 at operation 1d-13. The additional cell configuration may indicate adding a SCell associated with the same base station as in the case of CA, or adding a PSCell or SCell associated with a different base station as in the case of DC. This configuration message may include physical layer channel information for the SCell/PSCell to be added. The RRC message may be an RRConnectionReconfiguration message of the RRC layer. After receiving the message, the terminal 1d-01 may transmit a confirmation message indicating successful reception of the configuration message at operation 1d-15. The confirmation message may be an RCConnectionReconfigurationComplete message of the RRC layer.

Before or after reception of the additional cell configuration indication and transmission of the confirmation message, the terminal 1d-01 may receive a received signal measurement indication for high-speed movement from the PCell of the base station 1d-03 at operation 1d-17. This indication may be carried by a system information block (SIB) that is broadcast by the base station 1d-03 to all terminals in the cell. This indication may be included in the SIB for the current serving cell, and may also be included in the SIB for the neighbor cell/frequency.

Upon reception of the above indication, the terminal measures the signal of a preset frequency by using an enhanced measurement scheme for high-speed movement at operation 1d-19. In the enhanced measurement scheme for high-speed movement, the measurement period may be shortened or the frequency bandwidth to be measured may be adjusted, compared with the existing normal measurement scheme.

The preset frequency may be the same or different for the cases of CA and DC.

In Embodiment 1-1, commonly for CA and DC, if the above indication is received from the PCell, the enhanced measurement scheme for high-speed movement is used only for measuring the PCell and the neighbor cell using the same frequency as the PCell, and the existing normal measurement scheme is used for measuring the other cells with different frequencies (i.e., SCell, PSCell).

In Embodiment 1-2, for CA, if the above indication is received from the PCell, the enhanced measurement scheme for high-speed movement is used only for measuring the PCell, the currently activated and used SCell, and the neighbor cell using the same frequency as the PCell or the SCell, and the existing normal measurement scheme is used for measuring the other cells with different frequencies. In the case of DC, the enhanced measurement scheme for high-speed movement is used only for measuring the PCell, the PSCell, the currently activated and used SCell, and the neighbor cell using a frequency identical thereto, and the existing normal measurement scheme is used for measuring the other cells with different frequencies.

In Embodiment 1-3, for CA, if the above indication is received from the PCell, the enhanced measurement scheme for high-speed movement is used only for measuring the PCell, the currently activated and used SCell, and the neighbor cell using the same frequency as the PCell or the SCell, and the existing normal measurement scheme is used for measuring the other cells with different frequencies (i.e., the same as Embodiment 1-2 for CA).

Extending this to the case of DC, if the above indication is received from the PCell or the PSCell, the enhanced measurement scheme for high-speed movement is used only for measuring the PCell, the activated SCell among SCells belonging to the MCG, and the neighbor cell using the same frequency as the PCell or the MCG SCell, the enhanced measurement scheme for high-speed movement is used only for measuring the PSCell, the activated SCell among SCells belonging to the SCG, and the neighbor cell using the same frequency as the PSCell or the SCG SCell, and the existing normal measurement scheme is used for measuring the other cells with different frequencies.

Figure 1E:
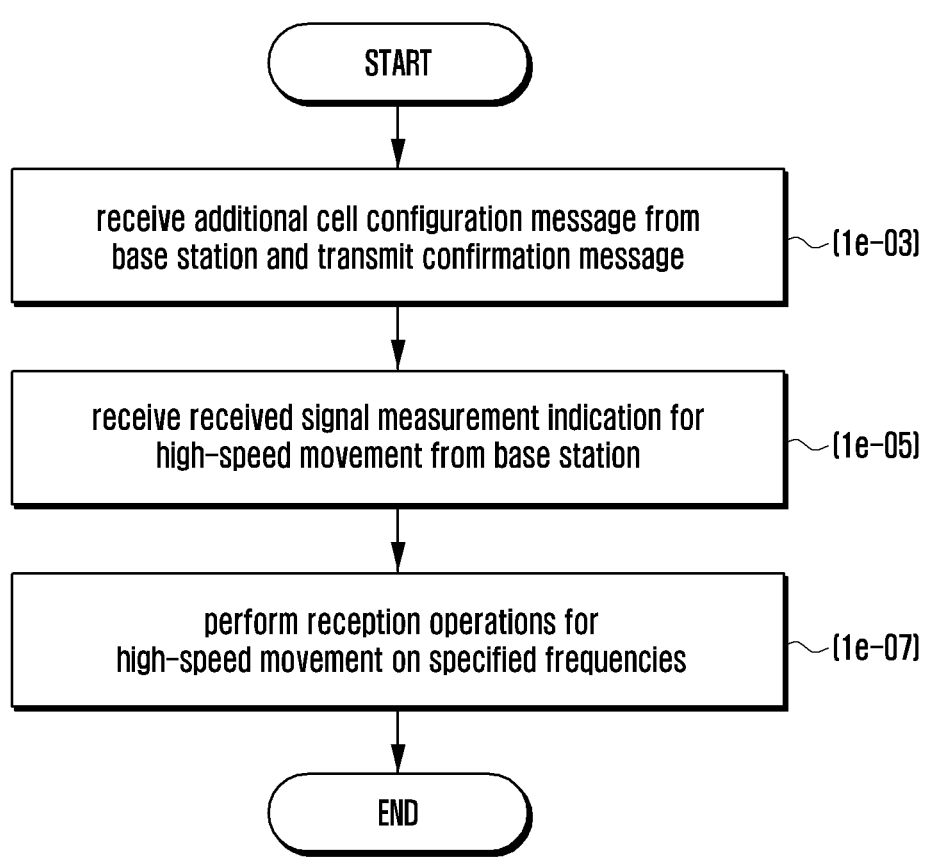
FIG. 1E is a flowchart illustrating a sequence of operations of a terminal in a connected state when a scheme proposed according to an embodiment of the present disclosure.

FIG. 1E is a flowchart illustrating a sequence of operations of a terminal when a scheme proposed according to an embodiment of the present disclosure.

Referring to FIG. 1E, it is assumed that the terminal is already connected to the base station and can transmit and receive data.

The terminal receives an RRC message indicating additional cell configuration from the base station at operation 1e-03. The additional cell configuration may indicate adding a SCell associated with the same base station as in the case of CA, or adding a PSCell or SCell associated with a different base station as in the case of DC. This configuration message may include physical layer channel information for the SCell/PSCell to be added. The RRC message may be an RRConnectionReconfiguration message of the RRC layer. Upon reception of the message, the terminal may transmit a confirmation message indicating successful reception of the configuration message. The confirmation message may be an RCConnectionReconfigurationComplete message of the RRC layer.

Before or after reception of the additional cell configuration indication and transmission of the confirmation message, the terminal may receive a received signal measurement indication for high-speed movement from the PCell of the base station at operation 1e-05. This indication may be carried by a SIB that is broadcast by the base station to all terminals in the cell. This indication may be included in the SIB for the current serving cell, and may also be included in the SIB for the neighbor cell/frequency.

Upon reception of the above indication, the terminal measures the signal of a preset frequency by using an enhanced measurement scheme for high-speed movement at operation 1e-07. In the enhanced measurement scheme for high-speed movement, the measurement period may be shortened or the frequency bandwidth to be measured may be adjusted, compared with the existing normal measurement scheme.

The preset frequency may be the same or different for the cases of CA and DC.

In Embodiment 1-1, commonly for CA and DC, if the above indication is received from the PCell, the enhanced measurement scheme for high-speed movement is used only for measuring the PCell and the neighbor cell using the same frequency as the PCell, and the existing normal measurement scheme is used for measuring the other cells with different frequencies (i.e., SCell, PSCell).

In Embodiment 1-2, for CA, if the above indication is received from the PCell, the enhanced measurement scheme for high-speed movement is used only for measuring the PCell, the currently activated and used SCell, and the neighbor cell using the same frequency as the PCell or the SCell, and the existing normal measurement scheme is used for measuring the other cells with different frequencies. Extending this to the case of DC, the enhanced measurement scheme for high-speed movement is used only for measuring the PCell, the PSCell, the currently activated and used SCell, and the neighbor cell using a frequency identical thereto, and the existing normal measurement scheme is used for measuring the other cells with different frequencies.

In Embodiment 1-3, for CA, if the above indication is received from the PCell, the enhanced measurement scheme for high-speed movement is used only for measuring the PCell, the currently activated and used SCell, and the neighbor cell using the same frequency as the PCell or the SCell, and the existing normal measurement scheme is used for measuring the other cells with different frequencies (i.e., the same as Embodiment 1-2 for CA). Extending this to the case of DC, if the above indication is received from the PCell or the PSCell, the enhanced measurement scheme for high-speed movement is used only for measuring the PCell, the activated SCell among SCells belonging to the MCG, and the neighbor cell using the same frequency as the PCell or the MCG SCell, the enhanced measurement scheme for high-speed movement is used only for measuring the PSCell, the activated SCell among SCells belonging to the SCG, and the neighbor cell using the same frequency as the PSCell or the SCG SCell, and the existing normal measurement scheme is used for measuring the other cells with different frequencies.

Figure 1F:
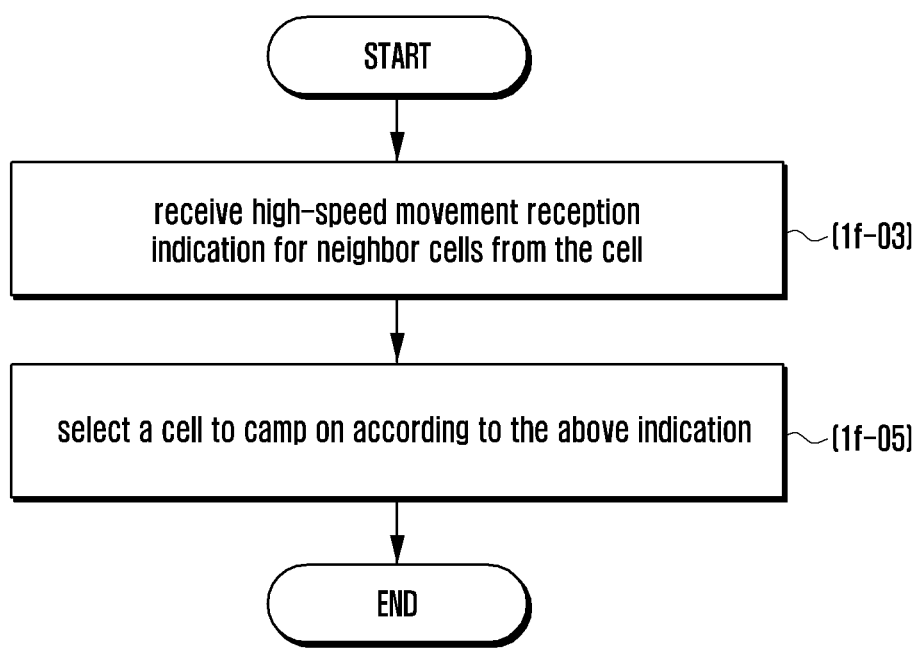
FIG. 1F is a flowchart illustrating a sequence of operations of a terminal in an idle state when a scheme proposed according to an embodiment of the present disclosure.

FIG. 1F is a flowchart illustrating a sequence of operations of a terminal in an idle state when a scheme proposed according to an embodiment of the present disclosure.

Referring to FIG. 1F, unlike the terminal in the connected state described above, the terminal in the idle state is not connected to the base station and cannot transmit or receive data, but it may select an appropriate cell according to information broadcast by the base station and monitor whether there is data coming from the network while camping on the selected cell (receives a paging message at regular intervals and determines whether there is downlink data to be received).

While camping on a suitable cell selected from plural cells around the terminal according to a preset condition, the terminal receives a high-speed movement reception indication for neighbor frequencies and cells from the SIB broadcasted by the suitable cell at operation 1f-03. For example, assume that the frequencies f1, f2, f3, f4, f5 are used (in order of low to high frequency), the base station operates at the frequency f4, and the indication transmitted by the base station indicates that enhanced measurement operation for high-speed movement is required for the frequencies f1, f2, f3.

Upon receiving the above indication, the terminal reselects a cell to camp on according to the following condition and camps on the reselected cell at operation 1f-05.

For example, as an option, for reselection, cells indicated by the reception indication for high-speed movement are selected with high priority among the neighbor cells. In the above example, the terminal may first select the cells operating at f1, f2 and f3. Here, points (or offsets) may be assigned to the cells operating at f1, f2 and f3 for priority in reselection. Alternatively, priority values may be assigned to individual frequencies and the terminal may select a cell operating at f1, f2 or f3 and satisfying a given condition (the minimum condition for operation).

As another option, when there are cells operating at f1, f2 and f3 as described above, it is possible to select a cell with the lowest operating frequency among them.

As another option, for reselection, it is possible to assign a priority to a specific radio access technology (RAT). For example, when f1 and f2 are used for LTE and f3 is used for NR (new radio or fifth generation (5G) mobile communication), the terminal can reselect a cell according to a preset priority or reselect a cell according to the priority indicated by the SIB message from the base station and the priority assigned to the RAT. If the preset or SIB message assigns a higher priority to LTE than to NR, the terminal can reselect one of the cells operating at f1 or f2. If the condition for selecting the lowest frequency is further considered, the terminal can reselect one of the cells operating at f1.

Figure 1G:
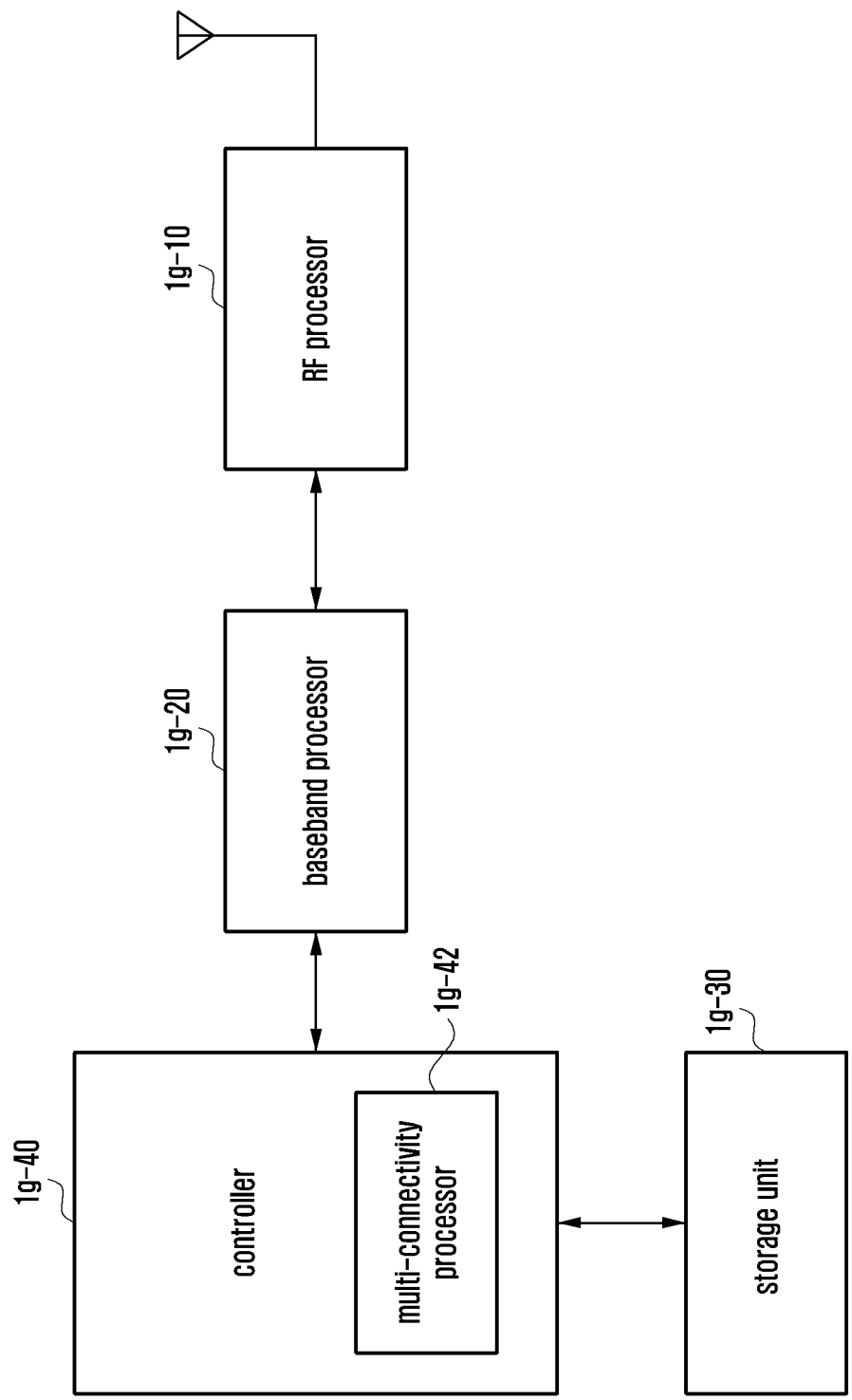
FIG. 1G is a block diagram of a terminal in a wireless communication system according to an embodiment of the present disclosure.

FIG. 1G is a block diagram of a terminal in a wireless communication system according to an embodiment of the present disclosure.

Referring to FIG. 1G, the terminal may include a radio frequency (RF) processor 1g-10, a baseband processor 1g-20, a storage unit 1g-30, and a controller 1g-40.

The RF processor 1g-10 performs a function for transmitting and receiving a signal through a wireless channel, such as signal conversion between bands and amplification. For example, the RF processor 1g-10 upconverts a baseband signal from the baseband processor 1g-20 into an RF signal and transmits the RF signal through an antenna, and downconverts an RF signal received through the antenna into a baseband signal.

For example, the RF processor 1g-10 may include a transmit filter, a receive filter, an amplifier, a mixer, an oscillator, a digital to analog convertor (DAC), and an analog to digital convertor (ADC). Although only one antenna is shown in FIG. 1G, the terminal may have a plurality of antennas. The RF processor 1g-10 may include a plurality of RF chains. Further, the RF processor 1g-10 may perform beamforming. For beamforming, the RF processor 1g-10 may adjust the phase and magnitude of each of the signals transmitted and received through multiple antennas or antenna elements.

The baseband processor 1g-20 performs a function for conversion between a baseband signal and a bit string according to the physical layer standard of the system. For example, when transmitting data, the baseband processor 1g-20 generates complex symbols by encoding and modulating a transmission bit string. When receiving data, the baseband processor 1g-20 reconstructs a reception bit string by demodulating and decoding a baseband signal from the RF processor 1g-10. More specifically, in an OFDM scheme, when transmitting data, the baseband processor 1g-20 generates complex symbols by encoding and modulating a transmission bit string, maps the complex symbols to subcarriers, and generates OFDM symbols through inverse fast fourier transform (IFFT) and cyclic prefix (CP) insertion. When receiving data, the baseband processor 1g-20 divides the baseband signal from the RF processor 1g-10 into OFDM symbols, recovers signals mapped to subcarriers through FFT (fast Fourier transform), and reconstructs a reception bit string through demodulation and decoding.

As described above, the baseband processor 1g-20 and the RF processor 1g-10 transmit and receive signals. Hence, the baseband processor 1g-20 and the RF processor 1g-10 may be referred to as a transmitter, receiver, transceiver, or communication unit. At least one of the baseband processor 1g-20 and the RF processor 1g-10 may include a plurality of communication modules to support different radio access technologies. At least one of the baseband processor 1g-20 and the RF processor 1g-10 may include different communication modules to process signals of different frequency bands. For example, the different radio access technologies may include a wireless local area network (LAN) technology (e.g., institute of electrical and electronics engineers (IEEE 802.11) and a cellular network technology (e.g., LTE). The different frequency bands may include super-high frequency (SHF) bands (e.g., 2.5 GHz, 5 GHz) and millimeter (mm) wave bands (e.g., 60 GHz).

The storage unit 1g-30 stores basic programs, application programs, and data, such as configuration information for the operation of the terminal. More particularly, the storage unit 1g-30 may store information on wireless LAN nodes performing wireless communication using wireless LAN access technology. The storage unit 1g-30 provides stored data at the request of the controller 1g-40.

The controller 1g-40 controls the overall operation of the terminal. For example, the controller 1g-40 transmits and receives a signal through the baseband processor 1g-20 and the RF processor 1g-10. The controller 1g-40 writes and reads data to and from the storage unit 1g-30. To this end, the controller 1g-40 may include at least one processor. For example, the controller 1g-40 may include a communication processor (CP) to control communication and an application processor (AP) to control the higher layers, such as application programs. In one embodiment, the controller 1g-40 includes a multi-connectivity processor 1g-42 to process operations in the multi-connectivity mode. For instance, the controller 1g-40 can control the terminal to perform the terminal-related procedure shown in FIG. 1E.

In one embodiment, upon receiving an enhancement measurement indication for high-speed movement from the PCell of the base station, the controller 1g-40 controls the terminal to measure the cells operating at preset frequencies by using the enhanced measurement scheme.

The methods conforming to the embodiments described in the claims or specification of the present disclosure may be implemented as hardware, software, or a combinational thereof.

For software implementation, there may be provided a computer-readable storage medium storing one or more programs (software modules). The one or more programs stored in the computer-readable storage medium may be configured for execution by one or more processors of the electronic device. The one or more programs include instructions that cause the electronic device to execute the methods conforming to the embodiments described in the claims or specification of the present disclosure.

These programs (software modules or software) may be stored in a random access memory (RAM), a non-volatile memory like a flash memory, a read only memory (ROM), an electrically erasable programmable ROM (EEPROM), a magnetic disc storage device, a compact disc ROM (CD-ROM), a digital versatile disc (DVD), an optical storage device of a different type, and a magnetic cassette. Or, the above programs may be stored in a memory including a combination of some or all thereof. In addition, each component memory may include a plurality of memories.

In addition, the above programs may be stored in an attachable storage device that may be accessed through the Internet, an intranet, a LAN, a wireless LAN (WLAN), a storage area network (SAN), or a communication network including a combination thereof. This storage device may be connected through an external port to the electronic device carrying out an embodiment of the present disclosure. In addition, a separate storage device on a communication network may be connected to the electronic device carrying out an embodiment of the present disclosure.

In the above embodiments of the present disclosure, the elements included in the disclosure are expressed in a singular or plural form according to the proposed specific embodiment. However, the singular or plural expression is appropriately selected for ease of description according to the presented situation, and the present disclosure is not limited to a single element or plural elements. Those elements described in a plural form may be configured as a single element, and those elements described in a singular form may be configured as plural elements.

Although various embodiments of the present disclosure have been described in detail hereinabove, it should be understood that many variations and modifications of the basic inventive concept described herein will still fall within the spirit and scope of the present disclosure as defined in the appended claims and their equivalents.

Second Embodiment

Figure 2A:
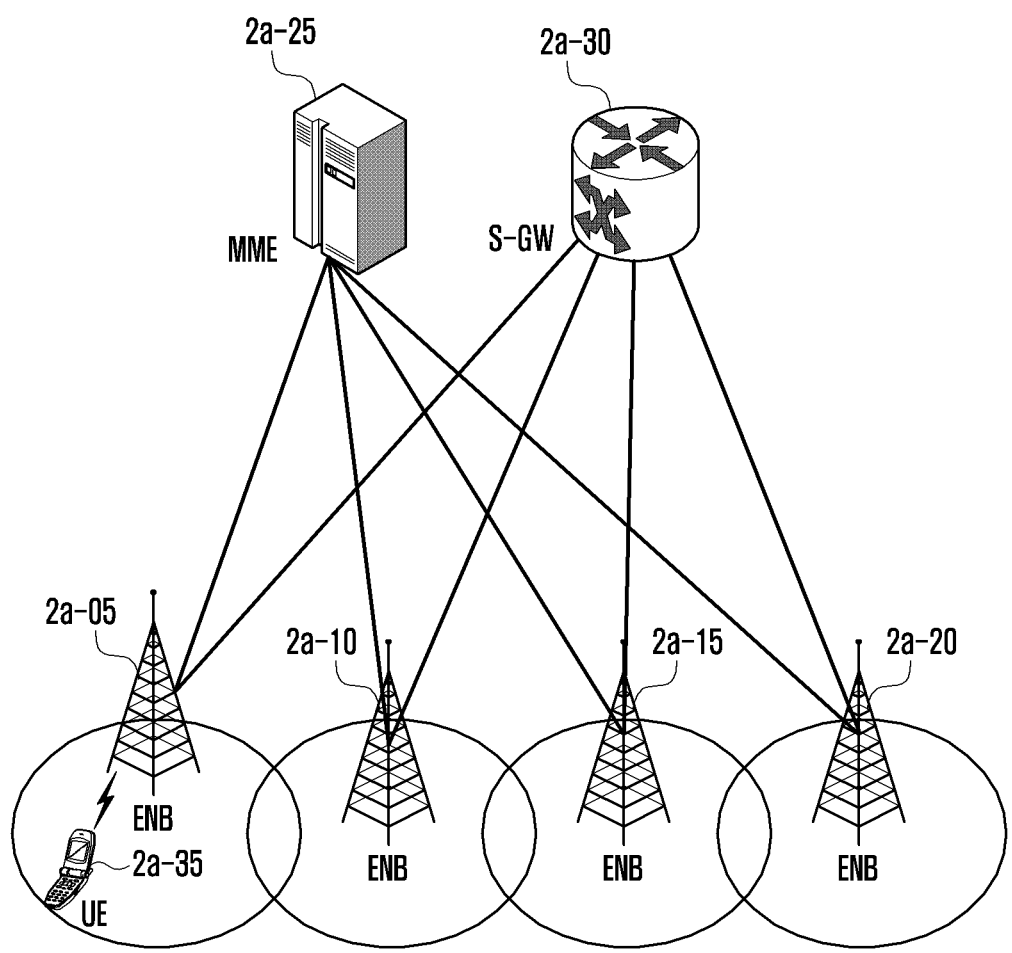
FIG. 2A illustrates an architecture of an LTE system according to an embodiment of the present disclosure.

FIG. 2A illustrates an architecture of an LTE system according to an embodiment of the present disclosure.

Referring to FIG. 2A, the wireless communication system may include multiple base stations ENBs 2a-05, 2a-10, 2a-15 and 2a-20, an MME 2a-25, and an S-GW 2a-30. A UE or terminal 2a-35 may connect to an external network through the ENBs 2a-05, 2a-10, 2a-15 and 2a-20 and the S-GW 2a-30.

The base stations 2a-05, 2a-10, 2a-15 and 2a-20 are access nodes of the cellular network and provide wireless access services to terminals accessing the network. For example, to service user traffic, the base stations 2a-05, 2a-10, 2a-15 and 2a-20 schedule the terminals based on collected status information related to buffers, transmission powers and channels of the terminals, and support communication between the terminals and the CN.

The MME 2a-25 is connected to multiple base stations and performs various control functions including mobility management for terminals. The S-GW 2a-30 is a functional entity providing data bearers. The MME 2a-25 and the S-GW 2a-30 can perform authentication and bearer management for terminals accessing the network, and process packets arriving from the base stations 2a-05, 2a-10, 2a-15 and 2a-20 and packets to be sent to the base stations 2a-05, 2a-10, 2a-15 and 2a-20.

Figure 2B:
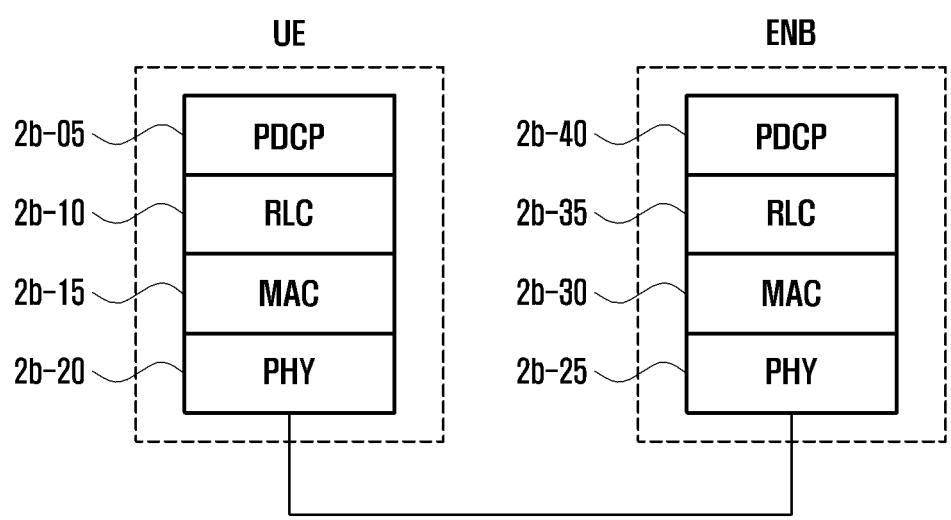
FIG. 2B illustrates a structure of wireless protocols in an LTE system according to an embodiment of the present disclosure.

FIG. 2B illustrates a structure of wireless protocols in an LTE system according to an embodiment of the present disclosure. The wireless protocol structure shown in FIG. 2B may be somewhat different from that to be defined for the NR in the future, but it is described for the purpose of description of the present disclosure.

Referring to FIG. 2B, in the LTE system, a UE and an ENB each include a wireless protocol stack including PDCP 2b-05 or 2b-40, RLC 2b-10 or 2b-35, and MAC 2b-15 or 2b-30. The PDCP 2b-05 or 2b-40 performs compression and decompression of IP headers. The RLC 2b-10 or 2b-35 reconfigures PDCP PDUs to a suitable size.

The MAC 2b-15 or 2b-30 is connected with multiple RLC layer entities in a UE. The MAC 2b-15 or 2b-30 multiplexes RLC PDUs into MAC PDUs and demultiplexes MAC PDUs into RLC PDUs. The PHY layer 2b-20 or 2b-25 converts higher layer data into OFDM symbols by means of channel coding and modulation and transmits the OFDM symbols through a wireless channel, and converts OFDM symbols received through a wireless channel to higher layer data by means of demodulation and channel decoding and forwards the data to the higher layers. For additional error correction at the physical layer, HARQ is used, and the receiver side transmits a 1-bit indication indicating whether it has received packets from the transmitter side. This information is referred to as HARQ ACK/NACK. Downlink HARQ ACK/NACK information for uplink transmission may be transmitted via PHICH). Uplink HARQ ACK/NACK information for downlink transmission may be transmitted via PUCC or PUSCH.

Although not shown, the RRC layer exists on top of the PDCP layer of each of the terminal and the base station. The RRC layers can exchange connection and measurement setup control messages for controlling radio resources. For example, the base station can instruct the terminal to perform measurement via an RRC layer message, and the terminal can report the measurement result to the base station via an RRC layer message.

Figure 2C:
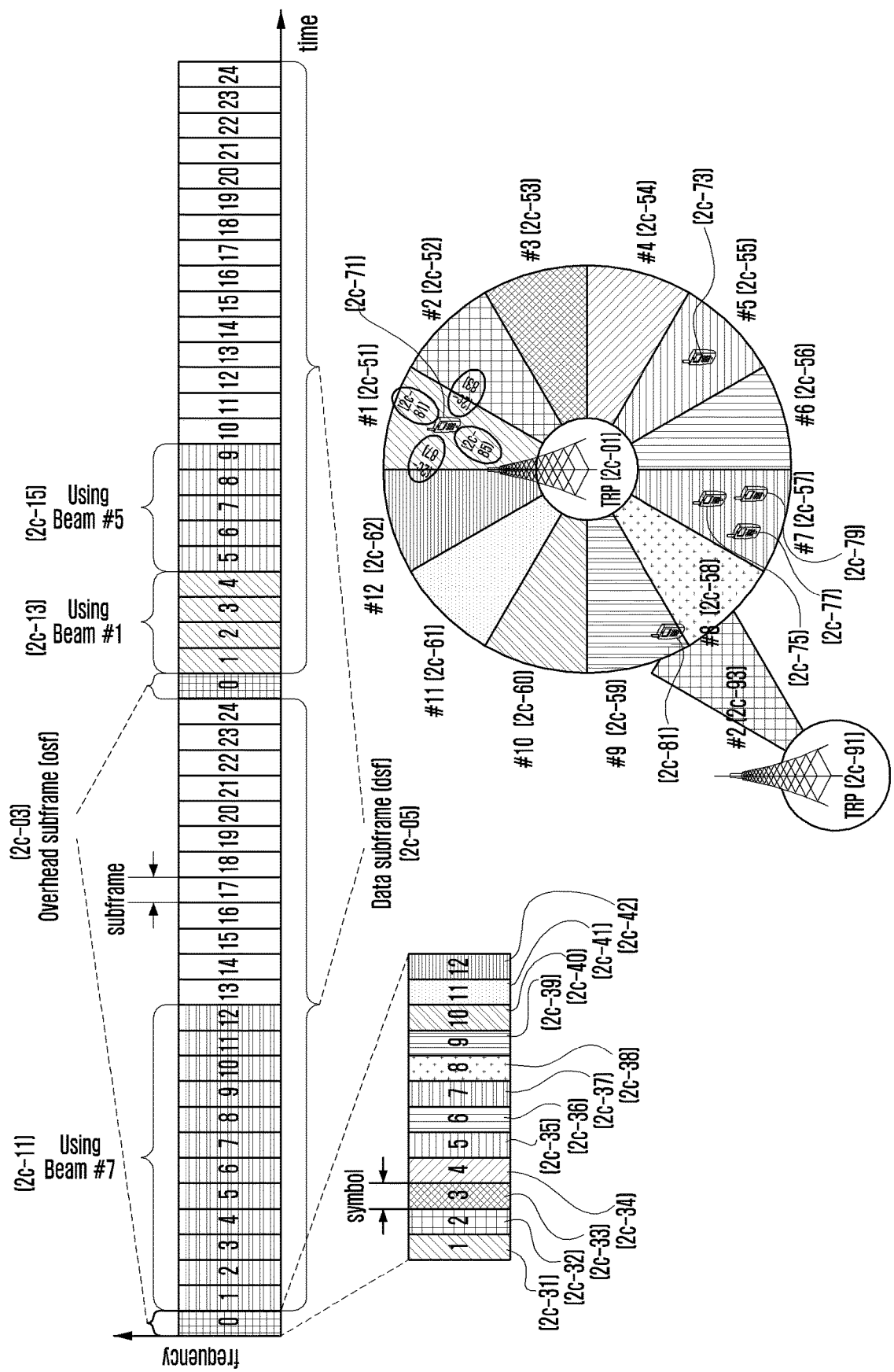
FIG. 2C illustrates a frame structure used by a fifth generation (5G) system according to an embodiment of the present disclosure.

FIG. 2C illustrates a frame structure used by a 5G system according to an embodiment of the present disclosure.

Referring to FIG. 2C, in the 5G system, for high transmission rates, the use of high frequencies can be considered to ensure wide bandwidths. Since it is difficult to transmit signals using high frequencies, it is possible to consider utilizing beams for data transmission.

As such, it is possible to consider a scenario in which the base station or transmission reception point (TRP) 2c-01 communicates with terminals 2c-71, 2c-73, 2c-75, 2c-77 and 2c-79 in the cell using different beams. For example, in FIG. 2C, it is assumed that terminal 1 (2c-71) communicates using beam #1 (2c-51), terminal 2 (2c-73) communicates using beam #5 (2c-55), and terminals 3, 4, 5 (2c-75) (2c-77) (2c-79) communicate using beam #7 (2c-57).

To identify the beams used by terminals to communicate with the TRP, an overhead subframe (OSF) (2c-03) is present in the time domain. In the OSF, the base station transmits a reference signal using a different beam for each symbol (or over several symbols). In FIG. 2C, it is assumed that the base station uses 12 beams from beam #1 (2c-51) to beam #12 (2c-62) for transmission, and a different beam is swept and transmitted for each symbol in the OSF. For example, as one beam is transmitted at each symbol (e.g., transmission of beam #1 (2c-51) at the first symbol 2c-31) in the OSF, the terminal can measure the OSF and identify the beam with the highest signal strength among the beams transmitted in the OSF. In the present disclosure, the beam that is constantly transmitted in the OSF as described above is referred to as a common beam.

Referring to FIG. 2C, it is assumed that the OSF is repeated every 25 subframes and the remaining 24 subframes are data subframes (DSFs) 2c-05 in which regular data is transmitted and received. Moreover, the frame structure includes beam #7 (2c-11), beam #1 (2c-13), and beam #5 (2c-15). The first frame 0 of the frame structure includes 12 symbols: the first symbol (2c-31), a second symbol (2c-32), a third symbol (2c-33), a fourth symbol (2c-34), a fifth symbol (2c-35), a sixth symbol (2c-36), a seventh symbol (2c-37), an eighth symbol (2c-38), a ninth symbol (2c-39), a tenth symbol (2c-40), an eleventh symbol (2c-41), and a twelfth symbol (2c-42).

According to scheduling of the base station, terminals 3, 4, 5 (2c-75) (2c-77) (2c-79) may communicate commonly using beam #7, terminal 1 (2c-71) may communicate using beam #1, and terminal 2 (2c-73) may communicate using beam #5.

In addition, since the beam used in the DSF is a beam used for a terminal connected to the base station, the beam direction can be adjusted more finely according to the position of the terminal for data transmission and reception. To this end, the terminal may report the strength/quality of the signal transmitted through each beam, enabling the base station to make further adjustments. A series of procedures for finely adjusting the beam as described above is called beam refinement. Through beam refinement, the base station can transmit and receive data using a beam better suited to the direction of the terminal, which may be different from the direction and/or width of the beam transmitted in the OSF. In the present disclosure, the beam specialized to a specific terminal through beam refinement is referred to as a dedicated beam. It is assumed that the dedicated beam can be used only in the connected mode described below.

Although FIG. 2C mainly shows 12 transmission beams 2c-51 to 2c-62 of the base station, a terminal may have reception beams to receive the transmission beams of the base station (e.g., terminal 1 (2c-71) has four reception beams 2c-81, 2c-83, 2c-85, 2c-87). Terminal 1 having four beams 2c-81, 2c-83, 2c-85, 2c-87 may perform beam sweeping to identify the beam with the best reception performance. Here, if multiple beams cannot be used at the same time, by receiving multiple OSFs as many as the number of reception beams (one reception beam for each OSF), it is possible to find an optimal pair of the transmission beam of the base station and the reception beam of the terminal.

In addition, it is possible to consider such a case where terminal 6 (2c-81) is located at the boundary of each beam coverage. More particularly, terminal 6 (2c-81) is located between beam #8 (2c-58) and beam #9 (2c-59) of the current base station 2c-01 and may receive the signal of beam #2 (2c-93) of another base station 2c-91. In this situation, if terminal 6 performs signal measurement, the signal strength of beam #2 (2c-93) of the different base station 2c-91 will be highest. If the terminal measures and reports only one beam, the base station may misunderstand the channel conditions. For example, although the signal strength of beam #2 (2c-93) is highest, it is necessary for the terminal to send a measurement report for beam #8 (2c-58) and beam #9 (2c-59) together with beam #2 (2c-93) so that the base station does not issue an unnecessary handover command to the terminal (i.e., handover from base station 2c-01 to base station 2c-91).

Figure 2D:
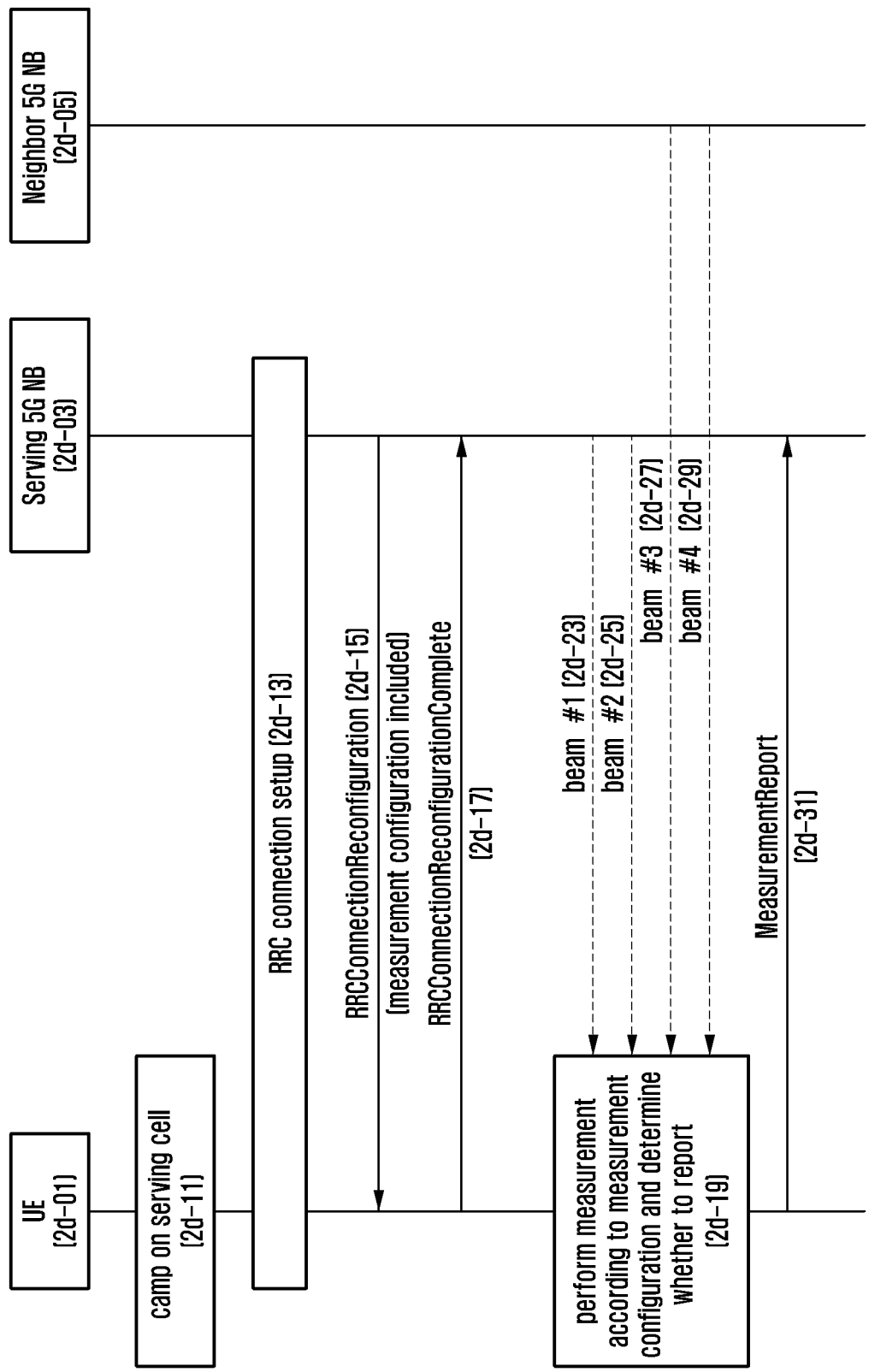
FIG. 2D is a sequence diagram illustrating a flow of messages between a terminal and a base station when a scheme proposed according to an embodiment of the present disclosure.

FIG. 2D is a sequence diagram illustrating a flow of messages between a terminal and a base station when a beam to be measured is selectively determined according to measurement configuration according to an embodiment of the present disclosure.

Referring to FIG. 2D, a terminal 2d-01 in the idle mode (RRC_IDLE) finds a suitable cell and camps on the corresponding base station at operation 2d-11. Upon generation of data to be sent or the like, the terminal 2d-01 connects to the base station at operation 2d-13. In the idle mode, data cannot be transmitted because the terminal is not connected to the network for power saving or the like. To transmit data, the terminal has to make a transition to the connected mode (RRC_CONNECTED). When the terminal camps on a cell, it remains in the cell and receives a paging message to monitor whether downlink data is transmitted. When the terminal 2d-01 succeeds in connecting to a base station 2d-03, it makes a transition to the connected mode (RRC_CONNECTED). The terminal 2d-01 in the connected mode may transmit and receive data to and from the base station 2d-03.

As the terminal in the connected mode moves in or out of the cell, it may be necessary to instruct the terminal to transmit and receive to and from another beam/cell/base station. To this end, the base station 2d-03 transmits a measurement configuration indication at operation 2d-15. This measurement configuration indication indicates measurement for neighbor beams at the same TRP (intra-TRP) of the serving beam or the same cell, neighbor beams at a different TRP (inter-TRP) of the same cell, or neighbor beams of a different cell. The measurement configuration indication may include at least one of the following pieces of information.

Measurement report triggering condition: the measurement result of the neighbor cell group is offset better than that of the serving cell group (collective result of neighbor cell is offset better than collective result of serving cell)

OFFSET: the value of the above offset

OFFSET_qb: additional offset due to the difference in number (Thres_qb_diff) between the neighbor cell group and the serving cell group Thres_qb_diff difference in number between the neighbor cell group and the serving cell group Thres_Q (qualified beam threshold): the beam whose measurement result exceeds this threshold among the beams of the serving cell or neighbor cell becomes a qualified beam. The serving cell group is a set of qualified beams transmitted by the serving cell, and the neighbor cell group is a set of qualified beams transmitted by the neighbor cell.

Thres_MR: the threshold that determines whether to include a measurement result for a beam (greater or less than Thres_Q) in the measurement report Upon receiving the measurement configuration indication message, the terminal sends an RRC layer message indicating that the configuration information has been successfully received. This RRC layer message may be the RRCConnectionReconfigurationComplete message at operation 2d-17.

Thereafter, the terminal performs measurement according to the measurement configuration and determines whether to send a measurement report to the base station according to the measurement configuration at operation 2d-19.

As to the measurement report triggering condition, the terminal determines whether the following condition is satisfied.

Mn+OFFSET_qb (if applicable)>Ms+OFFSET+OFFSET_qb (if applicable)

The parameters in the above condition are as follows.

Mn: measurement result for qualified beams of one neighbor cell. For example, this may be the sum, average, or weighted average of measurement results for individual qualified beams of a neighbor cell Ms: measurement result for qualified beams of the current serving cell. For example, this may be the sum, average, or weighted average of measurement results for individual qualified beams of the serving cell.

In the above condition, as described before, OFFSET_qb is an additional offset due to the difference in number (Thres_qb_diff) between the neighbor cell group and the serving cell group. Addition of OFFSET_qb is determined as follows.

If the difference in the number of qualified beams between the serving cell and the neighbor cell is less than Thres_qb_diff, OFFSET_qb is not added.

If the number of qualified beams of the serving cell is Thres_qb_diff greater than or equal to the number of qualified beams of the neighbor cell, OFFSET_qb is added to the measurement result of the serving cell (i.e., right side of the above condition).

If the number of qualified beams of the neighbor cell is Thres_qb_diff greater than or equal to the number of qualified beams of the serving cell, OFFSET_qb is added to the measurement result of the neighbor cell (i.e., left side of the above condition).

For example, assume that the terminal receives a beam from each base station in FIG. 2D, signal strengths of beam #1 at operation 2d-23, beam #2 at operation 2d-25, beam #3 at operation 2d-27, and beam #4 at operation 2d-29 are 50, 50, 60 and 30, respectively, and Thres_Q is 40. In this case, beam #1 and beam #2 are qualified beams of the serving cell, and beam #3 is a qualified beam of a neighbor 5G NB 2d-05 transmitted at operation 2d-27. If Mn and Ms are average values, and OFFSET is 0, the value of Ms becomes 50 and the value of Mn becomes 60, so that Mn is greater than Ms. However, if Thres_qb_diff is 1, as the number of qualified beams of the serving cell is one greater than that of the neighbor cell, the value of OFFSET_qb (e.g., 20) may be added to the measurement result of the serving cell. As a result, the measurement result of the serving cell becomes 70, and the measurement result of the neighbor cell becomes 60. Hence, the above measurement report triggering condition is not satisfied, and the corresponding measurement report is not sent to the base station. Thereby, the base station does not have to receive an unnecessary measurement report.

If the measurement results satisfy the measurement report triggering condition described above, the terminal transmits a corresponding measurement report to the base station at operation 2d-31. Here, the RRC layer MeasurementReport message may be used. This message may include the following information.

Measurement results for the serving cell

The value of Ms (i.e., sum/average/weighted average for qualified beams of serving cell)

Identifiers and measurement values of beams satisfying Thres_MR

Up to N results included, where N is set by the measurement configuration of the base station or is a preset value (e.g., 16).

The number of qualified beams of the serving cell

Measurement results for each neighbor cell

The value of Mn (i.e., sum/average/weighted average for qualified beams of corresponding neighbor cell)

Identifiers and measurement values of beams satisfying Thres_MR among the measured beams of corresponding neighbor cell Up to N results included, where N is set by the measurement configuration of the base station or is a preset value (e.g., 16).

The number of qualified beams of corresponding neighbor cell

Thereby, the base station can receive a measurement result from the terminal and issue a command, such as handover to the terminal.

FIG. 2E is a flowchart illustrating a sequence of operations of a terminal according to an embodiment of the present disclosure.

Referring to FIG. 2E, it is assumed that the terminal in the connected mode is already connected to the base station/cell and transmits and receives data to and from the beam of the cell at operation 2e-03.

As described above, for mobility management, the terminal in the connected mode receives a measurement configuration indication from the base station at operation 2e-05. The measurement configuration indication may include at least one of the following pieces of information.

Measurement report triggering condition: the measurement result of the neighbor cell group is offset better than that of the serving cell group (collective result of neighbor cell is offset better than collective result of serving cell)

OFFSET: the value of the above offset

OFFSET_qb: additional offset due to the difference in number (Thres_qb_diff) between the neighbor cell group and the serving cell group Thres_qb_diff difference in number between the neighbor cell group and the serving cell group Thres_Q (qualified beam threshold): the beam whose measurement result exceeds this threshold among the beams of the serving cell or neighbor cell becomes a qualified beam. The serving cell group is a set of qualified beams transmitted by the serving cell, and the neighbor cell group is a set of qualified beams transmitted by the neighbor cell.

Thres_MR: the threshold that determines whether to include a measurement result for a beam (greater or less than Thres_Q) in the measurement report Upon receiving the measurement configuration indication message, the terminal sends an RRC layer message indicating that the configuration information has been successfully received. This RRC layer message may be the RRCConnectionReconfigurationComplete message.

Thereafter, the terminal performs measurement according to the measurement configuration and determines whether measurement results satisfy the measurement report triggering condition at operation 2e-07.

As to the configured measurement report triggering condition, the terminal determines whether the following condition is satisfied.

Mn+OFFSET_qb (if applicable)>Ms+OFFSET+OFFSET_qb (if applicable)

The parameters in the above condition are as follows.

Mn: measurement result for qualified beams of one neighbor cell. For example, this may be the sum, average, or weighted average of measurement results for individual qualified beams of a neighbor cell Ms: measurement result for qualified beams of the current serving cell. For example, this may be the sum, average, or weighted average of measurement results for individual qualified beams of the serving cell.

In the above condition, as described before, OFFSET_qb is an additional offset due to the difference in number (Thres_qb_diff) between the neighbor cell group and the serving cell group. Addition of OFFSET_qb is determined as follows.

If the difference in the number of qualified beams between the serving cell and the neighbor cell is less than Thres_qb_diff, OFFSET_qb is not added.

If the number of qualified beams of the serving cell is Thres_qb_diff greater than or equal to the number of qualified beams of the neighbor cell, OFFSET_qb is added to the measurement result of the serving cell (i.e., right side of the above condition).

If the number of qualified beams of the neighbor cell is Thres_qb_diff greater than or equal to the number of qualified beams of the serving cell, OFFSET_qb is added to the measurement result of the neighbor cell (i.e., left side of the above condition).

For example, assume that the terminal receives a beam from each base station in the previous drawing, signal strengths of beam #1, beam #2, beam #3 and beam #4 are 50, 50, 60 and 30, respectively, and Thres_Q is 40. In this case, beam #1 and beam #2 are qualified beams of the serving cell, and beam #3 is a qualified beam of the neighbor cell. If Mn and Ms are average values, and OFFSET is 0, the value of Ms becomes 50 and the value of Mn becomes 60, so that Mn is greater than Ms. However, if Thres_qb_diff is 1, as the number of qualified beams of the serving cell is one greater than that of the neighbor cell, the value of OFFSET_qb (e.g., 20) may be added to the measurement result of the serving cell. As a result, the measurement result of the serving cell becomes 70, and the measurement result of the neighbor cell becomes 60. Hence, the above measurement report triggering condition is not satisfied, and the corresponding measurement report is not sent to the base station. Thereby, the base station does not have to receive an unnecessary measurement report.

If the measurement results satisfy the measurement report triggering condition described above at operation 2e-09, the terminal transmits a corresponding measurement report to the base station at operation 2e-11. Here, the RRC layer MeasurementReport message may be used. This message may include the following information.

Measurement results for the serving cell
The value of Ms (i.e., sum/average/weighted average for qualified beams of serving cell)
Identifiers and measurement values of beams satisfying Thres_MR
Up to N results included, where N is set by the measurement configuration of the base station or is a preset value (e.g., 16).
The number of qualified beams of the serving cell
Measurement results for each neighbor cell
The value of Mn (i.e., sum/average/weighted average for qualified beams of corresponding neighbor cell)
Identifiers and measurement values of beams satisfying Thres_MR among the measured beams of corresponding neighbor cell
Up to N results included, where N is set by the measurement configuration of the base station or is a preset value (e.g., 16).
The number of qualified beams of corresponding neighbor cell Thereby, the base station can receive a measurement result from the terminal and issue a command, such as handover to the terminal.

Figure 2F:
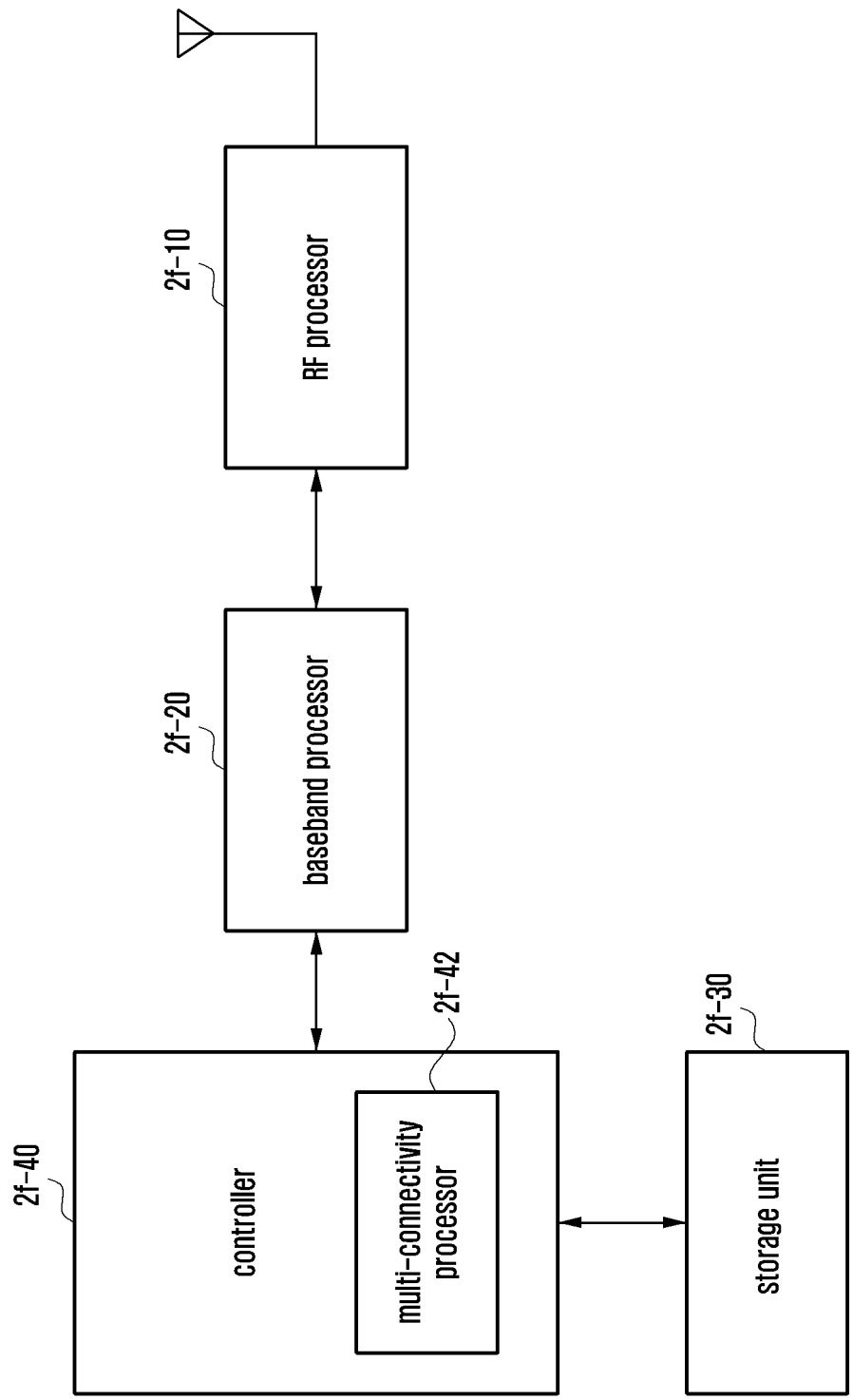
FIG. 2F is a block diagram of a terminal according to an embodiment of the present disclosure.

FIG. 2F is a block diagram of a terminal according to an embodiment of the present disclosure.

Referring to FIG. 2F, the terminal may include an RF processor 2f-10, a baseband processor 2f-20, a storage unit 2f-30, and a controller 2f-40.

The RF processor 2f-10 performs a function for transmitting and receiving a signal through a wireless channel, such as signal conversion between bands and amplification. For example, the RF processor 2f-10 upconverts a baseband signal from the baseband processor 2f-20 into an RF signal and transmits the RF signal through an antenna, and downconverts an RF signal received through the antenna into a baseband signal. For example, the RF processor 2f-10 may include a transmit filter, a receive filter, an amplifier, a mixer, an oscillator, a DAC, and an ADC. Although only one antenna is shown in FIG. 2F, the terminal may have a plurality of antennas. The RF processor 2f-10 may include a plurality of RF chains. Further, the RF processor 2f-10 may perform beamforming. For beamforming, the RF processor 2f-10 may adjust the phase and magnitude of each of the signals transmitted and received through multiple antennas or antenna elements.

The baseband processor 2f-20 performs a function for conversion between a baseband signal and a bit string according to the physical layer standard of the system. For example, when transmitting data, the baseband processor 2f-20 generates complex symbols by encoding and modulating a transmission bit string. When receiving data, the baseband processor 2f-20 reconstructs a reception bit string by demodulating and decoding a baseband signal from the RF processor 2f-10. More specifically, in an OFDM scheme, when transmitting data, the baseband processor 2f-20 generates complex symbols by encoding and modulating a transmission bit string, maps the complex symbols to subcarriers, and generates OFDM symbols through IFFT and CP insertion. When receiving data, the baseband processor 2f-20 divides the baseband signal from the RF processor 2f-10 into OFDM symbols, recovers signals mapped to subcarriers through FFT, and reconstructs a reception bit string through demodulation and decoding.

As described above, the baseband processor 2f-20 and the RF processor 2f-10 transmit and receive signals. Hence, the baseband processor 2f-20 and the RF processor 2f-10 may be referred to as a transmitter, receiver, transceiver, or communication unit. At least one of the baseband processor 2f-20 and the RF processor 2f-10 may include different communication modules to process signals of different frequency bands. The different frequency bands may include SHF bands (e.g., 2.5 GHz, 5 GHz) and mm wave bands (e.g., 60 GHz).

The storage unit 2*f*-30 stores basic programs, application programs, and data, such as configuration information for the operation of the terminal.

The controller 2*f*-40 controls the overall operation of the terminal. For example, the controller 2*f*-40 transmits and receives a signal through the baseband processor 2*f*-20 and the RF processor 2*f*-10. The controller 2*f*-40 writes and reads data to and from the storage unit 2*f*-30. To this end, the controller 2*f*-40 may include at least one processor. For example, the controller 2*f*-40 may include a CP to control communication and an AP to control the higher layers, such as application programs. In one embodiment, the controller 2*f*-40 includes a multi-connectivity processor 2*f*-42 to process operations in the multi-connectivity mode. For instance, the controller 2*f*-40 can control the terminal to perform the terminal-related procedure shown in FIG. 2F.

In one embodiment, the terminal connects to the base station and receives a measurement command message from the base station. Upon reception of the measurement command message, the controller of the terminal performs measurement according to the measurement events and conditions set by the base station and determines whether the condition for measurement report transmission is satisfied. If the condition for measurement report transmission is satisfied, the controller generates a message including the measurement results and transmits the generated message to the base station through the baseband processor and the RF processor.

The methods conforming to the embodiments described in the claims or specification of the present disclosure may be implemented as hardware, software, or a combinational thereof.

For software implementation, there may be provided a computer-readable storage medium storing one or more programs (software modules). The one or more programs stored in the computer-readable storage medium may be configured for execution by one or more processors of the electronic device. The one or more programs include instructions that cause the electronic device to carry out the methods conforming to the embodiments described in the claims or specification of the present disclosure.

These programs (software modules or software) may be stored in a RAM, a non-volatile memory like a flash memory, a ROM, an EEPROM, a magnetic disc storage device, a CD-ROM, a DVD, an optical storage device of a different type, and a magnetic cassette. Or, the above programs may be stored in a memory including a combination of some or all thereof. In addition, each component memory may include a plurality of memories.

In addition, the above programs may be stored in an attachable storage device that may be accessed through the Internet, an intranet, a LAN, a WLAN, a SAN, or a communication network including a combination thereof. This storage device may be connected through an external port to the electronic device carrying out an embodiment of the present disclosure. In addition, a separate storage device on a communication network may be connected to the electronic device carrying out an embodiment of the present disclosure.

In the above embodiments of the present disclosure, the elements included in the disclosure are expressed in a singular or plural form according to the proposed specific embodiment. However, the singular or plural expression is appropriately selected for ease of description according to the presented situation, and the present disclosure is not limited to a single element or plural elements. Those elements described in a plural form may be configured as a single element, and those elements described in a singular form may be configured as plural elements.

Although various embodiments of the present disclosure have been described in detail hereinabove, it should be understood that many variations and modifications of the basic inventive concept described herein will still fall within the spirit and scope of the present disclosure as defined in the appended claims and their equivalents.

Third Embodiment

Figure 3A:
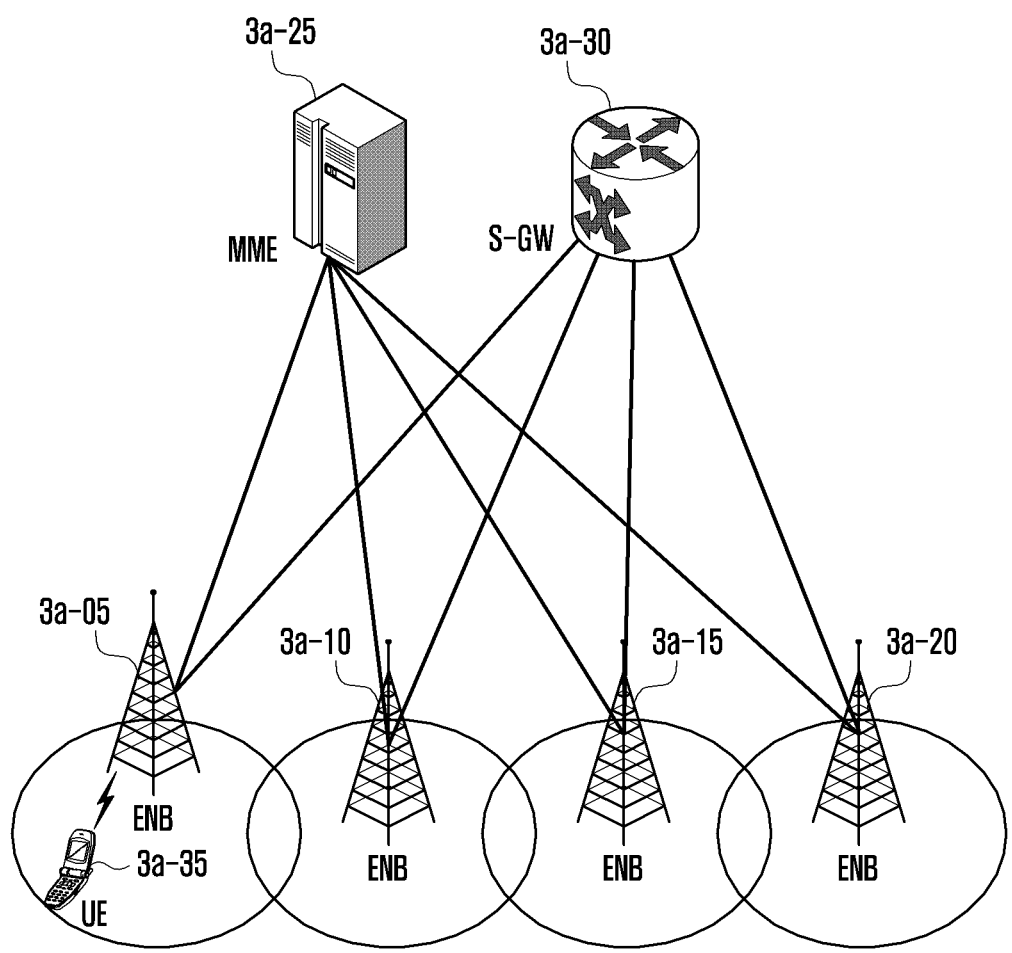
FIG. 3A illustrates a network architecture of a wireless communication system according to an embodiment of the present disclosure.

FIG. 3A illustrates a network architecture of an LTE system according to an embodiment of the present disclosure.

Referring to FIG. 3A, the wireless communication system may include multiple base stations ENBs 3*a*-05, 3*a*-10, 3*a*-15 and 3*a*-20, an MIME 3*a*-25, and an S-GW 3*a*-30. A UE or terminal 3*a*-35 may connect to an external network through the ENBs 3*a*-05, 3*a*-10, 3*a*-15 and 3*a*-20 and the S-GW 3*a*-30.

The base stations 3*a*-05, 3*a*-10, 3*a*-15 and 3*a*-20 are access nodes of the cellular network and provide wireless access services to terminals accessing the network. For example, to service user traffic, the base stations 3*a*-05, 3*a*-10, 3*a*-15 and 3*a*-20 schedule the terminals based on collected status information related to buffers, transmission powers and channels of the terminals, and support communication between the terminals and the CN. The MME 3*a*-25 is connected to multiple base stations and performs various control functions including mobility management for terminals. The S-GW 3*a*-30 is a functional entity providing data bearers. The MME 3*a*-25 and the S-GW 3*a*-30 can perform authentication and bearer management for terminals accessing the network, and process packets arriving from the base stations 3*a*-05, 3*a*-10, 3*a*-15 and 3*a*-20 and packets to be sent to the base stations 3*a*-05, 3*a*-10, 3*a*-15 and 3*a*-20.

Figure 3B:
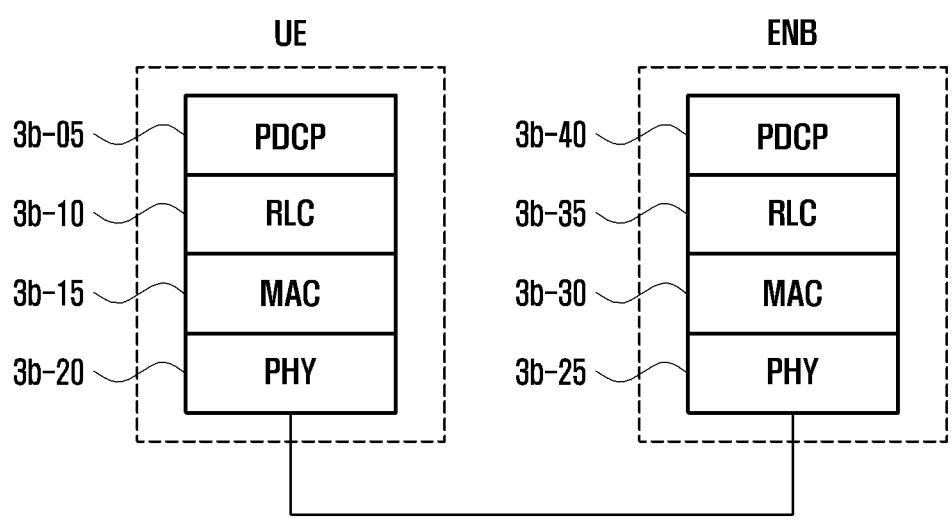
FIG. 3B illustrates a structure of wireless protocols in an LTE system according to an embodiment of the present disclosure.

FIG. 3B illustrates a structure of wireless protocols in an LTE system according to an embodiment of the present disclosure.

Referring to FIG. 3B, in the LTE system, a UE and an ENB each include a wireless protocol stack including PDCP 3*b*-05 or 3*b*-40, RLC 3*b*-10 or 3*b*-35, and MAC 3*b*-15 or 3*b*-30. The PDCP 3*b*-05 or 3*b*-40 performs compression and decompression of IP headers. The RLC 3*b*-10 or 3*b*-35 reconfigures PDCP PDUs to a suitable size. The MAC 3*b*-15 or 3*b*-30 is connected with multiple RLC layer entities in a UE. The MAC 3*b*-15 or 3*b*-30 multiplexes RLC PDUs into MAC PDUs and demultiplexes MAC PDUs into RLC PDUs. The PHY layer 3*b*-20 or 3*b*-25 converts higher layer data into OFDM symbols by means of channel coding and modulation and transmits the OFDM symbols through a wireless channel, and converts OFDM symbols received through a wireless channel to higher layer data by means of demodulation and channel decoding and forwards the data to the higher layers. For additional error correction at the physical layer, HARQ is used, and the receiver side transmits a 1-bit indication indicating whether it has received packets from the transmitter side. This information is referred to as HARQ ACK/NACK information. Downlink HARQ ACK/NACK information for uplink transmission may be transmitted via PHICH. Uplink HARQ ACK/NACK information for downlink transmission may be transmitted via PUCC or PUSCH.

Although not shown, the RRC layer exists on top of the PDCP layer of each of the terminal and the base station. The RRC layers can exchange connection and measurement setup control messages for controlling radio resources.

Meanwhile, the PHY layer may include one or more frequencies/carriers, and the technique of simultaneously configuring and using plural frequencies is referred to as CA. In typical cases, a single carrier is used in communication between a UE and a base station (eNB). When CA is employed, a primary carrier and one or more secondary carriers may be used in communication between the UE and the ENB, significantly increasing the data transfer rate by an amount corresponding to the number of secondary carriers. In LTE, the cell of an ENB using the primary carrier is termed a PCell, and the cell using a secondary carrier is termed a SCell.

Figure 3C:
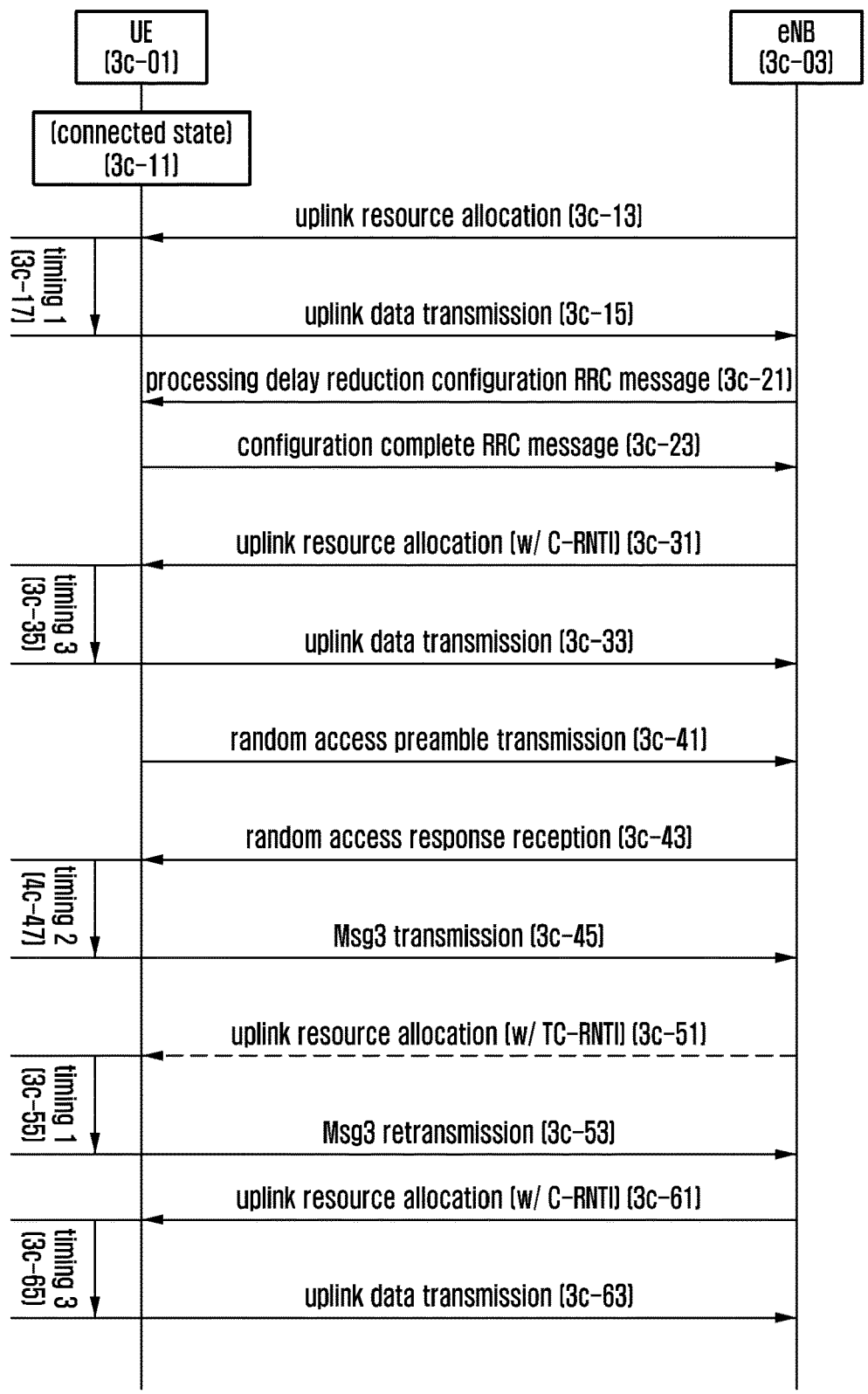
FIG. 3C is a sequence diagram illustrating a flow of messages between a terminal and a base station when a scheme proposed according to an embodiment of the present disclosure.

FIG. 3C is a sequence diagram illustrating a flow of messages between a terminal and a base station when a scheme proposed according to an embodiment of the present disclosure.

Referring to FIG. 3C, it is assumed that a terminal 3c-01 is already connected to a base station 3c-03 and can transmit and receive data at operation 3c-11.

When the terminal 3c-01 connected to the base station 3c-03 is allocated uplink resources by the base station 3c-03 at operation 3c-13, the terminal 3c-01 transmits, after 4 subframes at operation 3c-17, uplink data at operation 3c-15. Although not shown for the downlink, when the terminal 3c-01 is allocated downlink resources, the base station 3c-03 transmits downlink data in the same subframe, and the terminal 3c-01 transmits, after 4 subframes, information indicating whether the downlink data has been successfully received to the base station.

Thereafter, the terminal 3c-01 receives an RRC message indicating processing delay reduction from the base station 3c-03 at operation 3c-21. The processing delay reduction configuration may indicate reducing the interval of 4 subframes to a preset interval. For example, the interval of 4 subframes may be reduced to an interval of 3 subframes. The above RRC message may be an RRCConnectionReconfiguration message of the RRC layer.

Then, the terminal 3c-01 transmits an RRC layer message indicating that the RRC message containing the above configuration has been successfully received at operation 3c-23. Here, the RRC layer message may be an RRCConnectionReconfigurationComplete message.

The terminal 3c-01 receives an uplink or downlink resource allocation message (containing a C-RNTI as a unique identifier of the terminal 3c-01 in the cell) from the base station 3c-03 for the first time after reception of the configuration message or transmission of the confirmation message at operation 3c-31. Thereafter, the terminal 3c-01 transmits uplink data or ACK/NACK information for the downlink data at the configured timing (e.g., after preset number of subframes at operation 3c-35) at operation 3c-33.

Thereafter, the terminal 3c-01 may perform random access to the base station. Random access may occur for the following reasons.

Cause 1: the base station 3c-03 sends the physical downlink control channel (PDCCH) order to the terminal 3c-01 so as to cause random access.

Cause 2: if the terminal 3c-01 has uplink data to be sent but cannot send a corresponding scheduling request, the terminal 3c-01 performs random access to transmit a buffer status report (BSR).

Cause 3: random access to transmit a handover completion message upon handover

Cause 4: if the connection to the current base station 3c-03 is lost, random access is performed to send a connection reestablishment request to the base station.

Although not shown in the drawing, in the present disclosure, to perform random access for a connection reestablishment request after loss of connection to the current base station 3c-03 (cause 4), the terminal 3c-01 communicates using the existing timing (i.e., at operation 3c-17) unless a separate configuration is received from the base station.

In FIG. 3C, it is assumed for cause 1 or cause 3 that the terminal 3c-01 is not allocated a specific preamble by the base station. Hence, the terminal 3c-01 transmits a randomly selected random access preamble to the base station 3c-03 through a physical channel for random access at operation 3c-41. There are a total of 64 random access preambles in LTE. In the LTE system, the physical channel is referred to as physical random access channel (PRACH). It is possible for one or more terminals to simultaneously transmit a random access preamble using a PRACH resource. The random access preamble is a specially designed sequence so that it can be received even when it is sent before complete synchronization is established with the base station. In response to a received random access preamble, the base station 3c-03 transmits a random access response (RAR) message to the terminal 3c-01 at operation 3c-43. The RAR message must be transmitted within a preset period of time after transmission of the preamble, and this period is referred to as the RAR window. To transmit a RAR message, the base station 3c-03 schedules the RAR message through the PDCCH. This scheduling information is scrambled with a random access radio network temporary identifier (RA-RNTI), and the RA-RNTI is mapped to the PRACH resource through which the preamble is sent. The terminal 3c-01 having sent a preamble through a specific PRACH resource may determine whether a corresponding RAR message is present by making an attempt to receive the PDCCH based on the corresponding RA-RNTI.

The RAR message may include identifier information of the preamble transmitted at operation 3c-41 (i.e., as a response to the indicated preamble), uplink transmission timing adjustment information, uplink resource allocation information to be used later, and temporary terminal 3c-01 identifier information (temporary C-RNTI). Upon receiving the RAR message, the terminal 3c-01 transmits a message after preset subframes at operation 3c-47 from reception of the uplink resource allocation information through the RAR message at operation 3c-45. For example, the preset subframes may be 6 subframes. The transmitted message may be one of various messages corresponding to the causes described above and may be collectively referred to as Msg3. Msg3 may be a BSR message in the case of cause 2.

If Msg3 is not properly received, the base station 3c-03 can make a retransmission request to the terminal 3c-01 at operation 3c-53. This may be performed at a preset timing without a separate PDCCH, or the base station 3c-03 may direct retransmission by transmitting a PDCCH including a temporary C-RNTI at operation 3c-51. In the present disclosure, for both of the above two cases, the terminal 3c-01 retransmits Msg3 according to the existing timing (i.e., 4 subframes) at operation 3c-55. This is because the base station 3c-03 does not know the terminal 3c-01 transmitting the random access preamble until Msg3 is successfully received. For example, this is to support all terminals that do not use the processing delay reduction technique described above.

If uplink resource allocation information including C-RNTI is received from the base station 3c-03 at operation 3c-61, the terminal 3c-01 transmits uplink data after a preset timing at operation 3c-63 as indicated by the information. Thereby, the terminal 3c-01 and the base station 3c-03 can transmit and receive data according to the pre-agreed timing (timing 3—3c-65), resulting in communication without error.

Figure 3D:
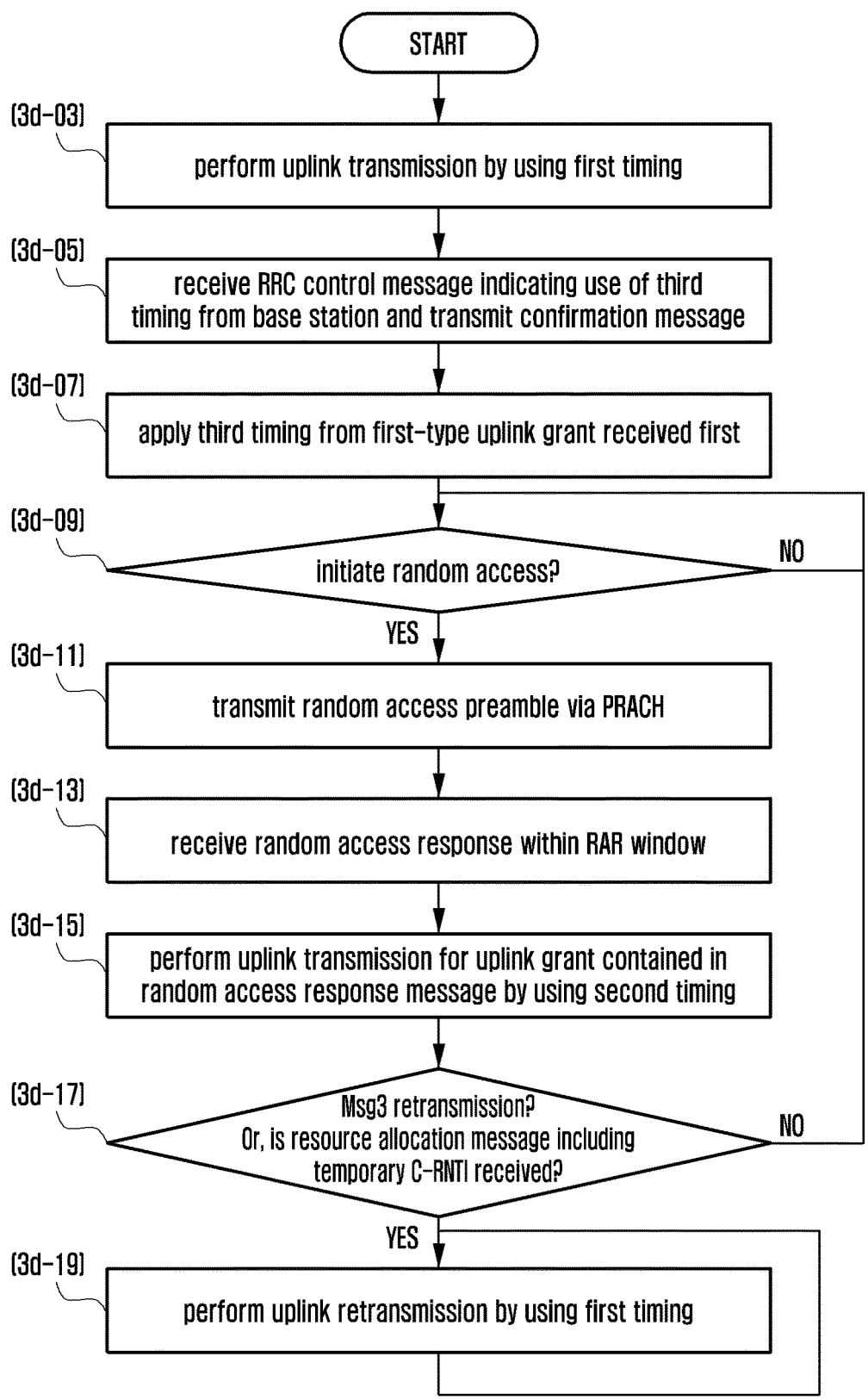
FIG. 3D is a flowchart illustrating a sequence of operations of to terminal when a scheme proposed according to an embodiment of the present disclosure.

FIG. 3D is a flowchart illustrating a sequence of operations of a terminal when a scheme proposed according to an embodiment of the present disclosure.

Referring to FIG. 3D, it is assumed that the terminal is already connected to the base station and can transmit and receive data.

When the terminal connected to the base station is allocated uplink resources by the base station, the terminal transmits uplink data at a first timing (i.e., 4 subframes later) at operation 3d-03. Although not shown for the downlink, when the terminal is allocated downlink resources, the base station transmits downlink data in the same subframe, and the terminal transmits, after 4 subframes, information indicating whether the downlink data has been successfully received to the base station.

Thereafter, the terminal receives an RRC message indicating processing delay reduction from the base station at operation 3d-05. The processing delay reduction configuration may indicate reducing the first timing to a third timing (e.g., 3 subframes). The above RRC message may be an RRCConnectionReconfiguration message of the RRC layer. Then, the terminal transmits an RRC layer message indicating that the RRC message indicating processing delay reduction has been successfully received at operation 3d-05. Here, the RRC layer message may be an RRCConnectionReconfigurationComplete message.

The terminal receives an uplink or downlink resource allocation message (containing a C-RNTI as a unique identifier of the terminal in the cell) from the base station for the first time after reception of the configuration message or transmission of the confirmation message. Thereafter, the terminal transmits uplink data or ACK/NACK information for the downlink data at the configured timing (e.g., third timing (i.e., 3 subframes later)) at operation 3d-07.

Thereafter, the terminal may perform random access to the base station. Random access may occur for the following reasons.

Cause 1: the base station sends the PDCCH order to the terminal so as to cause random access.

Cause 2: if the terminal has uplink data to be sent but cannot send a corresponding scheduling request, the terminal performs random access to transmit a BSR.

Cause 3: random access to transmit a handover completion message upon handover

Cause 4: if the connection to the current base station is lost, random access is performed at operation 3d-09 to send a connection reestablishment request to the base station.

Although not shown in the drawing, in the present disclosure, to perform random access for a connection reestablishment request after loss of connection to the current base station (cause 4), the terminal communicates using the first timing unless a separate configuration is received from the base station.

In FIG. 3D, it is assumed for cause 1 or cause 3 that the terminal is not allocated a specific preamble by the base station. Hence, the terminal transmits a randomly selected random access preamble to the base station through a physical channel for random access at operation 3d-11. There are a total of 64 random access preambles in LTE. In the LTE system, the physical channel is referred to as PRACH. It is possible for one or more terminals to simultaneously transmit a random access preamble using a PRACH resource. The random access preamble is a specially designed sequence so that it can be received even when it is sent before complete synchronization is established with the base station. In response to a received random access preamble, the base station transmits a RAR message to the terminal. The RAR message must be transmitted within a preset period of time after transmission of the preamble, and this period is referred to as the RAR window. To transmit a RAR message, the base station schedules the RAR message through the PDCCH. This scheduling information is scrambled with a RA-RNTI, and the RA-RNTI is mapped to the PRACH resource through which the preamble is sent. The terminal having sent a preamble through a specific PRACH resource may determine whether a corresponding RAR message is present by making an attempt to receive the PDCCH based on the corresponding RA-RNTI at operation 3d-13.

The RAR message may include identifier information of the preamble transmitted at operation 3d-11 (i.e., as a response to the indicated preamble), uplink transmission timing adjustment information, uplink resource allocation information to be used later, and temporary terminal identifier information (temporary C-RNTI). Upon receiving the RAR message, the terminal transmits a message after the second timing from reception of the uplink resource allocation information through the RAR message at operation 3d-15. For example, the second timing may correspond to 6 subframes. The transmitted message may be one of various messages corresponding to the causes described above and may be collectively referred to as Msg3. Msg3 may be a BSR message in the case of cause 2.

If Msg3 is not properly received, the base station can make a retransmission request to the terminal. This may be performed at a preset timing without a separate PDCCH, or the base station may direct retransmission by transmitting a PDCCH including a temporary C-RNTI at operation 3d-17. In the present disclosure, for both of the above two cases, the terminal retransmits Msg3 according to the first timing (i.e., 4 subframes) at operation 3d-19. This is because the base station does not know the terminal transmitting a random access preamble until Msg3 is successfully received. For example, this is to support all terminals that do not use the processing delay reduction technique described above.

If uplink resource allocation information including C-RNTI is received from the base station, the terminal transmits uplink data after a third timing as indicated by the information at operation 3d-07. Thereby, the terminal and the base station can transmit and receive data according to the pre-agreed timing, resulting in communication without error.

Figure 3E:
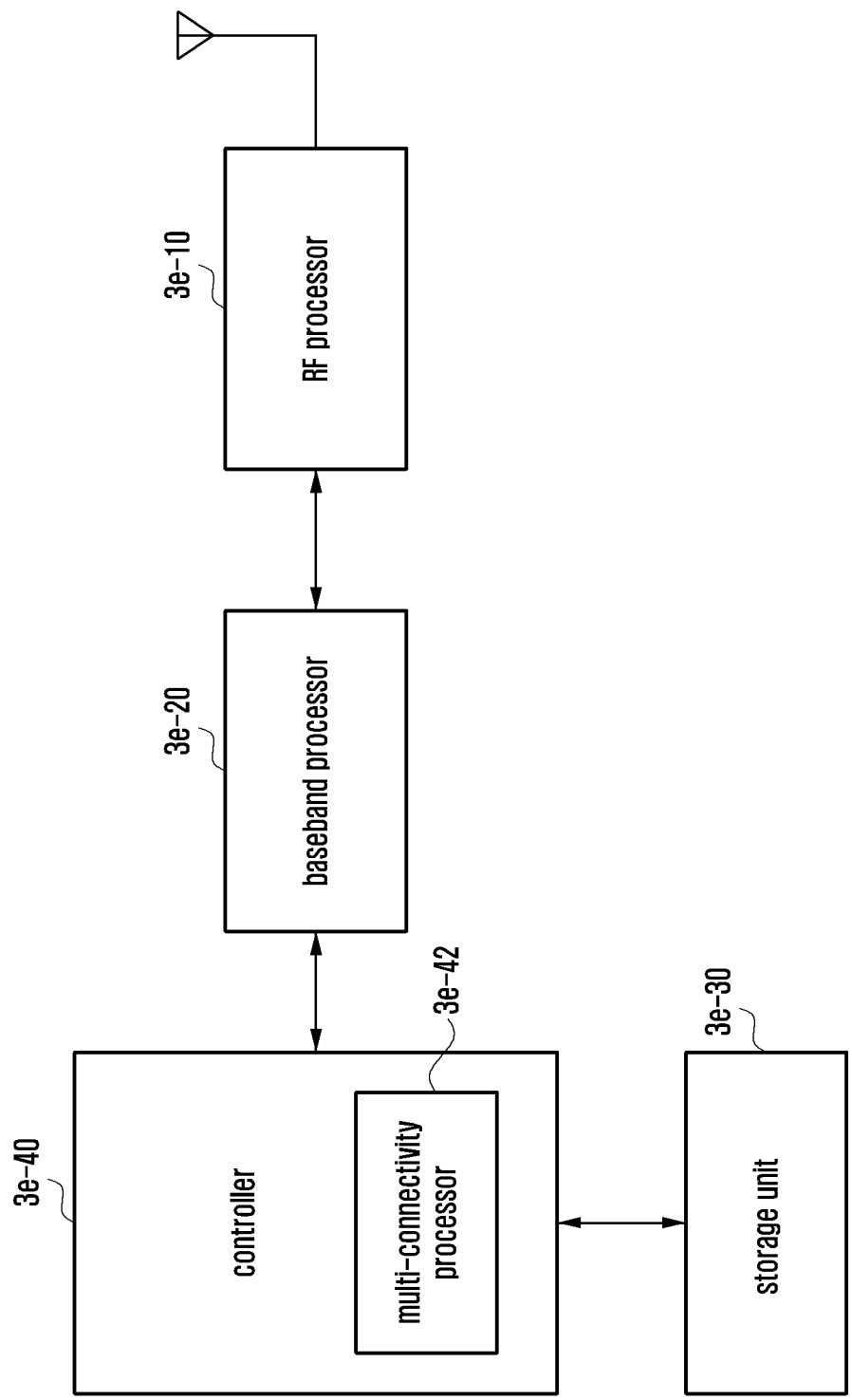
FIG. 3E is a block diagram of a terminal in a wireless system according to an embodiment of the present disclosure.

FIG. 3E is a block diagram of a terminal in a wireless communication system according to an embodiment of the present disclosure.

Referring to FIG. 3E, the terminal may include an RF processor 3e-10, a baseband processor 3e-20, a storage unit 3e-30, and a controller 3e-40.

The RF processor 3e-10 performs a function for transmitting and receiving a signal through a wireless channel, such as signal conversion between bands and amplification. For example, the RF processor 3e-10 upconverts a baseband signal from the baseband processor 3e-20 into an RF signal and transmits the RF signal through an antenna, and downconverts an RF signal received through the antenna into a baseband signal. For example, the RF processor 3e-10 may include a transmit filter, a receive filter, an amplifier, a mixer, an oscillator, a DAC, and an ADC. Although only one antenna is shown in FIG. 3E, the terminal may have a plurality of antennas. The RF processor 3e-10 may include a plurality of RF chains. Further, the RF processor 3e-10 may perform beamforming. For beamforming, the RF processor 3e-10 may adjust the phase and magnitude of each of the signals transmitted and received through multiple antennas or antenna elements.

The baseband processor 3e-20 performs a function for conversion between a baseband signal and a bit string according to the physical layer standard of the system. For example, when transmitting data, the baseband processor 3e-20 generates complex symbols by encoding and modulating a transmission bit string. When receiving data, the baseband processor 3e-20 reconstructs a reception bit string by demodulating and decoding a baseband signal from the RF processor 3e-10. More specifically, in an OFDM scheme, when transmitting data, the baseband processor 3e-20 generates complex symbols by encoding and modulating a transmission bit string, maps the complex symbols to subcarriers, and generates OFDM symbols through IFFT and CP insertion. When receiving data, the baseband processor 3e-20 divides the baseband signal from the RF processor 3e-10 into OFDM symbols, recovers signals mapped to subcarriers through FFT, and reconstructs a reception bit string through demodulation and decoding.

As described above, the baseband processor 3e-20 and the RF processor 3e-10 transmit and receive signals. Hence, the baseband processor 3e-20 and the RF processor 3e-10 may be referred to as a transmitter, receiver, transceiver, or communication unit. At least one of the baseband processor 3e-20 and the RF processor 3e-10 may include a plurality of communication modules to support different radio access technologies. At least one of the baseband processor 3e-20 and the RF processor 3e-10 may include different communication modules to process signals of different frequency bands. For example, the different radio access technologies may include a wireless LAN technology (e.g., IEEE 802.11) and a cellular network technology (e.g., LTE). The different frequency bands may include SHF bands (e.g., 2.5 GHz, 5 GHz) and mm wave bands (e.g., 60 GHz).

The storage unit 3e-30 stores basic programs, application programs, and data, such as configuration information for the operation of the terminal. More particularly, the storage unit 3e-30 may store information on wireless LAN nodes performing wireless communication using wireless LAN access technology. The storage unit 3e-30 provides stored data at the request of the controller 3e-40.

The controller 3e-40 controls the overall operation of the terminal. For example, the controller 3e-40 transmits and receives a signal through the baseband processor 3e-20 and the RF processor 3e-10. The controller 3e-40 writes and reads data to and from the storage unit 3e-30. To this end, the controller 3e-40 may include at least one processor. For example, the controller 3e-40 may include a CP to control communication and an AP to control the higher layers, such as application programs. In one embodiment, the controller 3e-40 includes a multi-connectivity processor 3e-42 to process operations in the multi-connectivity mode. For instance, the controller 3e-40 can control the terminal to perform the terminal-related procedure shown in FIG. 3E.

In one embodiment, when a processing delay reduction configuration is received from the base station, the control unit 3e-40 of the terminal controls the timing of message transmission and reception according to the above-described scheme.

The methods conforming to the embodiments described in the claims or specification of the present disclosure may be implemented as hardware, software, or a combinational thereof.

For software implementation, there may be provided a computer-readable storage medium storing one or more programs (software modules). The one or more programs stored in the computer-readable storage medium may be configured for execution by one or more processors of the electronic device. The one or more programs include instructions that cause the electronic device to execute the methods conforming to the embodiments described in the claims or specification of the present disclosure.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

In addition, the above programs may be stored in an attachable storage device that may be accessed through the Internet, an intranet, a LAN, a WLAN, a SAN, or a communication network including a combination thereof. This storage device may be connected through an external port to the electronic device carrying out an embodiment of the present disclosure. In addition, a separate storage device on a communication network may be connected to the electronic device carrying out an embodiment of the present disclosure.

In the above embodiments of the present disclosure, the elements included in the disclosure are expressed in a singular or plural form according to the proposed specific embodiment. However, the singular or plural expression is appropriately selected for ease of description according to the presented situation, and the present disclosure is not limited to a single element or plural elements. Those elements described in a plural form may be configured as a single element, and those elements described in a singular form may be configured as plural elements.

Although various embodiments of the present disclosure have been described in detail hereinabove, it should be understood that many variations and modifications of the basic inventive concept described herein will still fall within the spirit and scope of the present disclosure as defined in the appended claims and their equivalents.

Fourth Embodiment

Figure 4A:
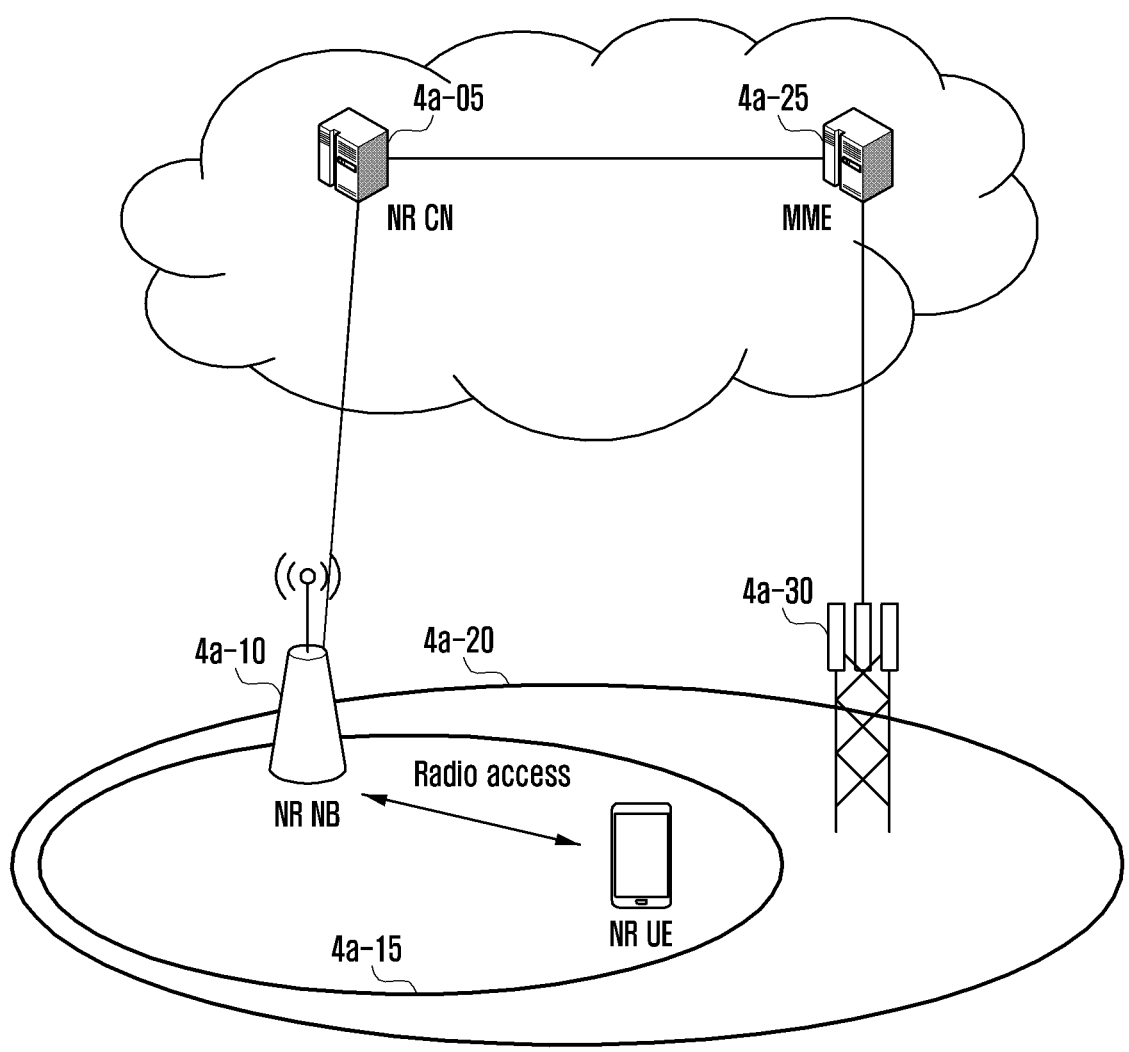
FIG. 4A illustrates an architecture of a next generation mobile communication system according to an embodiment of the present disclosure.

FIG. 4A illustrates an architecture of a next generation mobile communication system according to an embodiment of the present disclosure.

Referring to FIG. 4A, the radio access network of the next generation mobile communication system includes a next generation base station (e.g., a new radio node B, NR gNB, or NR base station) 4a-10 and a new radio core network (NR CN) 4a-05. A user equipment (e.g., a new radio user equipment, NR UE or terminal) 4a-15 may connect to an external network through the NR gNB 4a-10 and the NR CN 4a-05.

In FIG. 4A, the NR gNB 4a-10 included in network 4a-20 corresponds to the eNB of the existing LTE system. The NR gNB 4a-10 is connected to the NR UE 4a-15 through a wireless channel and can provide a higher level of service compared to the existing node B. In the next generation mobile communication system, all user traffic is served by shared channels. Hence, it is necessary to perform scheduling based on collected status information regarding buffers, available transmit powers and channels of UEs. The NR gNB 4a-10 performs this scheduling function. In general, the NR gNB 4a-10 may control multiple cells. To realize much higher data transfer rates compared to the existing LTE system, the next generation mobile communication system may have bandwidths wider than the existing maximum bandwidth and utilize OFDM as RAT in combination with beamforming. It employs adaptive modulation and coding (AMC) to determine the modulation scheme and channel coding rate according to channel states of terminals. The NR CN 4a-05 may perform mobility support, bearer setup, and quality of service (QoS) setup functions. The NR CN is connected to multiple base stations and performs various control functions including mobility management for terminals. The next generation mobile communication system can cooperate with the existing LTE system, and the NR CN is connected with the MME 4a-25 through a network interface. The MME 4a-25 is connected to the eNB 4a-30, which is a legacy base station.

Figure 4B:
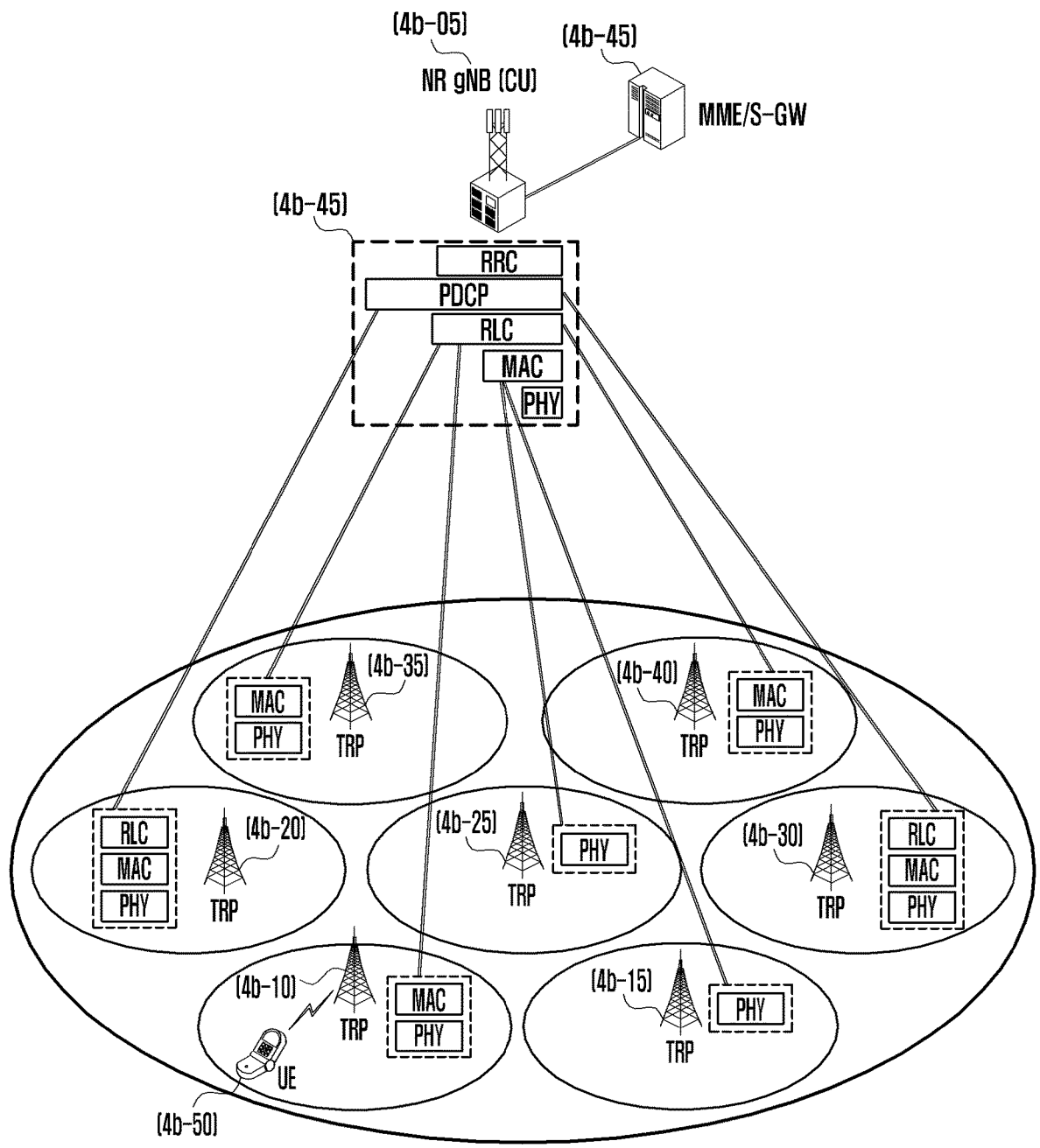
FIG. 4B illustrates an architecture of a next generation mobile communication system according to an embodiment of the present disclosure.

FIG. 4B illustrates an architecture of a next generation mobile communication system according to an embodiment of the present disclosure.

Referring to FIG. 4B, the cell served by the NR gNB 4b-05 operating based on beams may have multiple TRPs 4b-10, 4b-15, 4b-20, 4b-25, 4b-30, 4b-35 and 4b-40. The TRPs 4b-10 to 4b-40 are a functional block separated from the existing LTE base station (eNB) for transmitting and receiving physical signals, and each TRP includes a plurality of antennas. The NR gNB 4b-05 may be represented as a central unit (CU), and the TRP may be represented as a distributed unit (DU). The functions of the NR gNB 4b-05 and the TRP can be configured by separating each layer from the PDCP/RLC/MAC/PHY layers as indicated by indicia 4b-45. For example, the TRPs 4b-15 and 4b-25 only with the PHY layer can perform the function of the corresponding layer, the TRPs 4b-10, 4b-35 and 4b-40 only with the PHY layer and the MAC layer can perform functions of the corresponding layers, and the TRPs 4b-20 and 4b-30 only with the PHY layer, the MAC layer, and the RLC layer can perform functions of the corresponding layers. More particularly, to transmit and receive data, the TRPs 4b-10 to 4b-40 may use a beamforming technique to generate narrow beams in various directions through a plurality of transmit and receive antennas. The user terminal 4b-50 may connect to the NR gNB 4b-05 and an external network through the TRPs 4b-10 to 4b-40. To service user traffic, the NR gNB 4b-05 schedules the terminals based on collected status information related to buffers, available transmission powers, and channels of the terminals, and supports communication between the terminals and the CN.

Figure 4C:
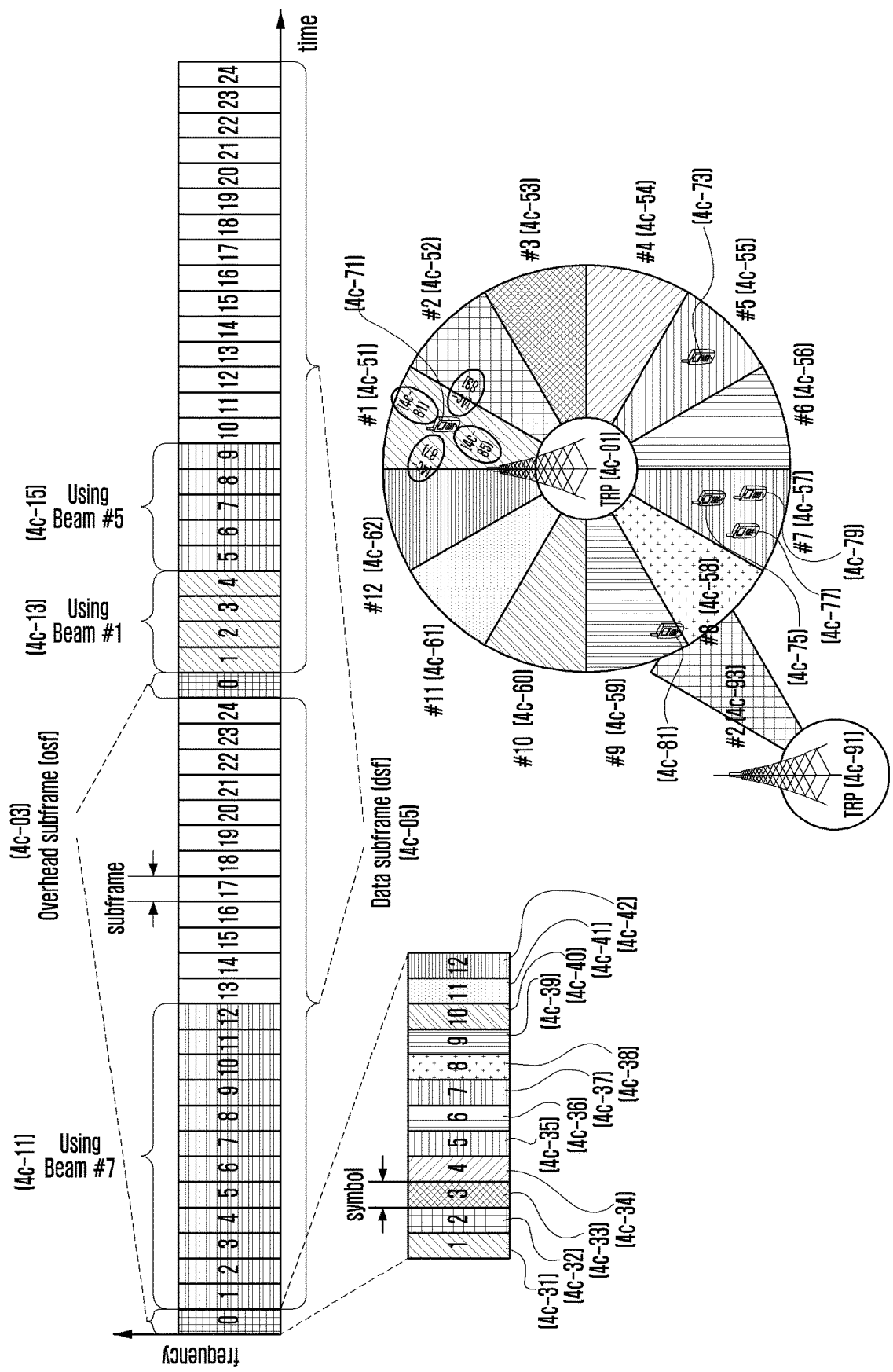
FIG. 4C illustrates a frame structure used by a new radio (NR) system according to an embodiment of the present disclosure.

FIG. 4C illustrates a frame structure used by an NR system according to an embodiment of the present disclosure.

Referring to FIG. 4C, in the NR system, for higher transmission rates compared to the LTE system, the use of high frequencies can be considered to ensure wider bandwidths. More particularly, at high frequencies, it can be considered to generate directional beams to transmit data at a high rate to the terminal.

As such, it is possible to consider a scenario in which the NR base station or TRP 4c-01 communicates with terminals 4c-71, 4c-73, 4c-75, 4c-77 and 4c-79 in the cell using different beams. For example, in FIG. 4C, it is assumed that terminal 1 (4c-71) communicates using beam #1 (4c-51), terminal 2 (4c-73) communicates using beam #5 (4c-55), and terminals 3, 4, 5 (4c-75) (4c-77) (4c-79) communicate using beam #7 (4c-57).

To identify the beams used by terminals to communicate with the TRP, an OSF (4c-03) at which a common overhead signal is sent is present in the time domain. At the OSF, a primary synchronization signal (PSS) for acquiring the timing of OFDM symbols, a secondary synchronization signal (SSS) for detecting the cell identification (ID), an extended synchronization signal (ESS) for acquiring the timing of subframes, and a beam reference signal (BRS) for identifying beams may be transmitted. The physical broadcast channel (PBCH) containing system information, master information block (MIB), or information essential for a terminal to access the system (e.g., downlink beam bandwidth, system frame number) may also be sent. In the OSF, the base station transmits a reference signal using a different beam for each symbol (or over several symbols). A beam index for distinguishing each beam may be derived from the reference signal.

Referring to FIG. 4C, it is assumed that the base station uses 12 beams from beam #1 (4c-51) to beam #12 (4c-62) for transmission, and a different beam is swept and transmitted for each symbol in the OSF. For example, as one beam is transmitted at each symbol (e.g., transmission of beam #1 (4c-51) at the first symbol 4c-31) in the OSF, the terminal can measure the OSF and identify the beam with the highest signal strength among the beams transmitted in the OSF. Moreover, the first frame 0 of the frame structure includes 12 symbols: the first symbol (4c-31), a second symbol (4c-32), a third symbol (4c-33), a fourth symbol (4c-34), a fifth symbol (4c-35), a sixth symbol (4c-36), a seventh symbol (4c-37), an eighth symbol (4c-38), a ninth symbol (4c-39), a tenth symbol (4c-40), an eleventh symbol (4c-41), and a twelfth symbol (4c-42).

In FIG. 4C, it is assumed that the OSF is repeated every 25 subframes and the remaining 24 subframes are DSFs 4c-05 in which regular data is transmitted and received.

According to scheduling of the base station, terminals 3, 4, 5 (4c-75) (4c-77) (4c-79) may communicate commonly using beam #7 (4c-11), terminal 1 (4c-71) may communicate using beam #1 (4c-13), and terminal 2 (4c-73) may communicate using beam #5 (4c-15). Although FIG. 4C mainly shows 12 transmission beams 4c-51 to 4c-62 of the base station, a terminal may have reception beams to receive the transmission beams of the base station (e.g., terminal 1 (4c-71) has four reception beams 4c-81, 4c-83, 4c-85, 4c-87). Terminal 1 having four beams 4c-81, 4c-83, 4c-85, 4c-87 may perform beam sweeping to identify the beam with the best reception performance. Here, if multiple beams cannot be used at the same time, by receiving multiple OSFs as many as the number of reception beams (one reception beam for each OSF), it is possible to find an optimal pair of the transmission beam of the base station and the reception beam of the terminal.

In addition, it is possible to consider such a case where terminal 6 (4c-81) is located at the boundary of each beam coverage. More particularly, terminal 6 (4c-81) is located between beam #8 (4c-58) and beam #9 (4c-59) of the current base station 4c-01 and may receive the signal of beam #2 (4c-93) of another base station 4c-91. In this situation, if terminal 6 performs signal measurement, the signal strength of beam #2 (4c-93) of the different base station 4c-91 will be highest. If the terminal measures and reports only one beam, the base station may misunderstand the channel conditions. For example, although the signal strength of beam #2 (4c-93) is highest, it is necessary for the terminal to send a measurement report for beam #8 (4c-58) and beam #9 (4c-59) together with beam #2 (4c-93) so that the base station does not issue an unnecessary handover command to the terminal (i.e., handover from base station 4c-01 to base station 4c-91).

Figure 4D:
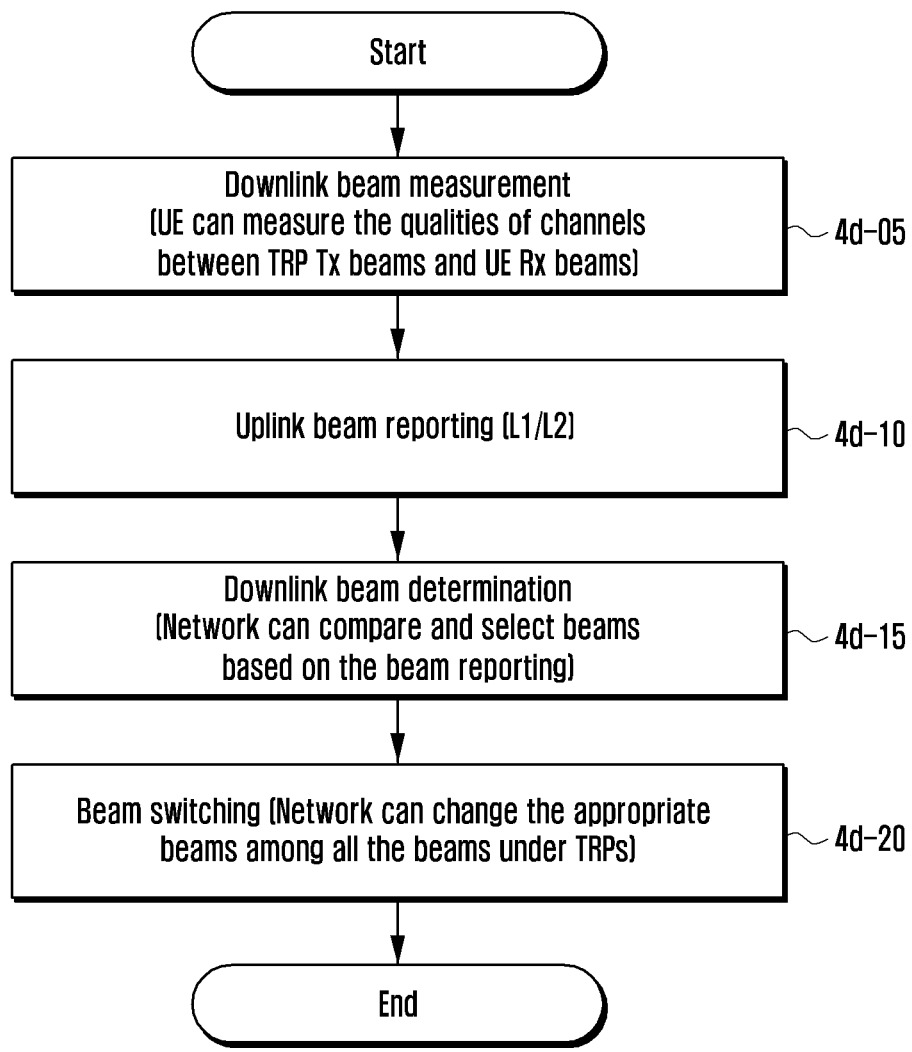
FIG. 4D illustrates a beam management procedure in a next generation mobile communication system according to an embodiment of the present disclosure.

FIG. 4D illustrates a beam management procedure in a next generation mobile communication system according to an embodiment of the present disclosure.

Referring to FIG. 4D, in the NR system, there are two types of mobility and connection approaches that are controlled by the network. The first type is RRC-based mobility management for cells as in LTE, and the second type is mobility management without RRC involvement and can be called beam management. Mobility management based on the RRC is applicable to inter-cell handover, and mobility management not involving the RRC is performed to determine and select optimal transmission and reception beams between NR UEs and NR TRPs. Operations of the beam management procedure are described as follows.

At operation 4d-05, the NR UE can measure the signal strength of downlink transmission beams of neighbor TRPs. Here, the TRP transmission beams can be measured for each reception beam of the NR UE, and beam sweeping may be used. For example, the NR UE measures the TRP transmission beams swept every symbol in the OSF while changing the reception beam for each OSF. Here, the NR UE can distinguish downlink transmission beams of different TRPs because they may be transmitted using different codes or frequency resources. At operation 4d-10, the NR UE reports measurement values for one or more downlink transmission beams to the NR gNB. This report may include a list of downlink transmission beams and their strengths measured by the NR UE using the current reception beam, or a list of downlink transmission beams and their strengths measured by the NR UE using all the reception beams. At operation 4d-15, the NR gNB performs downlink beam determination. Here, the NR gNB compares the measurement values reported by the NR UE and selects the beam to be used for actual downlink transmission. At operation 4d-20, the NR gNB performs beam switching to the most suitable beam among the beams of all TRPs (the beam determined at the previous operation) and transmits a signal to the NR UE through the most suitable beam.

Figure 4E:
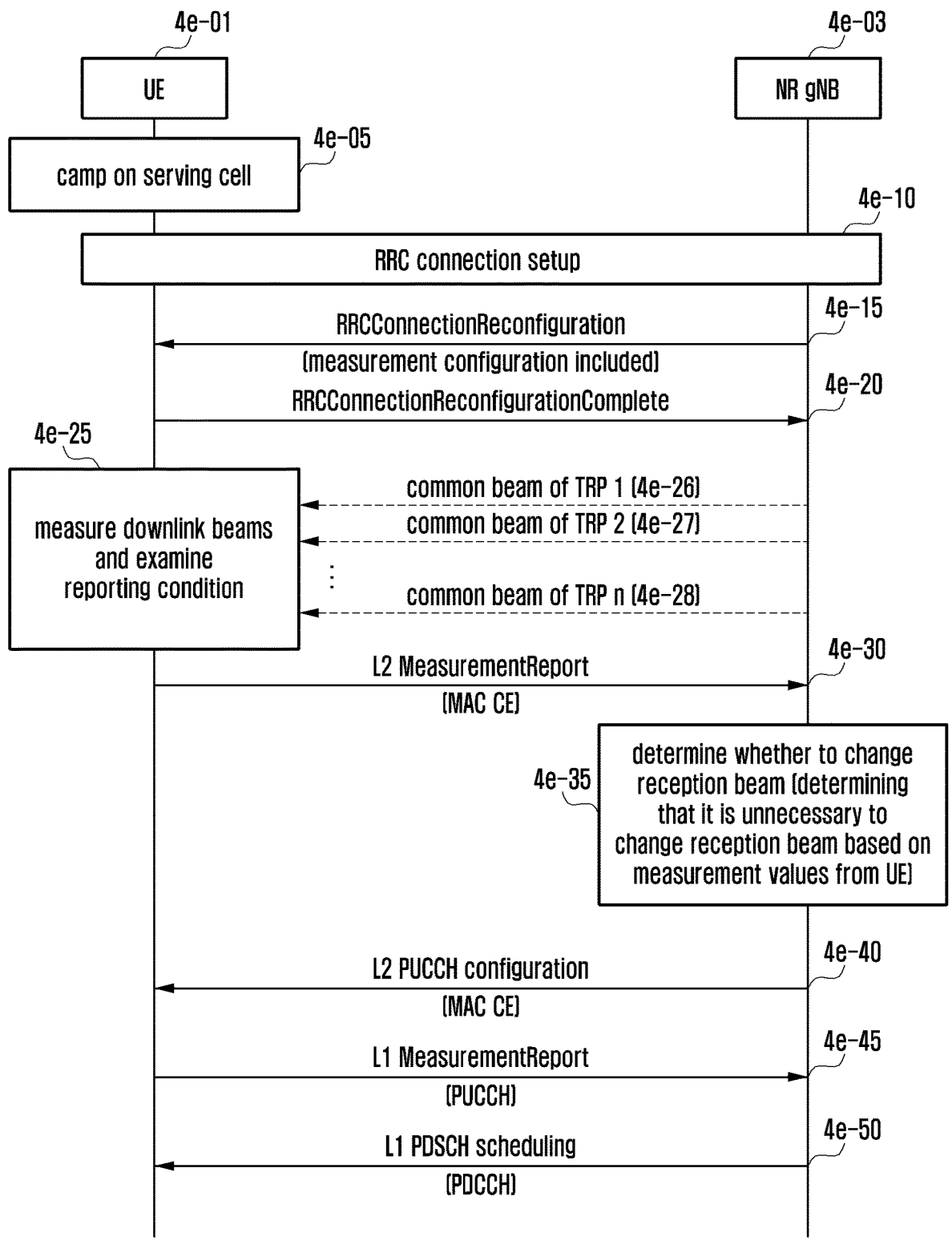
FIG. 4E illustrates a beam management procedure as embodiment 4-1 of the present disclosure, when reception beam switching is unnecessary as a result of measurement reporting from an NR terminal according to an embodiment of the present disclosure.

FIG. 4E illustrates a beam management procedure as embodiment 4-1 of the present disclosure when reception beam switching is unnecessary as a result of measurement reporting from the NR terminal according to an embodiment of the present disclosure.

Referring to FIG. 4E, a terminal 4e-01 in the idle mode (RRC_IDLE) finds a suitable cell and camps on a corresponding base station 4e-03 at operation 4e-05. Upon generation of data to be sent or the like, the terminal 4e-01 connects to the base station 4e-03 at operation 4e-10. In the idle mode, data cannot be transmitted because the terminal is not connected to the network for power saving or the like. To transmit data, the terminal has to make a transition to the connected mode (RRC_CONNECTED). When the terminal camps on a cell, it remains in the cell and receives a paging message to monitor whether downlink data is transmitted. When the terminal succeeds in connecting to the base station 4e-03, it makes a transition to the connected mode (RRC_CONNECTED). The terminal in the connected mode may transmit and receive data to and from the base station.

As the terminal in the connected mode moves in or out of the cell, it may be necessary to instruct the terminal to transmit and receive to and from another beam/cell/base station. To this end, the base station 4e-03 transmits a measurement configuration indication at operation 4e-15. This measurement configuration indication indicates measurement for neighbor beams at the same TRP (intra-TRP) of the serving beam or the same cell, neighbor beams at a different TRP (inter-TRP) of the same cell, or neighbor beams of a different cell. The measurement configuration indication may include conditions and parameters causing the terminal 4e-01 to send a measurement report to the base station 4e-03. In this embodiment, a description is given of mobility and connection management in the same cell among the mobility and connection management approaches listed above. More particularly, this is referred to as beam management without RRC involvement in the NR system. Upon receiving the measurement configuration indication, the terminal 4e-01 sends the base station 4e-03 a confirmation message indicating that the configuration information has been successfully received at operation 4e-20. This confirmation message may be an RRCConnectionReconfigurationComplete message as in the LTE system.

The terminal 4e-01 measures the strength of the downlink transmission beams 4e-26, 4e-27 and 4e-28 from the NR gNB 4e-03 or the TRPs included in the cell at operation 4e-25. Here, the terminal 4e-01 measures the downlink beams and determines whether the report triggering condition set by the NR gNB 4e-03 is satisfied. In the present disclosure, it is proposed to report a list of n downlink beams with strongest intensities and their strengths among the downlink beams measured for each reception beam of the terminal 4e-01. Here, the value of n may be set by the base station 4e-03 or be preset by the terminal 4e-01. In the NR system using high frequency bands, narrow and highly directional beams are employed. In this case, use of one optimal beam may cause frequent beam switching. In addition, by reporting the measurement values for multiple downlink transmission beams with good signal strength, the base station 4e-03 can change the beam among the n downlink transmission beams without notification to the terminal 4e-01. According to the above-described scheme, the terminal performs layer-2 measurement reporting at operation 4e-30. For layer-2 measurement reporting, a new MAC control signal or control element (CE) can be used. This MAC control element may include the following information.

Serving beam group measurements: a list of downlink transmission beams that can be received by the current reception beam of the terminal and their beam strengths Candidate beam M−1 group measurements: a list of downlink transmission beams that can be received by reception beam M−1 of the terminal and their beam strengths (M is the number of reception beams of the terminal)

Measurement reporting using a MAC control signal may be triggered by the period set by the measurement configuration of the base station, occurrence of a specified event, or necessity of reception beam switching of the terminal in particular (if serving beam group measurement result is less than candidate beam group measurement result).

The base station 4e-03 determines whether to change the reception beam at operation 4e-35. In the present embodiment, a description is given of operations performed when the base station 4e-03 determines that it is not necessary to change the reception beam based on the measurement values reported by the terminal 4e-01. The base station 4e-03 sends a physical uplink control channel (PUCCH) configuration to the terminal 4e-01 through layer-2 signaling like a new MAC control signal at operation 4e-40. This is a PUCCH configuration for the channel quality indication (CQI) of downlink transmission beams that can be received without adjustment of the current reception beam of the terminal 4e-01. For example, this PUCCH configuration sets a parameter related to a frequency transmission resource for reporting the CQI of the corresponding beams. Upon reception of the configuration, the terminal 4e-01 reports strengths of the n downlink transmission beams belonging to the serving beam group to the base station 4e-03 via the PUCCH at operation 4e-45. With respect to the downlink transmission beams that can be received by the current reception beam of the terminal 4e-01, the base station 4e-03 schedules the physical downlink shared channel (PDSCH) for the terminal 4e-01 through the PDCCH (layer-1 signaling) without separate notification to the terminal 4e-01 at operation 4e-50. For example, the base station 4e-03 may schedule the PDSCH to be used for data transmission after changing the downlink transmission beam to the transmission beam with the largest measurement value among the n downlink transmission beams reported by the terminal 4e-01 without separate notification to the terminal 4e-01.

Figure 4F:
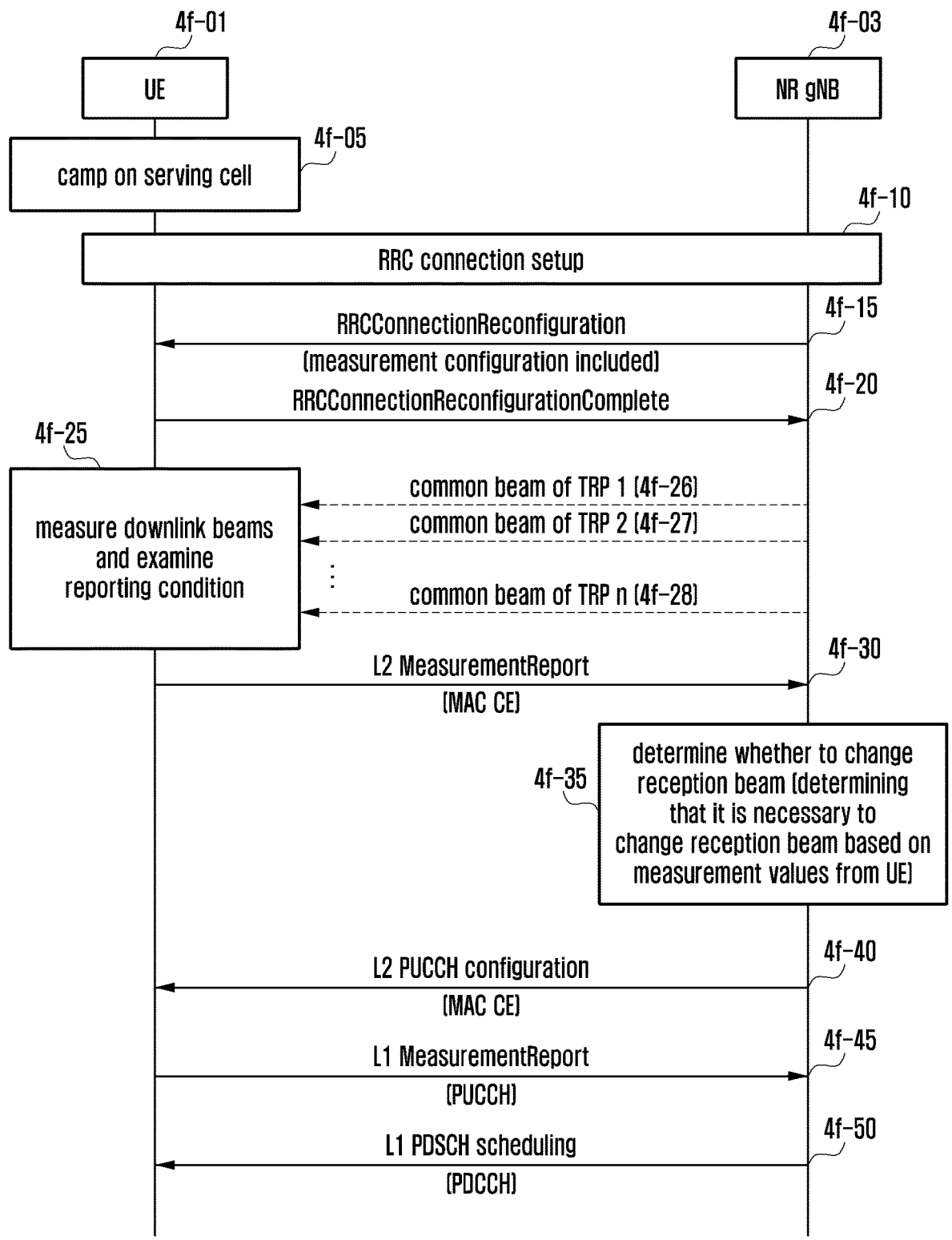
FIG. 4F illustrates a beam management procedure as embodiment 4-2 of the present disclosure, when reception beam switching is necessary as a result of measurement reporting from an NR terminal according to an embodiment of the present disclosure.

FIG. 4F illustrates a beam management procedure as embodiment 4-2 of the present disclosure when reception beam switching is necessary as a result of measurement reporting from the NR terminal according to an embodiment of the present disclosure.

Referring to FIG. 4F, a terminal 4f-01 in the idle mode (RRC_IDLE) finds a suitable cell and camps on a corresponding base station 4f-03 at operation 4f-05. Upon generation of data to be sent or the like, the terminal 4f-01 connects to the base station 4f-03 at operation 4f-10. In the idle mode, data cannot be transmitted because the terminal is not connected to the network for power saving or the like. To transmit data, the terminal has to make a transition to the connected mode (RRC_CONNECTED). When the terminal camps on a cell, it remains in the cell and receives a paging message to monitor whether downlink data is transmitted. When the terminal succeeds in connecting to the base station 4f-03, it makes a transition to the connected mode (RRC-_CONNECTED). The terminal in the connected mode may transmit and receive data to and from the base station.

As the terminal in the connected mode moves in or out of the cell, it may be necessary to instruct the terminal to transmit and receive to and from another beam/cell/base station. To this end, the base station 4f-03 transmits a measurement configuration indication at operation 4f-15. This measurement configuration indication indicates measurement for neighbor beams at the same TRP (intra-TRP) of the serving beam or the same cell, neighbor beams at a different TRP (inter-TRP) of the same cell, or neighbor beams of a different cell. The measurement configuration indication may include conditions and parameters causing the terminal 4f-01 to send a measurement report to the base station 4f-03. In this embodiment, a description is given of mobility and connection management in the same cell among the mobility and connection management approaches listed above. More particularly, this is referred to as beam management without RRC involvement in the NR system. Upon receiving the measurement configuration indication, the terminal 4f-01 sends the base station 4e-03 a confirmation message indicating that the configuration information has been successfully received at operation 4f-20. This confirmation message may be an RRCConnectionReconfigurationComplete message as in the LTE system.

The terminal 4f-01 measures the strength of the downlink transmission beams 4f-26, 4f-27 and 4f-28 from the NR gNB 4f-03 or the TRPs included in the cell at operation 4f-25. Here, the terminal 4f-01 measures the downlink beams and determines whether the report triggering condition set by the NR gNB 4f-03 is satisfied. In the present disclosure, it is proposed to report a list of n downlink beams with strongest intensities and their strengths among the downlink beams measured for each reception beam of the terminal 4f-01. Here, the value of n may be set by the base station 4f-03 or be preset by the terminal 4f-01. In the NR system using high frequency bands, narrow and highly directional beams are employed. In this case, use of one optimal beam may cause frequent beam switching. In addition, by reporting the measurement values for multiple downlink transmission beams with good signal strength, the base station 4f-03 can change the beam among the n downlink transmission beams without notification to the terminal 4f-01. According to the above-described scheme, the terminal performs layer-2 measurement reporting at operation 4f-30. For layer-2 measurement reporting, a new MAC control signal or CE can be used. This MAC control element may include the following information.

Serving beam group measurements: a list of downlink transmission beams that can be received by the current reception beam of the terminal and their beam strengths Candidate beam M−1 group measurements: a list of downlink transmission beams that can be received by reception beam M−1 of the terminal and their beam strengths (M is the number of reception beams of the terminal)

Measurement reporting using a MAC control signal may be triggered by the period set by the measurement configuration of the base station, occurrence of a specified event, or necessity of reception beam switching of the terminal in particular (if serving beam group measurement result is less than candidate beam group measurement result).

The base station 4f-03 determines whether to change the reception beam at operation 4f-35. In the present embodiment, a description is given of operations performed when the base station 4f-03 determines that it is necessary to change the reception beam based on the measurement values reported by the terminal 4*f*-01. The base station 4*f*-03 notifies the terminal 4*f*-01 of reception beam switching through layer-2 signaling, such as a new MAC control signal at operation 4*f*-40. Reception beam switching may occur if the serving beam group measurement result is less than the candidate beam group measurement result based on measurement results for beam groups reported by the terminal 4*f*-01. The base station 4*f*-03 must notify the terminal 4*f*-01 of beam switching when transmitting data through the downlink transmission beam that can be received only after adjusting the corresponding reception beam. With respect to the downlink transmission beams that can be received by the current reception beam of the terminal, the base station schedules the PDSCH for the terminal through the PDCCH (layer-1 signaling) without separate notification to the terminal at operation 4*f*-45. At operations 4*f*-40 and 4*f*-45, the terminal determines an optimal reception beam for the new transmission beam and receives the PDSCH by using the reception beam.

With respect to the downlink transmission beams that can be received by the current reception beam of the terminal 4*f*-01, the base station 4*f*-03 schedules the physical downlink shared channel (PDSCH) for the terminal 4*e*-01 through the PDCCH (layer-1 signaling) without separate notification to the terminal 4*f*-01 at operation 4*f*-50.

Figure 4G:
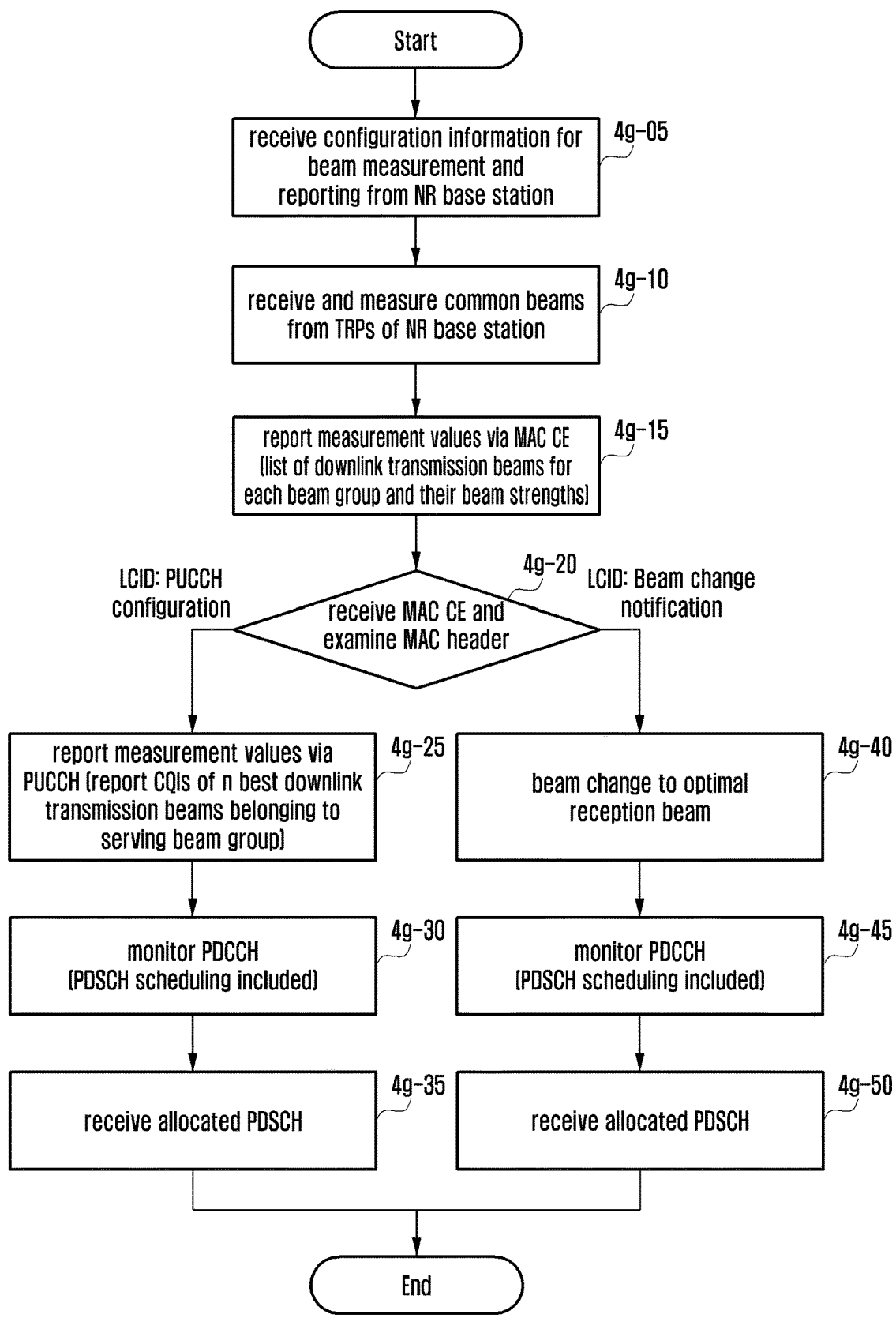
FIG. 4G is a flowchart illustrating operations of a terminal according to an embodiment of the present disclosure.

FIG. 4G is a flowchart illustrating operations of a terminal according to an embodiment of the present disclosure.

Referring to FIG. 4G, it is assumed that the terminal is already connected to the base station or cell and can receive data from the beam of the corresponding cell. Thereafter, for mobility management of the terminal in the connected mode, the terminal receives a measurement configuration indication message for beam measurement and reporting from the NR base station at operation 4*g*-05. This measurement configuration indication message may specify periodic beam measurement or one or more of the following events. If the configured condition is satisfied, the terminal reports the measurement result to the base station.

Event 1: the signal strength/quality of the serving beam or beam group becomes better than a preset threshold Event 2: the signal strength/quality of the serving beam or beam group becomes worse than a preset threshold Event 3: the signal strength/quality of the beam or beam group of a different TRP in the same cell becomes offset better than that of the best beam or beam group of the current TRP in the same cell Event 4: the signal strength/quality of the beam or beam group of a different TRP in the same cell becomes better than a preset threshold Event 5: the signal strength/quality of the serving beam becomes worse than threshold 1 and the signal strength/quality of the beam or beam group of a different TRP in the same cell becomes better than threshold 2

The terminal measures the signal strength of beams of the TRPs of the NR base station at operation 4*g*-10. If the measurement report triggering condition set by the base station is satisfied, the terminal reports the measurement result to the base station through a MAC CE at operation 4*g*-15. The beam measurement results of the MAC CE may include the following information.

Serving beam group measurements: a list of downlink transmission beams that can be received by the current reception beam of the terminal and their beam strengths Candidate beam M−1 group measurements: a list of downlink transmission beams that can be received by reception beam M−1 of the terminal and their beam strengths (M is the number of reception beams of the terminal)

Thereafter, the base station compares the signal strengths of the downlink transmission beams for each beam group reported by the terminal to determine whether to change the current reception beam of the terminal, and performs different operations according to the determination result. The first operation is performed when the measurement value of the current serving beam group is greater than that of the candidate beam group, and the second operation is performed when the measurement value of the current serving beam group is less than that of the candidate beam group. As a response to the measurement report, the terminal receives a MAC CE at operation 4*g*-20. The terminal may check the logical channel ID (LCID) of the received MAC header to identify the MAC CE. The terminal performs the first operation if the MAC CE is for PUCCH configuration, and performs the second operation if the MAC CE is for beam change notification.

For the first operation, the terminal reports the CQIs of the n best downlink transmission beams belonging to the serving beam group according to the PUCCH configuration of the MAC CE at operation 4*g*-25. Here, the value of n may be set by the base station or may be preset by the terminal. Thereafter, the terminal receives a PDSCH schedule from the base station while monitoring the PDCCH at operation 4*g*-30, and receives data through the allocated PDSCH at operation 4*g*-35. Here, the base station may schedule the PDSCH to be used for data transmission after changing the downlink transmission beam to the transmission beam with the largest measurement value among the n downlink transmission beams reported by the terminal without separate notification to the terminal.

For the second operation, the terminal changes the reception beam to an optimal reception beam according to the reception beam change request of the received MAC CE at operation 4*g*-40. Thereafter, the terminal receives a PDSCH schedule from the base station while monitoring the PDCCH through the changed reception beam at operation 4*g*-45, and receives data through the allocated PDSCH at operation 4*g*-50. Here, the base station may schedule the PDSCH to be used for data transmission after changing the downlink transmission beam to the transmission beam with the largest measurement value among the n downlink transmission beams reported by the terminal without separate notification to the terminal.

The procedure may start with operation 4*g*-10 if the condition (period or event trigger) set by the measurement and reporting configuration of the base station is satisfied.

Figure 4H:
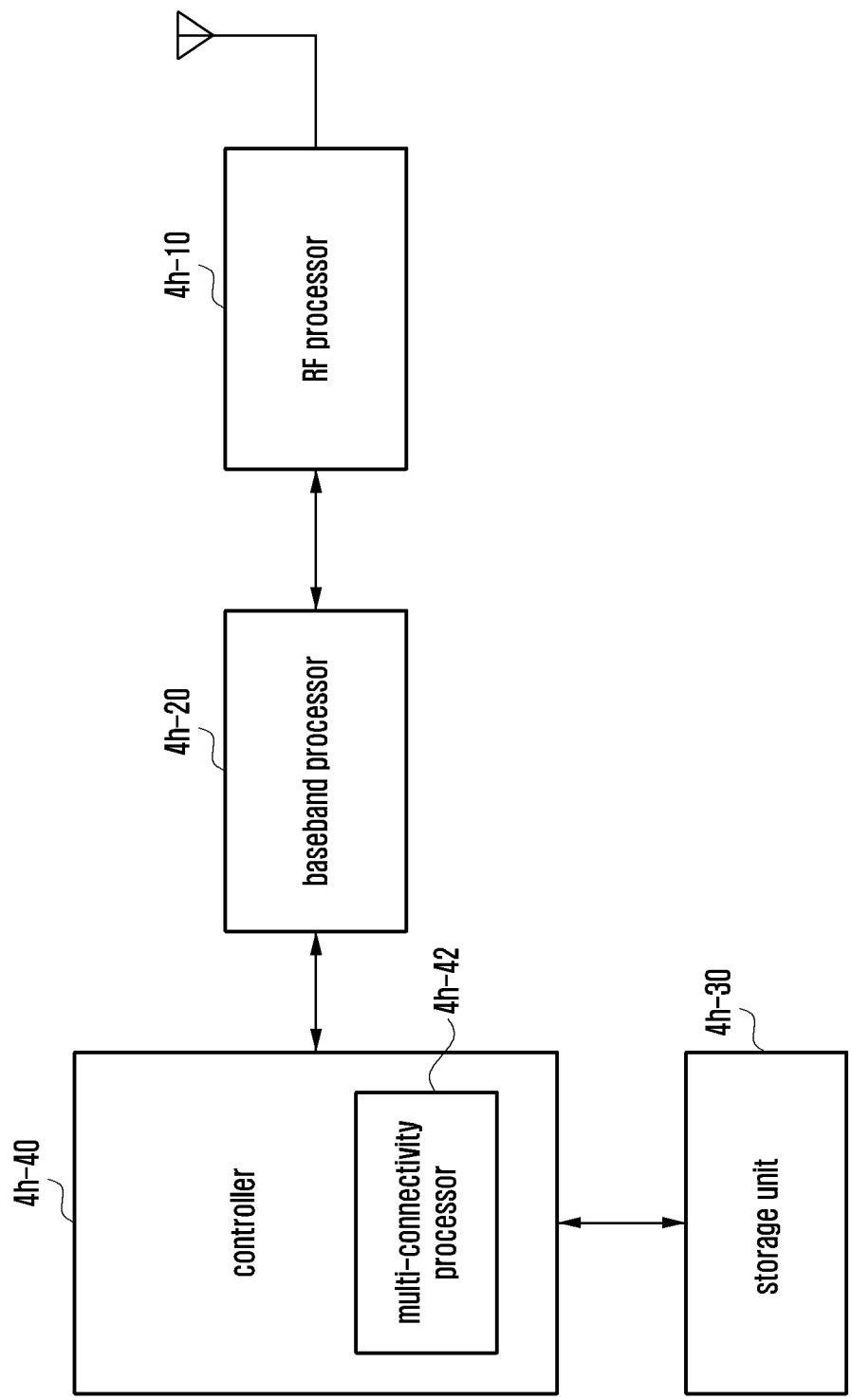
FIG. 4H is a block diagram of a terminal according to an embodiment of the present disclosure.

FIG. 4H is a block diagram of a terminal according to an embodiment of the present disclosure.

Referring to FIG. 4H, the terminal may include an RF processor 4*h*-10, a baseband processor 4*h*-20, a storage unit 4*h*-30, and a controller 4*h*-40.

The RF processor 4*h*-10 performs a function for transmitting and receiving a signal through a wireless channel, such as signal conversion between bands and amplification. For example, the RF processor 4*h*-10 upconverts a baseband signal from the baseband processor 4*h*-20 into an RF signal and transmits the RF signal through an antenna, and downconverts an RF signal received through the antenna into a baseband signal. For example, the RF processor 4*h*-10 may include a transmit filter, a receive filter, an amplifier, a mixer, an oscillator, a DAC, and an ADC. Although only one antenna is shown in FIG. 4H, the terminal may have a plurality of antennas. The RF processor 4*h*-10 may include a plurality of RF chains. Further, the RF processor 4h-10 may perform beamforming. For beamforming, the RF processor 4h-10 may adjust the phase and magnitude of each of the signals transmitted and received through multiple antennas or antenna elements. The RF processor 4h-10 may perform multiple input and multiple output (MIMO) operation. During MIMO operation, multiple layers can be received.

The baseband processor 4h-20 performs a function for conversion between a baseband signal and a bit string according to the physical layer standard of the system. For example, when transmitting data, the baseband processor 4h-20 generates complex symbols by encoding and modulating a transmission bit string. When receiving data, the baseband processor 4h-20 reconstructs a reception bit string by demodulating and decoding a baseband signal from the RF processor 4h-10. More specifically, in an OFDM scheme, when transmitting data, the baseband processor 4h-20 generates complex symbols by encoding and modulating a transmission bit string, maps the complex symbols to subcarriers, and generates OFDM symbols through IFFT and CP insertion. When receiving data, the baseband processor 4h-20 divides the baseband signal from the RF processor 4h-10 into OFDM symbols, recovers signals mapped to subcarriers through FFT, and reconstructs a reception bit string through demodulation and decoding.

As described above, the baseband processor 4h-20 and the RF processor 4h-10 transmit and receive signals. Hence, the baseband processor 4h-20 and the RF processor 4h-10 may be referred to as a transmitter, receiver, transceiver, or communication unit. At least one of the baseband processor 4h-20 and the RF processor 4h-10 may include a plurality of communication modules to support different radio access technologies. At least one of the baseband processor 4h-20 and the RF processor 4h-10 may include different communication modules to process signals of different frequency bands. For example, the different radio access technologies may include a wireless LAN technology (e.g., IEEE 802.11) and a cellular network technology (e.g., LTE). The different frequency bands may include SHF bands (e.g., 2.5 GHz, 5 GHz) and mm wave bands (e.g., 60 GHz).

The storage unit 4h-30 stores basic programs, application programs, and data, such as configuration information for the operation of the terminal. More particularly, the storage unit 4h-30 may store information on the second access node performing wireless communication using the second wireless access technology. The storage unit 4h-30 provides stored data at the request of the controller 4h-40.

The controller 4h-40 controls the overall operation of the terminal. For example, the controller 4h-40 transmits and receives a signal through the baseband processor 4h-20 and the RF processor 4h-10. The controller 4h-40 writes and reads data to and from the storage unit 4h-30. To this end, the controller 4h-40 may include at least one processor. For example, the controller 4h-40 may include a CP to control communication and an AP to control the higher layers, such as application programs. In one embodiment, the controller 4h-40 includes a multi-connectivity processor 4h-42 to process operations in the multi-connectivity mode.

Figure 4I:
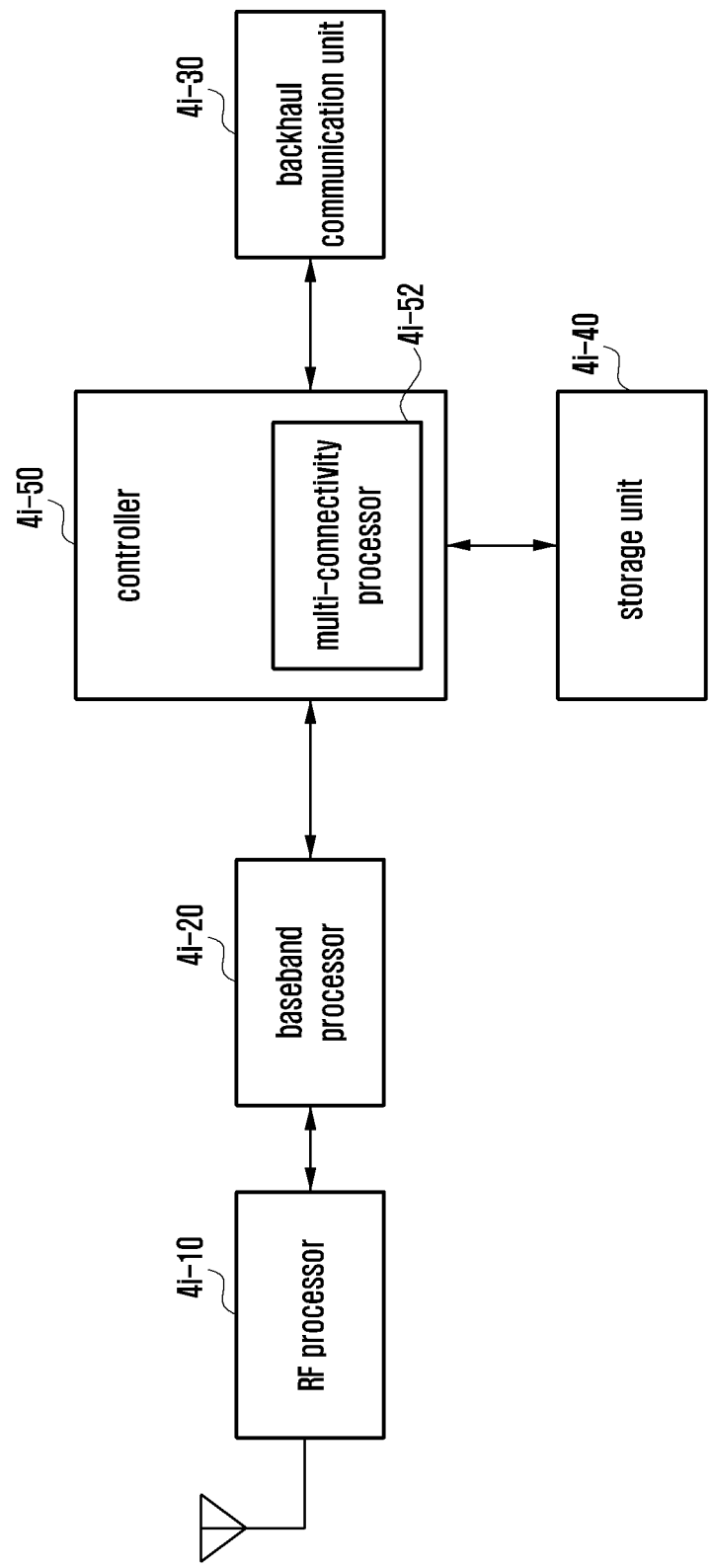
FIG. 4I is a block diagram of an NR base station according to an embodiment of the present disclosure.

FIG. 4I is a block diagram of an NR base station according to an embodiment of the present disclosure.

Referring to FIG. 4I, the NR base station may include an RF processor 4i-10, a baseband processor 4i-20, a backhaul communication unit 4i-30, a storage unit 4i-40, and a controller 4i-50.

The RF processor 4i-10 performs a function for transmitting and receiving a signal through a wireless channel, such as signal conversion between bands and amplification. For example, the RF processor 4i-10 upconverts a baseband signal from the baseband processor 4i-20 into an RF signal and transmits the RF signal through an antenna, and downconverts an RF signal received through the antenna into a baseband signal. For example, the RF processor 4i-10 may include a transmit filter, a receive filter, an amplifier, a mixer, an oscillator, a DAC, and an ADC. Although only one antenna is shown in FIG. 4I, the first access node may have a plurality of antennas. The RF processor 4i-10 may include a plurality of RF chains. Further, the RF processor 4i-10 may perform beamforming. For beamforming, the RF processor 4i-10 may adjust the phase and magnitude of each of the signals transmitted and received through multiple antennas or antenna elements. The RF processor 4i-10 may transmit one or more layers for downlink MIMO operation.

The baseband processor 4i-20 performs a function for conversion between a baseband signal and a bit string according to the physical layer standard of the first RAT. For example, when transmitting data, the baseband processor 4i-20 generates complex symbols by encoding and modulating a transmission bit string. When receiving data, the baseband processor 4i-20 reconstructs a reception bit string by demodulating and decoding a baseband signal from the RF processor 4i-10. More specifically, in an OFDM scheme, when transmitting data, the baseband processor 4i-20 generates complex symbols by encoding and modulating a transmission bit string, maps the complex symbols to subcarriers, and generates OFDM symbols through IFFT and CP insertion. When receiving data, the baseband processor 4i-20 divides the baseband signal from the RF processor 4i-10 into OFDM symbols, recovers signals mapped to subcarriers through FFT, and reconstructs a reception bit string through demodulation and decoding. As described above, the baseband processor 4i-20 and the RF processor 4i-10 transmit and receive signals. Hence, the baseband processor 4i-20 and the RF processor 4i-10 may be referred to as a transmitter, receiver, transceiver, communication unit, or wireless communication unit.

The backhaul communication unit 4i-30 provides an interface to communicate with other nodes in the network. For example, the backhaul communication unit 4i-30 may convert a bit string to be transmitted from the primary base station to another node, such as a secondary base station and the CN into a physical signal, and may convert a physical signal received from the other node into a bit string.

The storage unit 4i-40 stores basic programs, application programs, and data, such as configuration information for the operation of the primary base station. More particularly, the storage unit 4i-40 may store information on the bearers allocated to the connected terminals, and measurement results reported from the connected terminals. The storage unit 4i-40 may store information on the criteria for determining whether to provide or discontinue a multi-connectivity service to a terminal. The storage unit 4i-40 provides stored data at the request of the controller 4i-50.

The controller 4i-50 controls the overall operation of the primary base station. For example, the controller 4i-50 transmits and receives a signal through the baseband processor 4i-20 and the RF processor 4i-10 or through the backhaul communication unit 4i-30. The controller 4i-50 writes and reads data to and from the storage unit 4i-40. To this end, the controller 4i-50 may include at least one processor. In one embodiment, the controller 4i-50 includes a multi-connectivity processor 4i-52 to process operations in the multi-connectivity mode.

The present disclosure has the rights of the following claims.

A method whereby a terminal performs beam management for mobility and connection management in a cell 1. A method for the terminal to measure downlink transmission beams of a base station performing beam measurement and reporting according to the measurement conditions set by the base station measuring downlink beams of multiple TRPs of one base station or a cell and measuring reception beams of the terminal measuring the beam strength while sweeping the downlink transmission beams and the reception beams of the terminal.

2. A method for the terminal to report measurement results to the base station the measurement report includes serving beam group measurement results and candidate beam group measurement results serving beam group measurements include a list of downlink transmission beams that can be received by the current reception beam of the terminal and their beam strengths candidate beam M−1 group measurements include a list of downlink transmission beams that can be received by reception beam M−1 of the terminal and their beam strengths (M is the number of reception beams of the terminal)

Figure 5A:
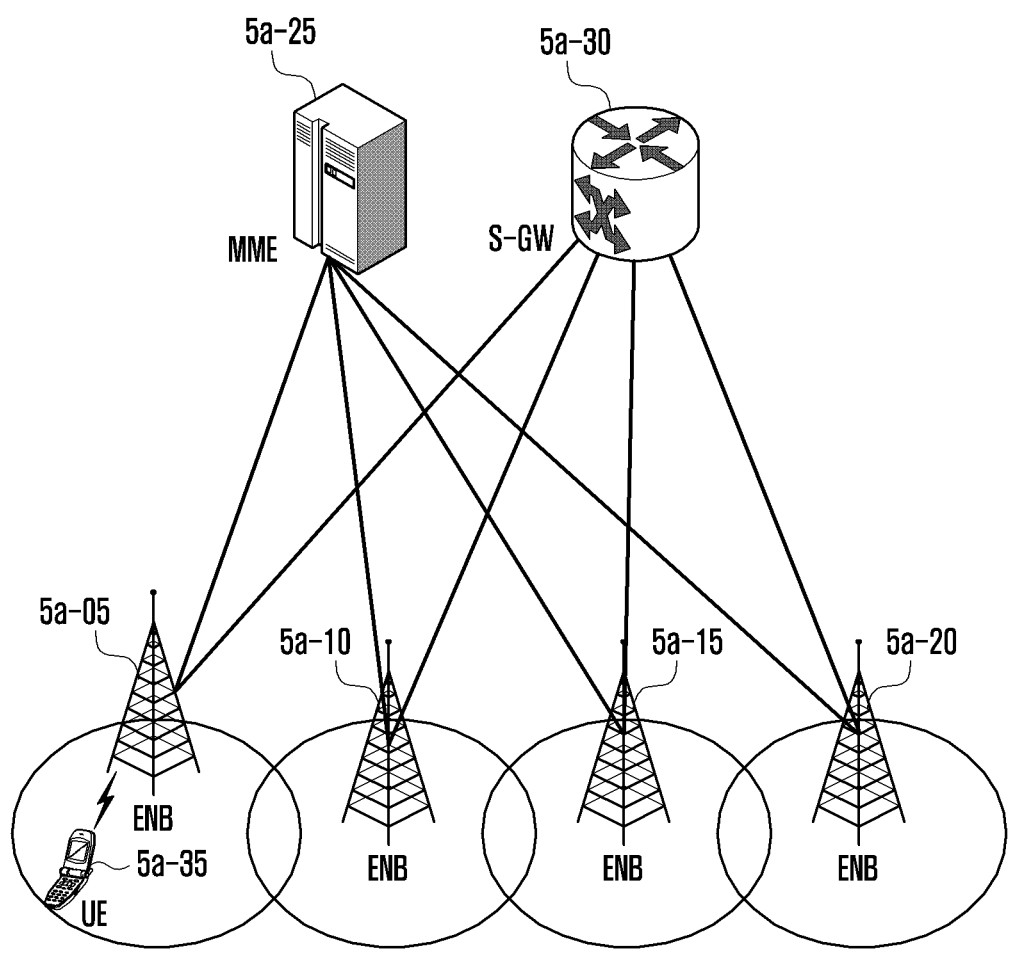
FIG. 5A illustrates an architecture of an LTE system according to an embodiment of the present disclosure.

3. A method for the terminal to perform a first operation and a second operation depending on whether the reception beam of the terminal has been changed The first operation is performed when a PUCCH configuration is indicated by L2 signaling (MAC CE) from the base station (the base station transmits the MAC CE when the measurement value of the current serving beam group is greater than that of the candidate beam group)

reporting the CQIs of the n best downlink transmission beams belonging to the serving beam group according to the PUCCH configuration of the L2 signaling (MAC CE)

receiving a PDSCH schedule from the base station while monitoring the PDCCH receiving data through the allocated PDSCH The second operation is performed when a beam change notification is indicated by L2 signaling (MAC CE) from the base station (the base station transmits the MAC CE when the measurement value of the current serving beam group is less than that of the candidate beam group)

changing the reception beam to an optimal reception beam indicated by the received L2 signaling (MAC CE)

receiving a PDSCH schedule from the base station while monitoring the PDCCH receiving data through the allocated PDSCH for the first operation and second operation, changing, by the base station, the transmission beam to the beam with the largest measurement value among the n downlink transmission beams reported by the terminal without separate notification to the terminal Fifth Embodiment FIG. 5A illustrates an architecture of an LTE system according to an embodiment of the present disclosure.

Referring to FIG. 5A, the radio access network of the LTE system may include base stations ENBs 5a-05, 5a-10, 5a-15 and 5a-20, an MME 5a-25, and an S-GW 5a-30. A UE or terminal 5a-35 may connect to an external network through the ENBs 5a-05, 5a-10, 5a-15 and 5a-20 and the S-GW 5a-30.

In FIG. 5A, the ENBs 5a-05 to 5a-20 correspond to Node Bs of the UMTS system, but perform more complex functions in comparison to existing Node Bs. The ENBs 5a-05 to 5a-20 may be connected to the UE 5a-35 through wireless channels. In the LTE system, all user traffic including real-time services like voice over IP (VoIP) services is served by shared channels. Hence, it is necessary to perform scheduling based on collected status information regarding buffers, available transmit powers and channels of UEs. Each of the ENBs 5a-05 to 5a-20 performs this scheduling function. In most cases, each ENB controls multiple cells. To achieve a data rate of 100 Mbps in a 20 MHz bandwidth, the LIE system utilizes OFDM as RAT. The LTE system employs AMC to determine the modulation scheme and channel coding rate according to channel states of UEs. The S-GW 5a-30 provides data bearers, and creates and removes data bearers under the control of the MME 5a-25. The MME 5a-25 is connected to multiple ENBs and performs various control functions including mobility management for UEs.

Figure 5B:
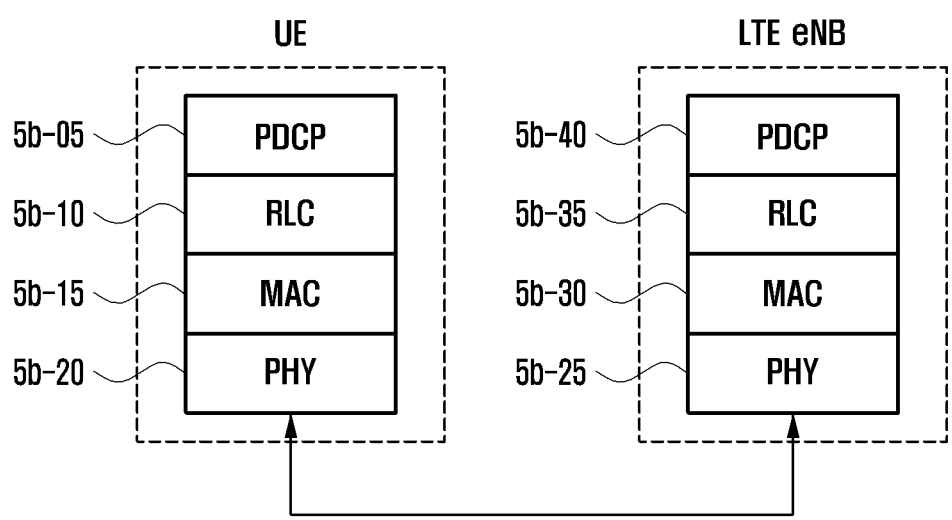
FIG. 5B illustrates a structure of wireless protocols in an LTE system according to an embodiment of the present disclosure.

FIG. 5B illustrates a structure of wireless protocols in an LTE system according to an embodiment of the present disclosure.

Referring to FIG. 5B, in the LTE system, a UE and an ENB each include a wireless protocol stack including PDCP 5b-05 or 5b-40, RLC 5b-10 or 5b-35, and MAC 5b-15 or 5b-30. The PDCP 5b-05 or 5b-40 performs compression and decompression of IP headers. The main functions of the PDCP may be summarized as follows.

- Header compression and decompression (robust header compression (ROHC) only)
- Transfer of user data
- In-sequence delivery of higher layer PDUs at PDCP re-establishment procedure for RLC acknowledged mode (AM)
- Sequence reordering (for split bearers in DC (only support for RLC AM): PDCP PDU routing for transmission and PDCP PDU reordering for reception)
- Duplicate detection (duplicate detection of lower layer service data units (SDUs) at PDCP re-establishment procedure for RLC AM)
- Retransmission (retransmission of PDCP SDUs at handover, and for split bearers in DC, retransmission of PDCP PDUs at PDCP data-recovery procedure for RLC AM)
- Ciphering and deciphering
- Timer-based SDU discard in uplink The RLC 5b-10 or 5b-35 reconfigures PDCP PDUs to a suitable size and performs ARQ operation. The main functions of the RLC may be summarized as follows.

- Transfer of higher layer PDUs
- Error correction through ARQ (only for AM data transfer)
- Concatenation, segmentation and reassembly of RLC SDUs (only for UM and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MAC 5b-15 or 5b-30 is connected with multiple RLC layer entities in a UE. The MAC 5b-15 or 5b-30 multiplexes RLC PDUs into MAC PDUs and demultiplexes MAC PDUs into RLC PDUs. The main functions of the MAC may be summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
HARQ (error correction through HARQ)
Priority handling between logical channels of one UE
Priority handling between UEs by means of dynamic scheduling
multimedia broadcast multicast service (MBMS) service identification
Transport format selection
Padding The PHY layer 5b-20 or 5b-25 converts higher layer data into OFDM symbols by means of channel coding and modulation and transmits the OFDM symbols through a wireless channel, and converts OFDM symbols received through a wireless channel to higher layer data by means of demodulation and channel decoding and forwards the data to the higher layers.

Figure 5C:
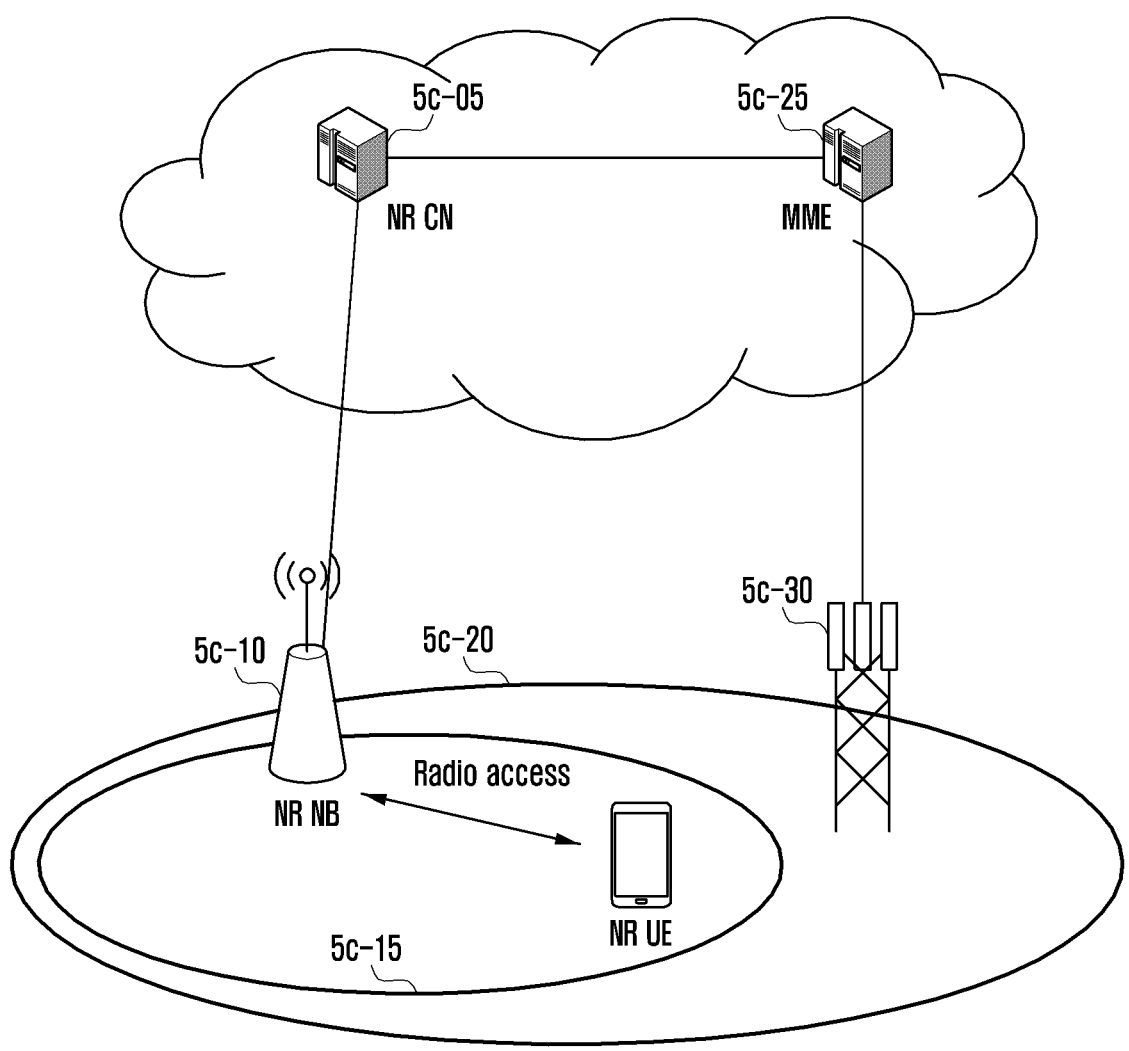
FIG. 5C illustrates an architecture of a next generation mobile communication system according to an embodiment of the present disclosure.

FIG. 5C illustrates an architecture of a next generation mobile communication system according to an embodiment of the present disclosure.

Referring to FIG. 5C, the radio access network of the next generation mobile communication system includes a next generation base station (e.g., a new radio node B, NR gNB, or NR base station) 5c-10 and an NR CN 5c-05. A user equipment (new radio user equipment, NR UE or terminal) 5c-15 may connect to an external network through the NR gNB 5c-10 and the NR CN 5c-05.

In FIG. 5C, the NR gNB 5c-10 included in network 5c-20 corresponds to the eNB of the existing LTE system. The NR gNB 5c-10 is connected to the NR UE 5c-15 through a wireless channel and can provide a higher level of service compared to the existing node B. In the next generation mobile communication system, all user traffic is served by shared channels. Hence, it is necessary to perform scheduling based on collected status information regarding buffers, available transmit powers and channels of UEs. The NR gNB 5c-10 performs this scheduling function. In general, the NR gNB 5c-10 may control multiple cells. To realize much higher data transfer rates compared to the existing LTE system, the next generation mobile communication system may have bandwidths wider than the existing maximum bandwidth and utilize OFDM as RAT in combination with beamforming. It employs AMC to determine the modulation scheme and channel coding rate according to channel states of terminals. The NR CN 5c-05 may perform mobility support, bearer setup, and QoS setup functions. The NR CN is connected to multiple base stations and performs various control functions including mobility management for terminals. The next generation mobile communication system can cooperate with the existing LTE system, and the NR CN is connected with the MME 5c-25 through a network interface. The MME 5c-25 is connected to the eNB 5c-30, which is a legacy base station.

Figure 5D:
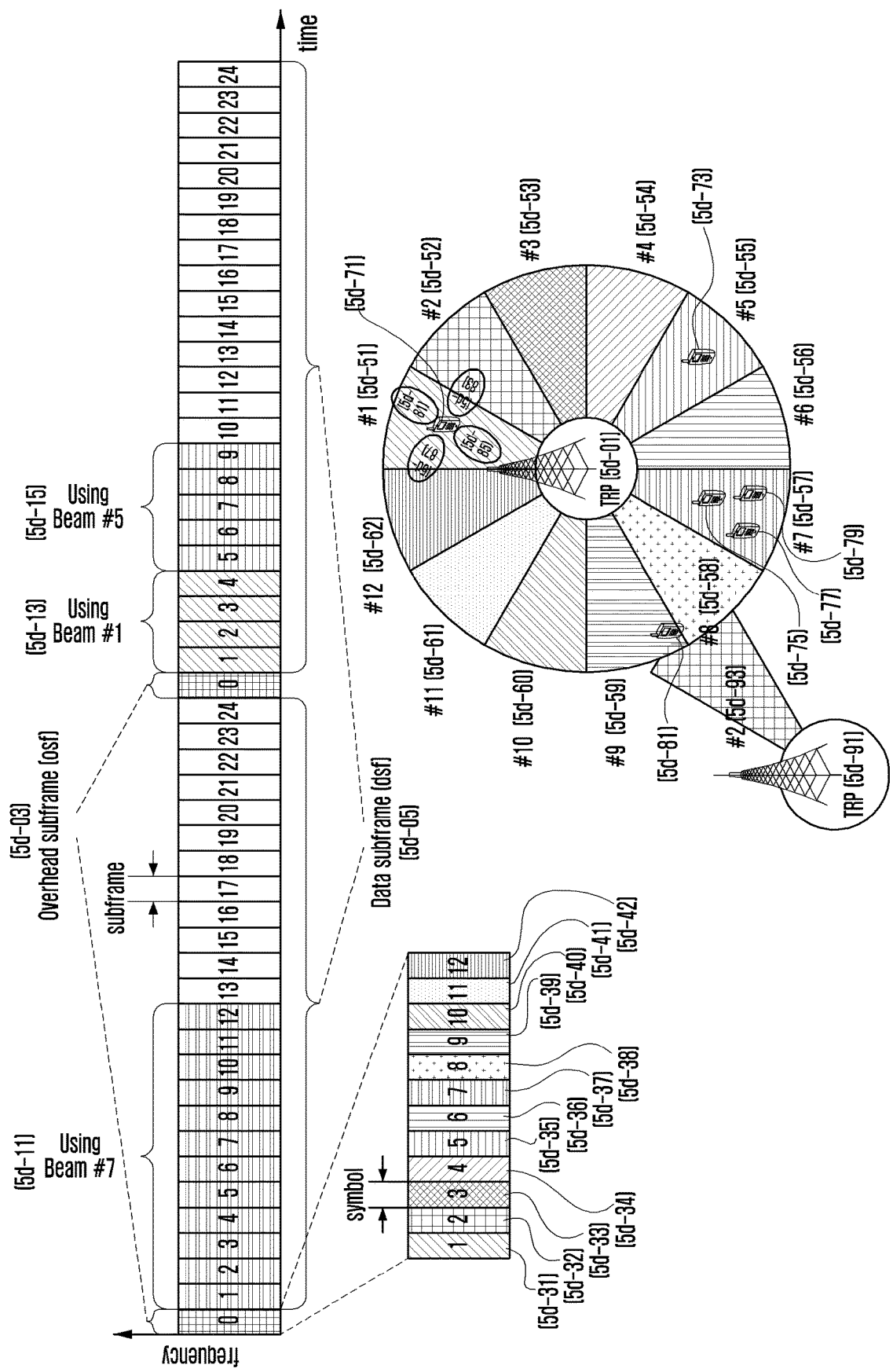
FIG. 5D illustrates a frame structure used by an NR system according to an embodiment of the present disclosure.

FIG. 5D illustrates a frame structure used by an NR system according to an embodiment of the present disclosure.

Referring to FIG. 5D, in the NR system, for higher transmission rates compared to the LTE system, the use of high frequencies can be considered to ensure wider bandwidths. More particularly, at high frequencies, it can be considered to generate directional beams to transmit data at a high rate to the terminal.

As such, it is possible to consider a scenario in which the NR base station or TRP 5d-01 communicates with terminals 5d-71, 5d-73, 5d-75, 5d-77 and 5d-79 in the cell using different beams.

Referring to FIG. 5D, it is assumed that terminal 1 (5d-71) communicates using beam #1 (5d-51), terminal 2 (5d-73) communicates using beam #5 (5d-55), and terminals 3, 4, 5 (5d-75) (5d-77) (5d-79) communicate using beam #7 (5d-57).

To identify the beams used by terminals to communicate with the TRP, an OSF (5d-03) at which a common overhead signal is sent is present in the time domain. At the OSF, a PSS for acquiring the timing of OFDM symbols, a SSS for detecting the cell ID, an ESS for acquiring the timing of subframes, and a BRS for identifying beams may be transmitted. The PBCH containing system information, MIB, or information essential for a terminal to access the system (e.g., downlink beam bandwidth, system frame number) may also be sent. In the OSF, the base station transmits a reference signal using a different beam for each symbol (or over several symbols). A beam index for distinguishing each beam may be derived from the reference signal. In FIG. 5D, it is assumed that the base station uses 12 beams from beam #1 (5d-51) to beam #12 (5d-62) for transmission, and a different beam is swept and transmitted for each symbol in the OSF. For example, as one beam is transmitted at each symbol (e.g., transmission of beam #1 (5d-51) at the first symbol 5d-31) in the OSF, the terminal can measure the OSF and identify the beam with the highest signal strength among the beams transmitted in the OSF.

In FIG. 5D, it is assumed that the OSF is repeated every 25 subframes and the remaining 24 subframes are DSFs 5d-05 in which regular data is transmitted and received. According to scheduling of the base station, terminals 3, 4, 5 (5d-75) (5d-77) (5d-79) may communicate commonly using beam #7 (5d-11), terminal 1 (5d-71) may communicate using beam #1 (5d-13), and terminal 2 (5d-73) may communicate using beam #5 (5d-15). Although FIG. 5D mainly shows 12 transmission beams 5d-51 to 5d-62 of the base station, a terminal may have reception beams to receive the transmission beams of the base station (e.g., terminal 1 (5d-71) has four reception beams 5d-81, 5d-83, 5d-85, 5d-87). Terminal 1 having four beams 5d-81, 5d-83, 5d-85, 5d-87 may perform beam sweeping to identify the beam with the best reception performance. Here, if multiple beams cannot be used at the same time, by receiving multiple OSFs as many as the number of reception beams (one reception beam for each OSF), it is possible to find an optimal pair of the transmission beam of the base station and the reception beam of the terminal.

Moreover, the first frame 0 of the frame structure includes 12 symbols: the first symbol (5d-31), a second symbol (5d-32), a third symbol (5d-33), a fourth symbol (5d-34), a fifth symbol (5d-35), a sixth symbol (5d-36), a seventh symbol (5d-37), an eighth symbol (5d-38), a ninth symbol (5d-39), a tenth symbol (5d-40), an eleventh symbol (5d-41), and a twelfth symbol (5d-42).

In addition, it is possible to consider such a case where terminal 6 (5d-81) is located at the boundary of each beam coverage. More particularly, terminal 6 (5d-81) is located between beam #8 (5d-58) and beam #9 (5d-59) of the NR base station 5d-01 and may receive the signal of beam #2 (5d-93) of another base station 5d-91. In this situation, if terminal 6 performs signal measurement, the signal strength of beam #2 (5*d*-93) of the different base station 5*d*-91 will be highest. If the terminal measures and reports only one beam, the base station may misunderstand the channel conditions. For example, although the signal strength of beam #2 (5*d*-93) is highest, it is necessary for the terminal to send a measurement report for beam #8 (5*d*-58) and beam #9 (5*d*-59) together with beam #2 (5*d*-93) so that the base station does not issue an unnecessary handover command to the terminal (i.e., handover from NR base station 5*d*-01 to base station 5*d*-91).

Figure 5E:
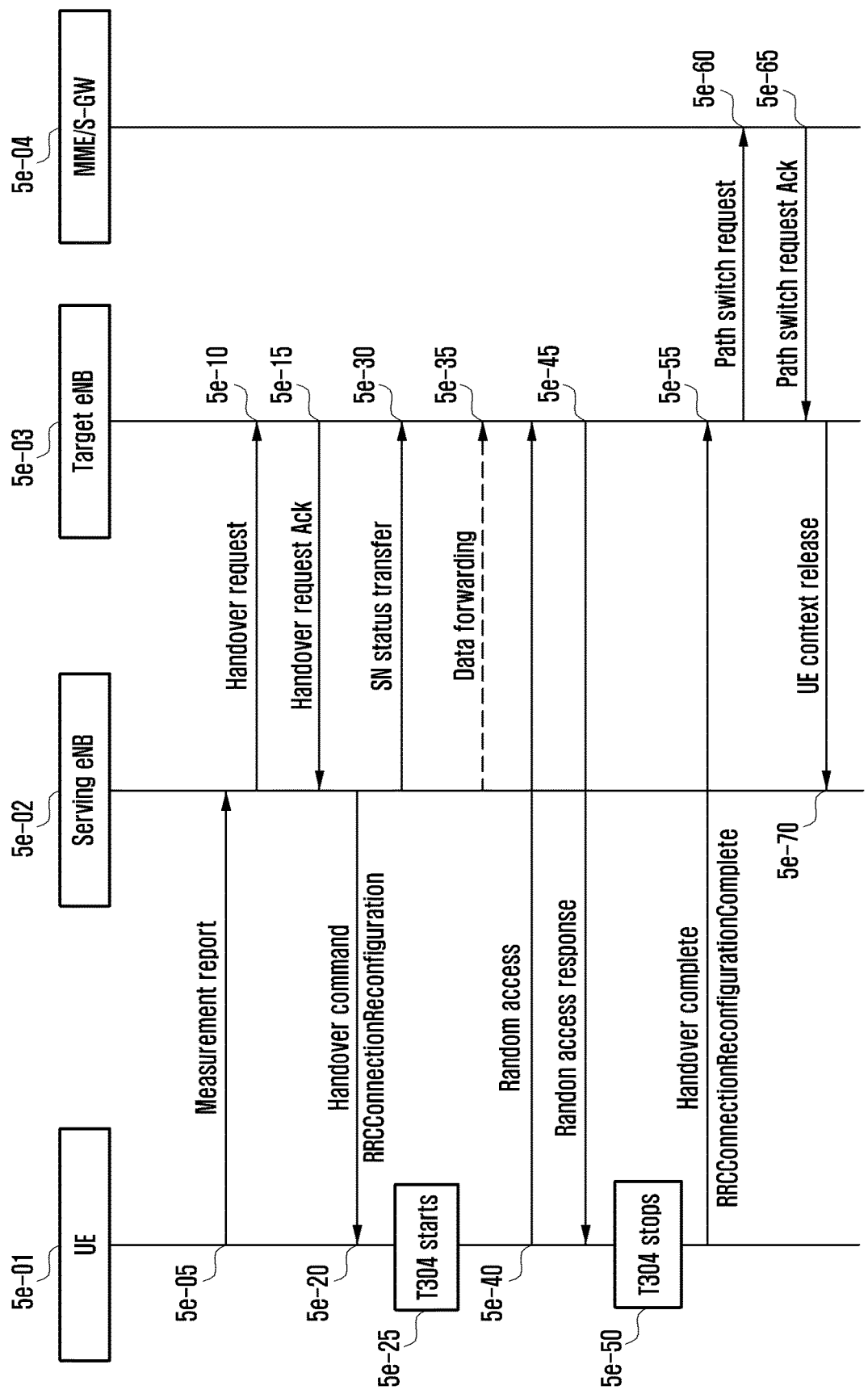
FIG. 5E is a sequence diagram illustrating a handover process in an existing LTE system according to an embodiment of the present disclosure.

FIG. 5E is a sequence diagram illustrating a handover process in an existing LTE system according to an embodiment of the present disclosure.

Referring to FIG. 5E, when a periodic or specific event is satisfied, a UE or terminal 5*e*-01 in the connected mode reports cell measurement information (measurement report) to a serving eNB 5*e*-02 at operation 5*e*-05. Based on the measurement information, the serving eNB determines whether to hand over the terminal to a neighbor cell. Handover is to change the serving cell or base station providing a service to the terminal in the connected mode to another cell or base station. Upon determining to hand over, the serving eNB sends a handover (HO) request message to a target eNB 5*e*-03 (new base station that will serve the terminal) at operation 5*e*-10. If the target eNB accepts the HO request, it transmits an HO request Ack message to the serving eNB at operation 5*e*-15. Upon receiving the HO request Ack message, the serving eNB transmits an HO command message to the terminal at operation 5*e*-20. Before receiving the HO command, the UE continuously receives the downlink channel PDCCH/PDSCH/PHICH from the serving eNB and transmits the uplink channel PUSCH/PUCCH. The HO command is transmitted by the serving cell to the UE by using an RRC connection reconfiguration message. Upon reception of the HO command message, the UE stops data transmission and reception with the serving eNB and starts the T304 timer at operation 5*e*-25. When the UE fails to hand over to the target cell within a preset time, the T304 timer causes the UE to return to its original configuration and transition to the RRC idle state. The serving eNB forwards the sequence number (SN) status for the uplink/downlink data to the target eNB at operation 5*e*-30, and, if downlink data is present, forwards the downlink data to the target eNB at operation 5*e*-35. The UE attempts random access to the target cell indicated by the serving cell at operation 5*e*-40. The random access is performed to notify the target cell that the UE moves thereto owing to handover and to achieve uplink synchronization. For random access, the UE transmits the target cell a preamble corresponding to the preamble ID provided by the serving cell or randomly selected. In a preset number of subframes after transmission of the preamble, the UE monitors whether a RAR is transmitted from the target cell. This monitoring time duration is referred to as a random access response window (RAR window). When a RAR is received within the RAR window at operation 5*e*-45, the UE transmits an RRCConnectionReconfigurationComplete message containing a HO complete message to the target cell at operation 5*e*-55. Thereafter, the UE continuously receives the downlink channel PDCCH/PDSCH/PHICH from the target cell and transmits the uplink channel PUSCH/PUCCH. Upon successfully receiving a random access response from the target cell, the UE stops the T304 timer at operation 5*e*-50. To modify the path of the bearers that have been set for the serving cell, the target cell sends a path switch request to an MME/S-GW 5*e*-04 at operation 5*e*-60, receives a corresponding response from the MME/S-GW 5*e*-04 at operation 5*e*-65, and sends a UE context release request to the serving cell at operation 5*e*-70. The UE attempts to receive data from the target cell at the start of the RAR window, after RAR reception, the UE transmits an RRCConnectionReconfigurationComplete message, and the UE starts transmission to the target cell.

FIG. 5F is a sequence diagram illustrating a process of successful conditional handover to a target cell as embodiment 5-1 according to an embodiment of the present disclosure.

Referring to FIG. 5F, in the next generation mobile communication system, the performance of the radio link of the terminal is more likely to suddenly deteriorate compared with the existing LTE system. Since the beams do not cover all directions but support a narrow area, they are sensitive to the mobility of the terminal and channel changes. For example, if the terminal moves out of the serving beam coverage, it may not be able to complete the handover procedure through RRC signaling in the serving cell. To avoid such a situation, it is necessary for the serving cell to send a handover command to the terminal a little earlier than the handover command in the LTE system. To this end, it is possible to apply a smaller threshold to the event triggering measurement in comparison to the corresponding threshold of the existing LTE system. The terminal can perform its own handover procedure based on the information included in the handover command transmitted from the serving cell. This procedure is described in detail below.

When a periodic or specific event is satisfied, the UE or terminal 5*f*-01 in the connected mode reports cell measurement information (measurement report) to the serving eNB 5*f*-02 at operation 5*f*-05. Based on the cell measurement information, the serving eNB determines whether to hand over the terminal 5*f*-01 to a neighbor cell. Handover is to change the serving cell or base station providing a service to the terminal in the connected mode to another cell or base station. Upon determining to hand over, the serving cell makes a handover request by sending a handover (HO) request message to the target eNB 5*f*-03 (new base station that will serve the terminal) at operation 5*f*-10. If the target cell accepts the HO request, it transmits an HO request Ack message to the serving cell at operation 5*f*-15. Upon receiving the HO request Ack message, the serving cell transmits an HO command message to the terminal at operation 5*f*-20. Before receiving the HO command, the terminal continuously receives the downlink channel PDCCH/PDSCH/PHICH from the serving cell and transmits the uplink channel PUSCH/PUCCH. The HO command is transmitted by the serving cell to the terminal by using an RRC connection reconfiguration message. The above handover message may include the following information.

Thres_s: threshold for serving cell
    Thres_t: threshold for target cell
    Period_h: time duration during which target cell quality is higher than Thres_t for handover decision
    Period_i: time duration during which serving/target cell quality is lower than threshold for determining inactive state transition
    Target cell information (cell id, random access resource, and the like)
    Inactive state information (resume ID, RAN area info, and the like)

Upon reception of the handover command message, the terminal performs handover evaluation at operation 5*f*-25. The terminal compares the signal quality of the serving cell with Thres_s and compares the signal quality of the target cell with Thres_t. If signal qualities of the serving cell and the target cell satisfy the following conditions, the terminal transmits the handover evaluation result to the base station at operation 5*f*-30. In this embodiment, a description is given of the type-2 event corresponding to a situation where if the signal quality of the target cell remains higher than Thres_t for Period_h, handover is performed to the target cell. Note that when the type-1 event occurs, the terminal maintains the connection with the serving cell.

TABLE 1

|  | Serving cell is good | Serving cell is bad |
| --- | --- | --- |
| Target cell is good | HO to the target cell (Type 2) | HO to the target cell (Type 2) |
| Target cell is bad | Stay in the serving cell (Type 1) | Transition to the inactive state (Type 3) |

If the handover evaluation result from the terminal is of type 2, the serving cell forwards the SN status for the uplink/downlink data to the target cell at operation 5*f*-35, and, if downlink data is present, forwards the downlink data to the target cell at operation 5*f*-40. In addition, upon determining to handover to the target cell, the terminal stops data transmission/reception with the serving cell and starts a timer at operation 5*f*-45. When the terminal fails to hand over to the target cell within a preset time, the timer causes the terminal to return to its original configuration and transition to the RRC idle or inactive state. The terminal attempts random access to the target cell indicated by the serving cell at operation 5*f*-50. The random access is performed to notify the target cell that the terminal moves thereto owing to handover and to achieve uplink synchronization. For random access, the terminal transmits the target cell a preamble corresponding to the preamble ID provided by the serving cell or randomly selected. In a preset number of subframes after transmission of the preamble, the terminal monitors whether an RAR is transmitted from the target cell. This monitoring time duration is referred to as a random access response window (RAR window). When a RAR is received within the RAR window at operation 5*f*-55, the terminal transmits an RRCConnectionReconfiguration-Complete message containing a HO complete message to the target cell at operation 5*f*-65. Thereafter, the terminal continuously receives the downlink channel PDCCH/PDSCH/PHICH from the target cell and transmits the uplink channel PUSCH/PUCCH. Upon successfully receiving a random access response from the target cell, the terminal stops the above timer at operation 5*f*-60. To modify the path of the bearers that have been set for the serving cell, the target cell sends a path switch request to an MME/S-GW 5*f*-04 at operation 5*f*-70, receives a corresponding response from the MME/S-GW 5*f*-04 at operation 5*f*-75, and sends a UE context release request to the serving cell at operation 5*f*-80. The terminal attempts to receive data from the target cell at the start of the RAR window, after RAR reception, the terminal transmits an RRCConnectionReconfigurationComplete message, and the terminal starts transmission to the target cell.

Figure 5G:
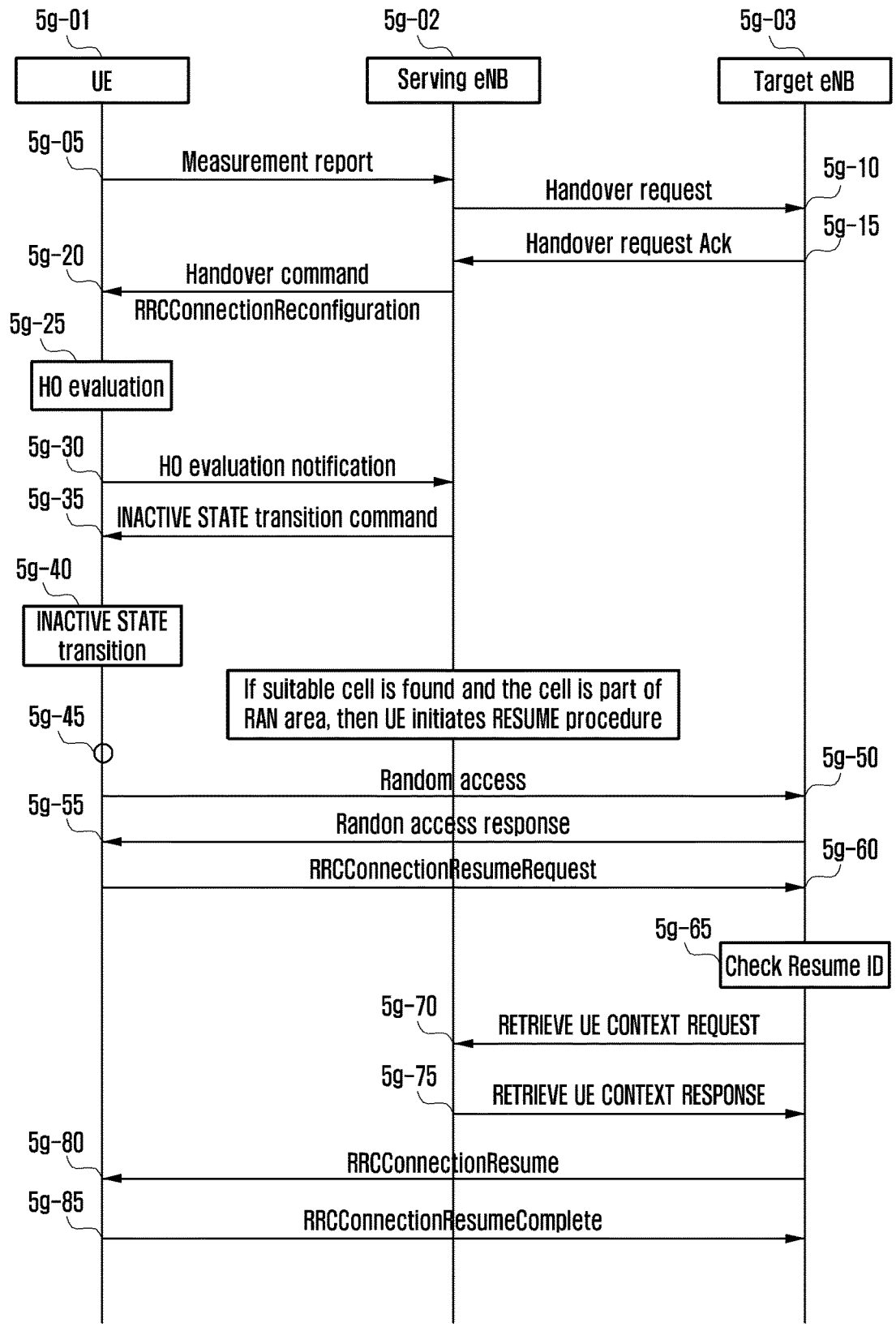
FIG. 5G is a sequence diagram illustrating a process of performing inactive state operation after failed conditional handover to a target cell as embodiment 5-2 according to an embodiment of the present disclosure.

FIG. 5G is a sequence diagram illustrating a process of performing inactive state operation after failed conditional handover to a target cell as embodiment 5-2 according to an embodiment of the present disclosure.

Referring to FIG. 5G, in the existing LTE system, if the quality of the radio links of both the serving cell and the target cell is poor, the terminal declares RLF and performs a connection recovery operation. For such a situation, the present disclosure proposes a procedure for transitioning to the inactive state other than the RLF state and performing a connection recovery operation.

When a periodic or specific event is satisfied, the UE or terminal 5*g*-01 in the connected mode reports cell measurement information (measurement report) to the serving eNB 5*g*-02 at operation 5*g*-05. Based on the cell measurement information, the serving eNB determines whether to hand over the terminal to a neighbor cell. Handover is to change the serving cell or base station providing a service to the terminal in the connected mode to another cell or base station. Upon determining to hand over, the serving cell makes a handover request by sending a handover (HO) request message to the target eNB 5*g*-03 (new base station that will serve the terminal) at operation 5*g*-10. If the target cell accepts the HO request, it transmits an HO request Ack message to the serving cell at operation 5*g*-15. Upon receiving the HO request Ack message, the serving cell transmits an HO command message to the terminal at operation 5*g*-20. Before receiving the HO command, the terminal continuously receives the downlink channel PDCCH/PDSCH/PHICH from the serving cell and transmits the uplink channel PUSCH/PUCCH. The HO command is transmitted by the serving cell to the terminal by using an RRC connection reconfiguration message. The above handover message may include the following information.

Thres_s: threshold for serving cell
Thres_t: threshold for target cell
Period_h: time duration during which target cell quality is higher than Thres_t for handover decision
Period_i: time duration during which serving/target cell quality is lower than threshold for determining inactive state transition
Target cell information (cell id, random access resource, and the like)
Inactive state information (resume ID, RAN area info, and the like)

Upon reception of the handover command message, the terminal performs handover evaluation at operation 5*g*-25. The terminal compares the signal quality of the serving cell with Thres_s and compares the signal quality of the target cell with Thres_t. If signal qualities of the serving cell and the target cell satisfy the following conditions, the terminal transmits the handover evaluation result to the base station at operation 5*g*-30. In this embodiment, a description is given of the type-3 event corresponding to a situation where if the signal quality of the serving cell remains lower than Thres_s for Period_i and the signal quality of the target cell remains lower than Thres_t for Period_i, the terminal makes a transition to the inactive state.

TABLE 2

|  | Serving cell is good | Serving cell is bad |
| --- | --- | --- |
| Target cell is good | HO to the target cell (Type 2) | HO to the target cell (Type 2) |
| Target cell is bad | Stay in the serving cell (Type 1) | Transition to the inactive state (Type 3) |

If the handover evaluation result from the terminal is of type 3, the serving cell sends an inactive state transition command to the terminal and saves the UE context at operation 5*g*-35. Upon reception of the message, the terminal resets the MAC, suspends SRB1, SRB2 and DRBs with the serving cell, and searches for a suitable cell in the vicinity at operation 5*g*-40. If the terminal finds a suitable cell and the cell is a part of the preset RAN area, the terminal performs the resume operation at operation 5g-45. For example, the terminal assumes that the found suitable cell is the target cell and attempts random access to the suitable cell at operation 5g-50. The random access is performed to notify the target cell that the terminal attempts to connect thereto and to achieve uplink synchronization. For random access, the terminal transmits a preamble to the target cell. In a preset number of subframes after transmission of the preamble, the terminal monitors whether a RAR is transmitted from the target cell. When a RAR is received within the preset time duration at operation 5g-55, the terminal transmits the target cell an RRCConnectionResumeRequest message containing a resume ID and resume cause at operation 5g-60. The new target cell can examine the resume ID of the above received message to identify the base station from which the terminal has received a service at operation 5g-65. If the new target eNB has successfully received and identified the resume ID, it sends a UE context retrieve request to the serving cell at operation 5g-70, and receives a corresponding response at operation 5g-75. The new base station can retrieve the UE context from the source base station via the S1 or X2 interface. (If the new base station has received the resume ID but cannot successfully identify the UE, it can send an RRCConnectionSetup message to the UE and initiate the legacy RRC connection establishment procedure.) The new base station checks MAC-I based on the retrieved UE context. The MAC-I is a message authentication code computed by the UE for a control message by applying the security information of the retrieved UE context, such as a security key and security counter. The base station may verify the integrity of the message based on the MAC-I of the message, and the security key and security counter stored in the UE context. Then, the new base station determines the configuration to be applied to the RRC connection of the terminal and transmits an RRCConnectionResume message containing the configuration information to the terminal at operation 5g-80. The terminal configures the RRC connection by using the updated UE context and configuration information, transmits an RRCConnectionResumeComplete message to the base station, and establishes the connection at operation 5g-85.

Figure 5H:
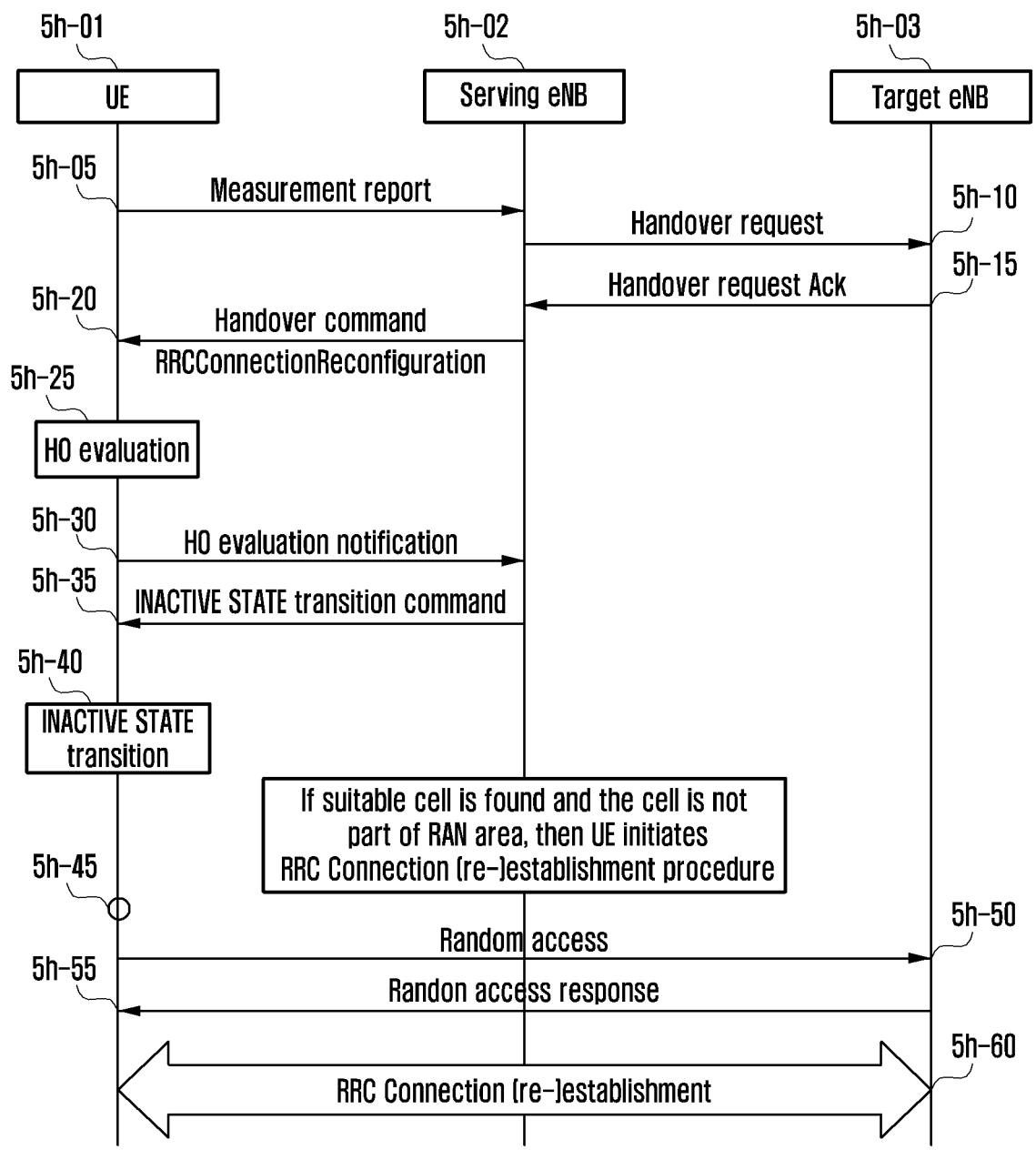
FIG. 5H is a sequence diagram illustrating a process of performing cell connection reestablishment operation after failed conditional handover to a target cell as embodiment 5-3 according to an embodiment of the present disclosure.

FIG. 5H is a sequence diagram illustrating a process of performing cell connection reestablishment operation after failed conditional handover to a target cell as embodiment 5-3 according to an embodiment of the present disclosure.

Referring to FIG. 5H, as described before, in the existing LTE system, if the quality of the radio links of both the serving cell and the target cell is poor, the terminal declares RLF and performs a connection recovery operation. For such a situation, the present disclosure proposes a procedure for transitioning to the inactive state other than the RLF state and performing a connection recovery operation wherein the suitable cell does not belong to the RAN area.

When a periodic or specific event is satisfied, the UE or terminal 5h-01 in the connected mode reports cell measurement information (measurement report) to the serving eNB 5h-02 at operation 5h-05. Based on the cell measurement information, the serving eNB determines whether to hand over the terminal to a neighbor cell. Handover is to change the serving cell or base station providing a service to the terminal in the connected mode to another cell or base station. Upon determining to hand over, the serving cell makes a handover request by sending a handover (HO) request message to the target eNB 5h-03 (new base station that will serve the terminal) at operation 5h-10. If the target cell accepts the HO request, it transmits an HO request Ack message to the serving cell at operation 5h-15. Upon receiving the HO request Ack message, the serving cell transmits an HO command message to the terminal at operation 5h-20. Before receiving the HO command, the terminal continuously receives the downlink channel PDCCH/PDSCH/PHICH from the serving cell and transmits the uplink channel PUSCH/PUCCH. The HO command is transmitted by the serving cell to the terminal by using an RRC connection reconfiguration message. The above handover message may include the following information.

Thres_s: threshold for serving cell
Thres_t: threshold for target cell
Period_h: time duration during which target cell quality is higher than Thres_t for handover decision
Period_i: time duration during which serving/target cell quality is lower than threshold for determining inactive state transition
Target cell information (cell id, random access resource, and the like)
Inactive state information (resume ID, RAN area info, and the like)

Upon reception of the handover command message, the terminal performs handover evaluation at operation 5h-25. The terminal compares the signal quality of the serving cell with Thres_s and compares the signal quality of the target cell with Thres_t. If signal qualities of the serving cell and the target cell satisfy the following conditions, the terminal transmits the handover evaluation result to the base station at operation 5h-30. In this embodiment, a description is given of the type-3 event corresponding to a situation where if the signal quality of the serving cell remains lower than Thres_s for Period_i and the signal quality of the target cell remains lower than Thres_t for Period_i, the terminal makes a transition to the inactive state.

TABLE 3

|  | Serving cell is good | Serving cell is bad |
| --- | --- | --- |
| Target cell is good | HO to the target cell (Type 2) | HO to the target cell (Type 2) |
| Target cell is bad | Stay in the serving cell (Type 1) | Transition to the inactive state (Type 3) |

If the handover evaluation result from the terminal is of type 3, the serving cell sends an inactive state transition command to the terminal and saves the UE context at operation 5h-35. Upon reception of the message, the terminal resets the MAC, suspends SRB1, SRB2 and DRBs with the serving cell, and searches for a suitable cell in the vicinity at operation 5h-40.

If the terminal finds a suitable cell and the cell is not a part of the preset RAN area, the terminal performs the RRC connection (re-)establishment operation at operation 5h-45. For example, the terminal assumes that the found suitable cell is the target cell and attempts random access to the suitable cell at operation 5h-50. The random access is performed to notify the target cell that the terminal attempts to connect thereto and to achieve uplink synchronization. For random access, the terminal transmits a preamble to the target cell. In a preset number of subframes after transmission of the preamble, the terminal monitors whether a RAR is transmitted from the target cell. When a RAR is received within the preset time duration at operation 5h-55, the terminal performs the RRC connection (re-)establishment procedure at operation 5h-60.

Figure 5I:
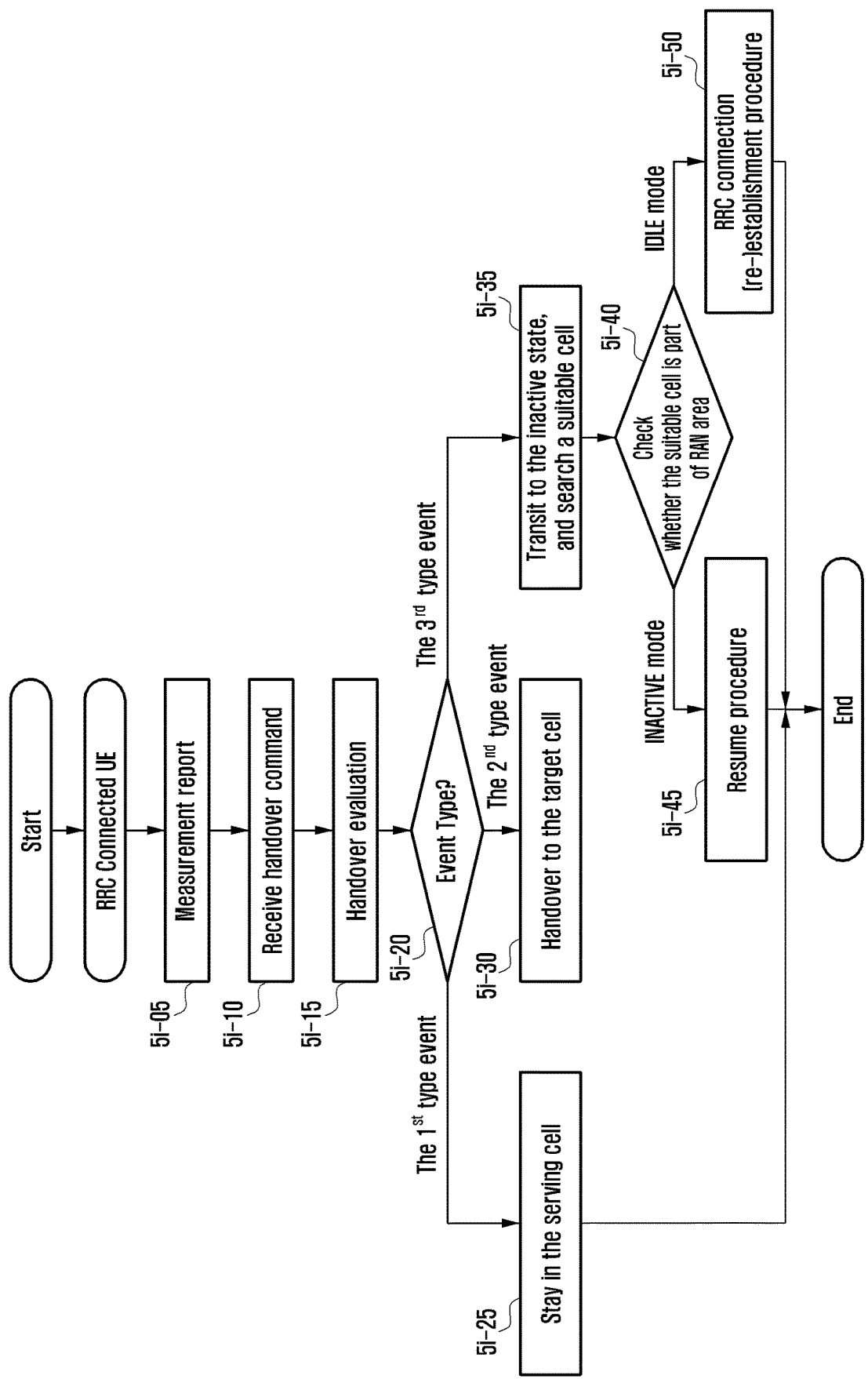
FIG. 5I is a flowchart illustrating operations of a terminal in relation according to an embodiment of the present disclosure.

FIG. 5I is a flowchart illustrating operations of a terminal according to an embodiment of the present disclosure.

Referring to FIG. 5I, it is assumed that the terminal in the connected mode is already connected to the base station/cell and transmits and receives data to and from the beam of the cell. Thereafter, for mobility management of the terminal in the connected mode, the terminal receives a measurement configuration for beam measurement and reporting from the NR base station. This measurement configuration indication message may specify one or more events for periodic beam measurement or measurement reporting. If the configured condition is satisfied, the terminal reports the measurement result to the serving eNB at operation 5i-05. After reporting the measurement result, the terminal continuously receives the downlink channel PDCCH/PDSCH/PHICH from the serving cell and transmits the uplink channel PUSCH/PUCCH. The serving cell transmits a HO command message to the terminal by using an RRC connection reconfiguration message at operation 5i-10. The above handover message may include the following information.

Thres_s: threshold for serving cell
Thres_t: threshold for target cell
Period_h: time duration during which target cell quality is higher than Thres_t for handover decision
Period_i: time duration during which serving/target cell quality is lower than threshold for determining inactive state transition
Target cell information (cell id, random access resource, and the like)
Inactive state information (resume ID, RAN area info, and the like)

Upon reception of the handover command message, the terminal performs handover evaluation at operation 5i-15. The terminal compares the parameters in the handover command message of the serving cell with radio link qualities of the serving cell and the target cell, and performs conditional handover as shown in Table 4 below at operation 5i-20.

TABLE 4

|  | Serving cell is good | Serving cell is bad |
| --- | --- | --- |
| Target cell is good | HO to the target cell (Type 2) | HO to the target cell (Type 2) |
| Target cell is bad | Stay in the serving cell (Type 1) | Transition to the inactive state (Type 3) |

If a type-1 event occurs, the terminal maintains the connection with the current serving cell at operation 5i-25, and if a type-2 event occurs, the terminal performs handover to the target cell at operation 5i-30. The procedure for handover to the target cell is described in detail with reference to FIG. 5F. If a type-3 event occurs, the terminal notifies this to the serving cell and may receive an inactive state transition command from the serving cell. Here, the serving cell saves the UE context of the terminal. The terminal makes a transition to the inactive state and searches for a suitable cell at operation 5i-35. The terminal determines whether the suitable cell is a part of the preset RAN area at operation 5i-40. If the suitable cell is a part of the preset RAN area, the terminal performs the resume procedure at operation 5i-45. If the suitable cell is not a part of the preset RAN area, the terminal makes a transition to the idle state and performs the RRC connection (re-)establishment procedure at operation 5i-50.

Figure 5J:
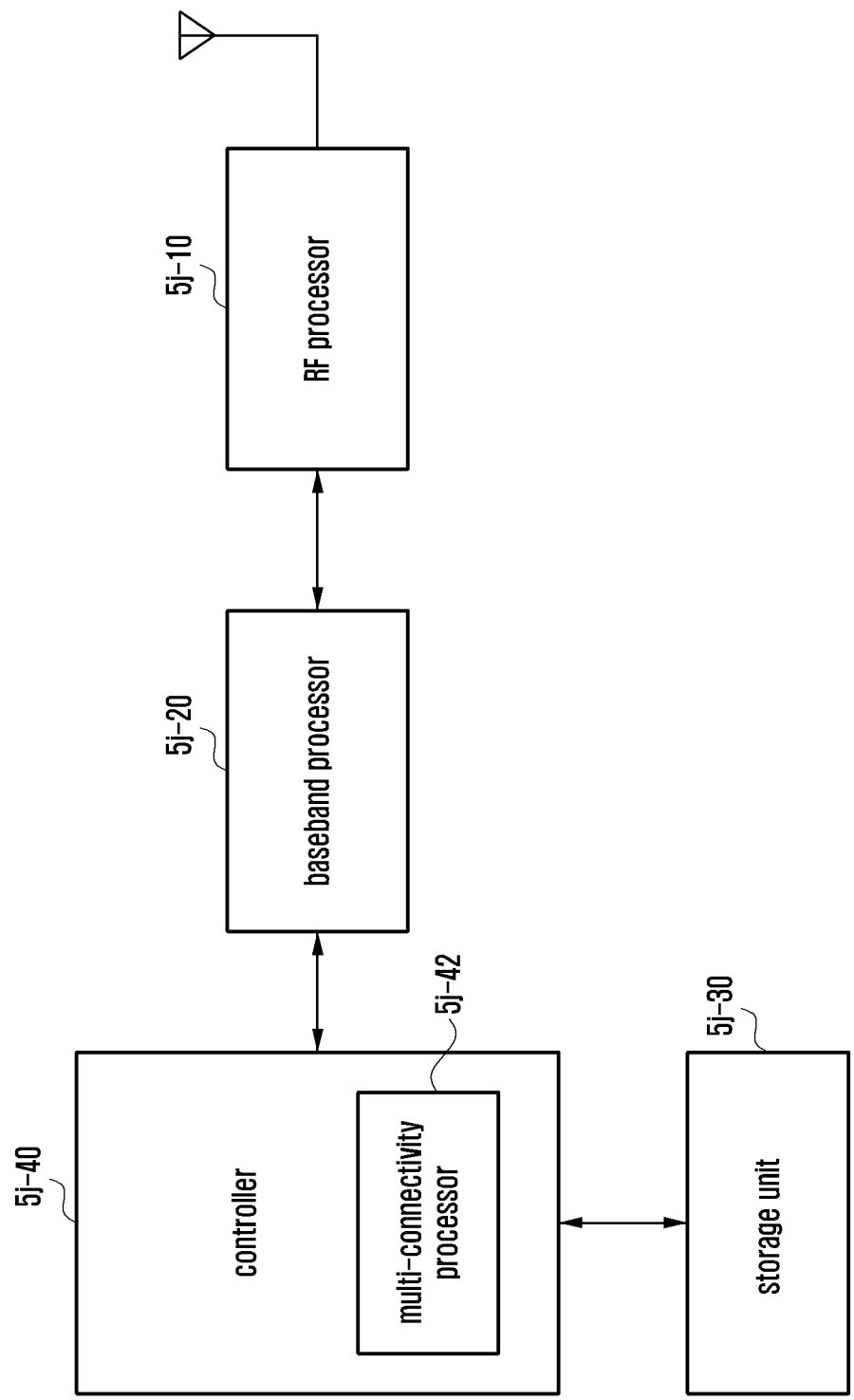
FIG. 5J is a block diagram of a terminal according to an embodiment of the present disclosure.

FIG. 5J is a block diagram of a terminal according to an embodiment of the present disclosure.

Referring to FIG. 5J, the terminal may include an RF processor 5j-10, a baseband processor 5j-20, a storage unit 5j-30, and a controller 5j-40.

The RF processor 5j-10 performs a function for transmitting and receiving a signal through a wireless channel, such as signal conversion between bands and amplification. For example, the RF processor 5j-10 upconverts a baseband signal from the baseband processor 5j-20 into an RF signal and transmits the RF signal through an antenna, and downconverts an RF signal received through the antenna into a baseband signal. For example, the RF processor 5j-10 may include a transmit filter, a receive filter, an amplifier, a mixer, an oscillator, a DAC, and an ADC. Although only one antenna is shown in FIG. 5J, the terminal may have a plurality of antennas. The RF processor 5j-10 may include a plurality of RF chains. Further, the RF processor 5j-10 may perform beamforming. For beamforming, the RF processor 5j-10 may adjust the phase and magnitude of each of the signals transmitted and received through multiple antennas or antenna elements. The RF processor 5j-10 may perform MIMO operation. During MIMO operation, multiple layers can be received.

The baseband processor 5j-20 performs a function for conversion between a baseband signal and a bit string according to the physical layer standard of the system. For example, when transmitting data, the baseband processor 5j-20 generates complex symbols by encoding and modulating a transmission bit string. When receiving data, the baseband processor 5j-20 reconstructs a reception bit string by demodulating and decoding a baseband signal from the RF processor 5j-10. More specifically, in an OFDM scheme, when transmitting data, the baseband processor 5j-20 generates complex symbols by encoding and modulating a transmission bit string, maps the complex symbols to subcarriers, and generates OFDM symbols through IFFT and CP insertion. When receiving data, the baseband processor 5j-20 divides the baseband signal from the RF processor 5j-10 into OFDM symbols, recovers signals mapped to subcarriers through FFT, and reconstructs a reception bit string through demodulation and decoding.

As described above, the baseband processor 5j-20 and the RF processor 5j-10 transmit and receive signals. Hence, the baseband processor 5j-20 and the RF processor 5j-10 may be referred to as a transmitter, receiver, transceiver, or communication unit. At least one of the baseband processor 5j-20 and the RF processor 5j-10 may include a plurality of communication modules to support different radio access technologies. At least one of the baseband processor 5j-20 and the RF processor 5j-10 may include different communication modules to process signals of different frequency bands. For example, the different radio access technologies may include a wireless LAN technology (e.g., IEEE 802.11) and a cellular network technology (e.g., LTE). The different frequency bands may include SHF bands (e.g., 2.5 GHz, 5 GHz) and mm wave bands (e.g., 60 GHz).

The storage unit 5j-30 stores basic programs, application programs, and data, such as configuration information for the operation of the terminal. More particularly, the storage unit 5j-30 may store information on the second access node performing wireless communication using the second wireless access technology. The storage unit 5j-30 provides stored data at the request of the controller 5j-40.

The controller 5j-40 controls the overall operation of the terminal. For example, the controller 5j-40 transmits and receives a signal through the baseband processor 5j-20 and the RF processor 5j-10. The controller 5j-40 writes and reads data to and from the storage unit 5j-30. To this end, the controller 5*j*-40 may include at least one processor. For example, the controller 5*j*-40 may include a CP to control communication and an AP to control the higher layers, such as application programs. In one embodiment, the controller 5*j*-40 includes a multi-connectivity processor 5*j*-42 to process operations in the multi-connectivity mode.

Figure 5K:
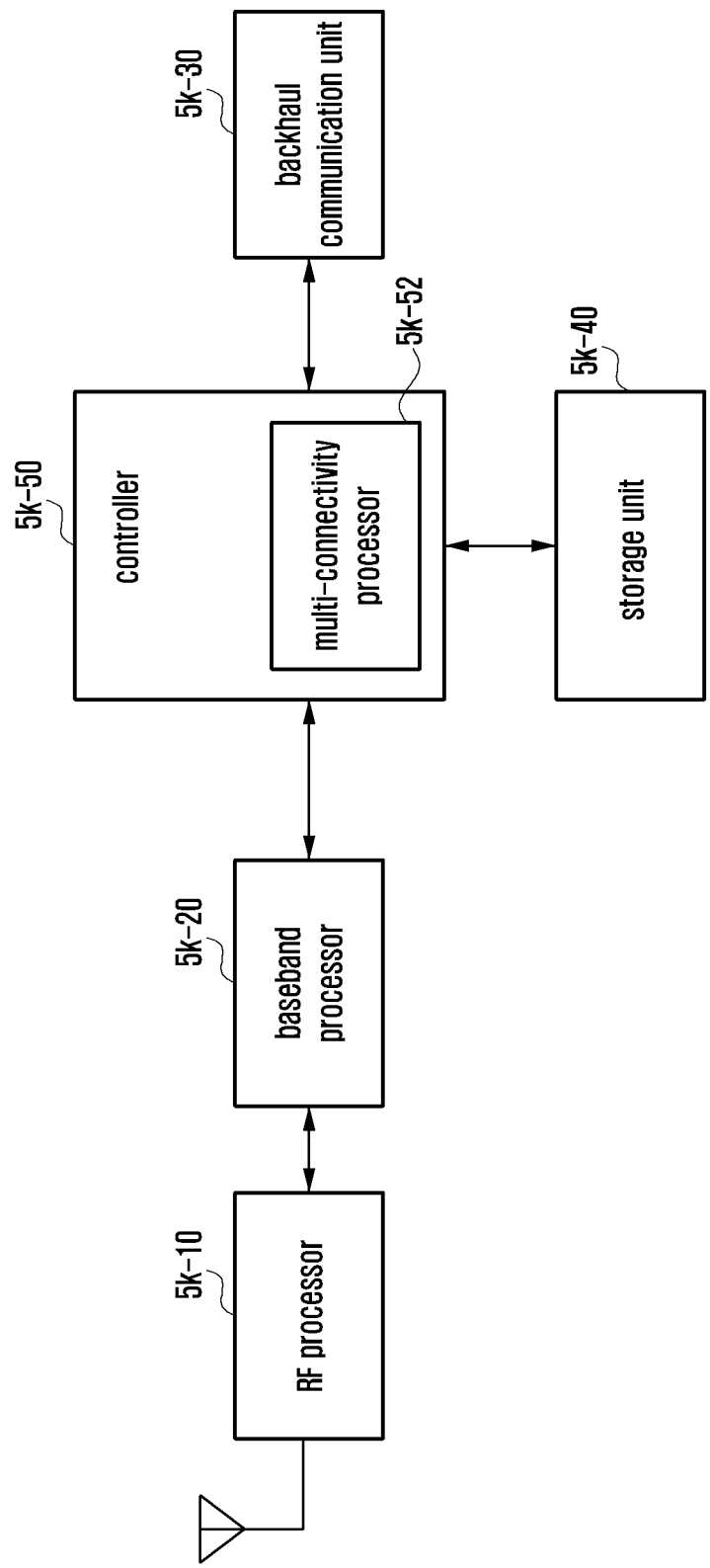
FIG. 5K is a block diagram of an NR base station according to an embodiment of the present disclosure.

FIG. 5K is a block diagram of an NR base station according to an embodiment of the present disclosure.

Referring to FIG. 5K, the NR base station may include an RF processor 5*k*-10, a baseband processor 5*k*-20, a backhaul communication unit 5*k*-30, a storage unit 5*k*-40, and a controller 5*k*-50.

The RF processor 5*k*-10 performs a function for transmitting and receiving a signal through a wireless channel, such as signal conversion between bands and amplification. For example, the RF processor 5*k*-10 upconverts a baseband signal from the baseband processor 5*k*-20 into an RF signal and transmits the RF signal through an antenna, and downconverts an RF signal received through the antenna into a baseband signal. For example, the RF processor 5*k*-10 may include a transmit filter, a receive filter, an amplifier, a mixer, an oscillator, a DAC, and an ADC. Although only one antenna is shown in FIG. 5K, the first access node may have a plurality of antennas. The RF processor 5*k*-10 may include a plurality of RF chains. Further, the RF processor 5*k*-10 may perform beamforming. For beamforming, the RF processor 5*k*-10 may adjust the phase and magnitude of each of the signals transmitted and received through multiple antennas or antenna elements. The RF processor 5*k*-10 may transmit one or more layers for downlink MIMO operation.

The baseband processor 5*k*-20 performs a function for conversion between a baseband signal and a bit string according to the physical layer standard of the first RAT. For example, when transmitting data, the baseband processor 5*k*-20 generates complex symbols by encoding and modulating a transmission bit string. When receiving data, the baseband processor 5*k*-20 reconstructs a reception bit string by demodulating and decoding a baseband signal from the RF processor 5*k*-10. More specifically, in an OFDM scheme, when transmitting data, the baseband processor 5*k*-20 generates complex symbols by encoding and modulating a transmission bit string, maps the complex symbols to subcarriers, and generates OFDM symbols through IFFT and CP insertion. When receiving data, the baseband processor 5*k*-20 divides the baseband signal from the RF processor 5*k*-10 into OFDM symbols, recovers signals mapped to subcarriers through FFT, and reconstructs a reception bit string through demodulation and decoding. As described above, the baseband processor 5*k*-20 and the RF processor 5*k*-10 transmit and receive signals. Hence, the baseband processor 5*k*-20 and the RF processor 5*k*-10 may be referred to as a transmitter, receiver, transceiver, communication unit, or wireless communication unit.

The backhaul communication unit 5*k*-30 provides an interface to communicate with other nodes in the network. For example, the backhaul communication unit 5*k*-30 may convert a bit string to be transmitted from the primary base station to another node, such as a secondary base station and the CN into a physical signal, and may convert a physical signal received from the other node into a bit string.

The storage unit 5*k*-40 stores basic programs, application programs, and data, such as configuration information for the operation of the primary base station. More particularly, the storage unit 5*k*-40 may store information on the bearers allocated to the connected terminals, and measurement results reported from the connected terminals. The storage unit 5*k*-40 may store information on the criteria for determining whether to provide or discontinue a multi-connectivity service to a terminal. The storage unit 5*k*-40 provides stored data at the request of the controller 5*k*-50.

The controller 5*k*-50 controls the overall operation of the primary base station. For example, the controller 5*k*-50 transmits and receives a signal through the baseband processor 5*k*-20 and the RF processor 5*k*-10 or through the backhaul communication unit 5*k*-30. The controller 5*k*-50 writes and reads data to and from the storage unit 5*k*-40. To this end, the controller 5*k*-50 may include at least one processor. In one embodiment, the controller 5*k*-50 includes a multi-connectivity processor 5*k*-52 to process operations in the multi-connectivity mode.

An embodiment of the includes at least the following features.

A method for a terminal to perform conditional inter-cell handover.

A method for the terminal may receive a handover message from a base station after reporting a measurement result;
  the handover message a serving cell threshold and a target cell threshold for radio link evaluation;
  the handover message may include information on the time duration during which target cell quality is higher than Thres_t for handover decision (Period_h);
  the handover message may include information on the time duration during which serving/target cell quality is lower than threshold for determining inactive state transition (Period_i);
  the handover measurement may include target cell information (cell id, random access resource, and the like);
  the handover measurement may include inactive state information (resume ID, RAN area info, and the like);
A method for distinguishing operations to be performed according to the quality of radio links of the serving cell and the target cell;
  if the quality of measured radio links is evaluated to be of type 1, the first operation may be carried out by maintaining the connection to the serving cell;
  if the quality of measured radio links is evaluated to be of type 2, the second operation may be carried out by performing handover to the target cell;
  if the quality of measured radio links is evaluated to be of type 3, the third operation may be carried out by notifying this to the base station, receiving an inactive state transition indication, and performing a necessary operation;
  the type-1 event may correspond to a situation where the radio link quality of the serving cell is higher than Thres_s and the radio link quality of the target cell is lower than Thres_t;
  the type-2 event may correspond to a situation where the radio link quality of the target cell remains higher than Thres_t for Period_h,
  the type-3 event may correspond to a situation where the radio link quality of the serving cell remains lower than Thres_s for Period_i and the radio link quality of the target cell remains lower than Thres_t for Period_i,
A method for the terminal to search for a suitable cell in the inactive state and recover a connection with the new cell as a result of performing the third operation above;
  if condition 1 is satisfied, the terminal may perform a resume procedure;
  the resume procedure may include performing random access and transmitting a resume request;
  the resume request may include a resume ID and resume cause receiving a resume permission from the new cell and transmitting a completion message;

if condition 2 is satisfied, the terminal may perform the RRC connection (re-)establishment procedure;

the above procedure may include performing random access and performing RRC connection (re-)establishment;

condition 1 corresponds to a situation where the found suitable cell is may be a part of the RAN area;

condition 2 corresponds to a situation where the found suitable cell is may not be a part of the RAN area.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
    receiving, from a base station, information configuring a measurement scheme for a high movement speed;
    identifying a measurement period for a measurement of a primary cell (PCell) based on the information configuring the measurement scheme for the high movement speed; and
    performing the measurement of the PCell based on the measurement period,
    wherein the measurement scheme for the high movement speed is not applied to a measurement of a secondary cell (SCell), and
    wherein the measurement period identified for the PCell is shorter than a measurement period for the SCell.

2. The method of claim 1, wherein the information is included in a system information block (SIB).

3. The method of claim 2,
    wherein the measurement for the SCell is performed based on a measurement scheme other than the measurement scheme for the high movement speed,
    wherein the measurement scheme for the high movement speed is not applied to a measurement of a primary SCell (PSCell), and
    wherein the measurement period identified for the PCell is shorter than a measurement period for the PSCell.

4. The method of claim 1, further comprising:
    transmitting, to the base station, a result of the measurement of the PCell.

5. A method performed by a base station in a wireless communication system, the method comprising:
    transmitting, to a terminal, information configuring a measurement scheme for a high movement speed; and
    receiving, from the terminal, a result of a measurement of a primary cell (PCell) and a result of a measurement of a secondary cell (SCell),
    herein the measurement of the PCell is performed based on a measurement period identified for the measurement of the PCell, the measurement period being identified based on the information configuring the measurement scheme for the high movement speed,
    wherein the measurement scheme for the high movement speed is not applied to a measurement of the SCell, and
    wherein the measurement period identified for the PCell is shorter than a measurement period for the SCell.

6. The method of claim 5, wherein the information is included in a system information block (SIB).

7. The method of claim 6,
    wherein the measurement for the SCell is performed based on a measurement scheme other than the measurement scheme for the high movement speed,
    wherein the measurement scheme for the high movement speed is not applied to a measurement of a primary SCell (PSCell), and
    wherein the measurement period identified for the PCell is shorter than a measurement period for the PSCell.

8. A terminal in a wireless communication system, the terminal comprising:
    a transceiver; and
    at least one processor coupled with the transceiver, and configured to:
        receive, from a base station, information configuring a measurement scheme for a high movement speed,
        identify a measurement period for a measurement of a primary cell (PCell) based on the information configuring the measurement scheme for the high movement speed, and
        perform the measurement of the PCell based on the measurement period,
    wherein the measurement scheme for the high movement speed is not applied to a measurement of a secondary cell (SCell), and
    wherein the measurement period identified for the PCell is shorter than a measurement period for the SCell.

9. The terminal of claim 8, wherein the information is included in a system information block (SIB).

10. The terminal of claim 9,
    wherein the measurement for the SCell is performed based on a measurement scheme other than the measurement scheme for the high movement speed,
    wherein the measurement scheme for the high movement speed is not applied to a measurement of a primary SCell (PSCell), and
    wherein the measurement period identified for the PCell is shorter than a measurement period for the PSCell.

11. The terminal of claim 8, wherein the at least one processor is further configured to transmit, to the base station, a result of the measurement of PCell.

12. A base station in a wireless communication system, the base station comprising:
    a transceiver; and
    at least one processor coupled with the transceiver, and configured to:
        transmit, to a terminal, information configuring a measurement scheme for a high movement speed, and
        receive, from the terminal, a result of a measurement of a primary cell (PCell) and a result of a measurement of a secondary cell (SCell),
    herein the measurement of the PCell is performed based on a measurement period identified for the measurement of the PCell, the measurement period being identified based on the information configuring the measurement scheme for the high movement speed,
    wherein the measurement scheme for the high movement speed is not applied to a measurement of the SCell, and
    wherein the measurement period identified for the PCell is shorter than a measurement period for the SCell.

13. The base station of claim 12, wherein the information is included in a system information block (SIB).

14. The base station of claim 13,
    wherein the measurement for the SCell is performed based on a measurement scheme other than the measurement scheme for the high movement speed, wherein the measurement scheme for the high movement speed is not applied to a measurement of a primary SCell (PSCell), and wherein the measurement period identified for the PCell is shorter than a measurement period for the PSCell.

* * * * *